US007424473B2

(12) United States Patent
Orton, III et al.

(10) Patent No.: US 7,424,473 B2
(45) Date of Patent: Sep. 9, 2008

(54) SYSTEM AND METHOD FOR ASSET TRACKING WITH ORGANIZATION-PROPERTY-INDIVIDUAL MODEL

(75) Inventors: Julian Robert Orton, III, Piedmont, CA (US); Paul Raposo, San Francisco, CA (US); Kendyl A. Roman, Sunnyvale, CA (US); David Hoffman, Toronto (CA); Rodrigo von Conta, Oakland, CA (US); Maria Holmes, Lewisville, TX (US)

(73) Assignee: CentricMedia, Inc., Emeryville, CA (US)

( * ) Notice: Subject to any disclaimer, the term of this patent is extended or adjusted under 35 U.S.C. 154(b) by 963 days.

(21) Appl. No.: 10/328,350

(22) Filed: Dec. 23, 2002

(65) Prior Publication Data
US 2004/0019609 A1    Jan. 29, 2004

Related U.S. Application Data

(60) Provisional application No. 60/344,740, filed on Dec. 26, 2001.

(51) Int. Cl.
*G06F 17/30* (2006.01)
(52) U.S. Cl. .......................... 707/6; 707/10; 707/104.1; 707/5; 707/101
(58) Field of Classification Search .................. 707/6, 707/10, 104.1, 1–7, 101; 705/40; 379/88.17; 395/228
See application file for complete search history.

(56) References Cited

U.S. PATENT DOCUMENTS

| 4,271,352 A | 6/1981 | Thomas ........................ 235/375 |
| 4,920,488 A | 4/1990 | Filley ........................... 364/403 |
| 5,180,192 A | 1/1993 | Herbert ........................ 283/101 |
| 5,521,815 A | 5/1996 | Rose, Jr. ....................... 364/409 |
| 5,623,403 A * | 4/1997 | Highbloom .................... 705/28 |
| 5,732,401 A | 3/1998 | Conway ........................ 705/29 |
| 5,809,481 A | 9/1998 | Baron .......................... 705/14 |
| 5,841,116 A | 11/1998 | Lewis .......................... 235/375 |
| 5,955,952 A | 9/1999 | Bergman et al. ............ 340/573.1 |
| 5,962,834 A | 10/1999 | Markman ..................... 235/385 |
| 6,025,780 A | 2/2000 | Bowers ........................ 340/572 |
| 6,173,284 B1 * | 1/2001 | Brown ........................... 707/10 |
| 6,259,367 B1 | 7/2001 | Klein ........................ 340/572.1 |

(Continued)

OTHER PUBLICATIONS

Supplementary European Search Report in Application No. EP 02 80 6223, dated Sep. 16, 2005.

*Primary Examiner*—Sana Al-Hashemi
(74) *Attorney, Agent, or Firm*—Fliesler Meyer LLP

(57) ABSTRACT

A system for asset tracking, comprising a universally accessible property tracking database. The database is based on an organization-property-individual model, and uses automatic close-match searching to match lost and found items. Any type of property can be reported found, registered, and reported lost, and recovered property can be returned to its owner. Embodiments of the system include on-line access that allows a user or organization to register an item, based upon the item's characteristics or an affixed label code. If the item is lost due to accident, theft, or damage, the system can be used to register the lost item and to generate reports and insurance claim information. A user who finds an item may register the item as a found item. When a match is found between a registered lost and registered found item the system may be used to return the item to the proper owner.

15 Claims, 45 Drawing Sheets

U.S. PATENT DOCUMENTS 6,353,811 B1 * 3/2002 Weissman ............... 705/40
6,449,611 B1 * 9/2002 Frankel et al. ............ 707/6
6,829,333 B1 * 12/2004 Frazier ............... 379/88.17
2001/0053981 A1 12/2001 Wyssen

* cited by examiner

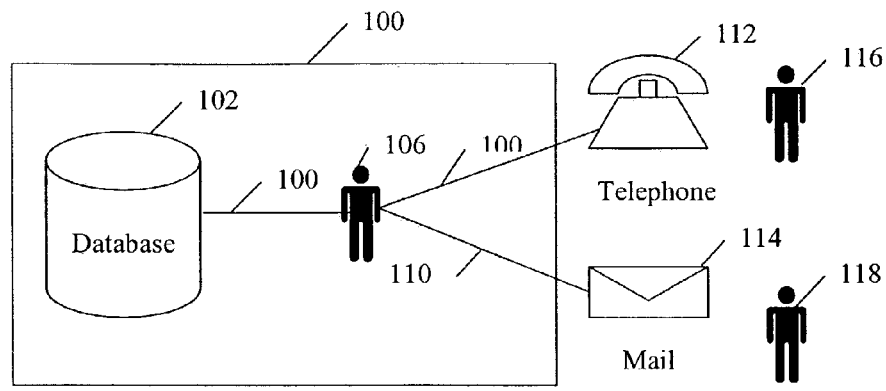
Fig 1A (PRIOR ART)
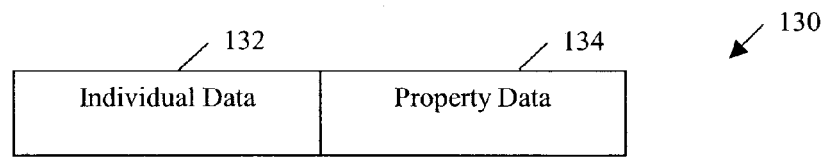
Fig 1B (PRIOR ART)
| Individual Data | Property Data |
|---|---|
| John Doe | Red 10 Speed |
| Mary Smith | Pink Stingray |
| John Doe | Blue 3 Speed |
Fig 1C (PRIOR ART)

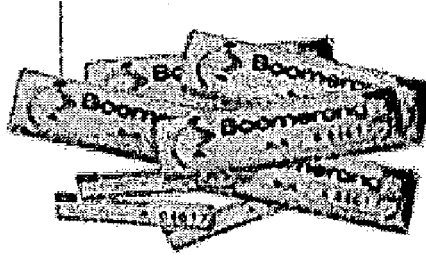
Fig 12

Put them on things that you would hate to lose.

At the Boomerangit Store, you'll find our tamper-resistant labels come in different sizes to fit just about anything. And for basically pocket change, you can put them on as many things as you can think of. If you lose something and someone finds it, the label instructs them to return it by logging onto our website.

(To visit the Boomerangit store, click on the labels above.)

Fig 14

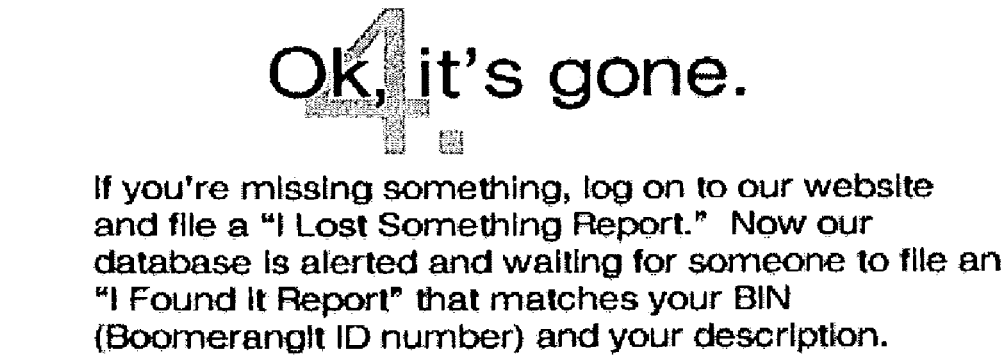
If you're missing something, log on to our website and file a "I Lost Something Report." Now our database is alerted and waiting for someone to file an "I Found It Report" that matches your BIN (BoomerangIt ID number) and your description.
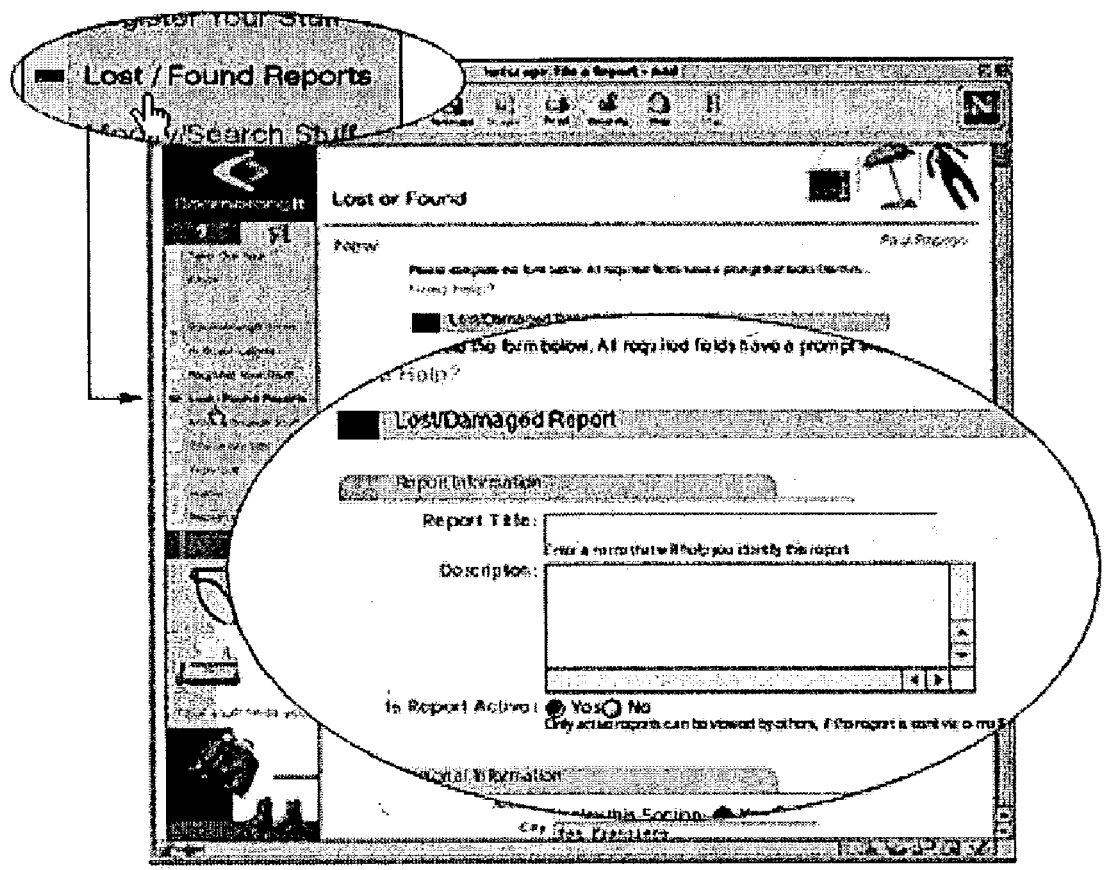
Fig 16

How do I thank them?

We send all the people who return things to us a thank you pack of our Boomerangit labels. You aren't required to send a reward but think of it this way, they did do a very nice thing by returning what you lost. So if you'd like to send a reward, we think it's a great thing to do.

Ok, sign me up.
Click here.

SYSTEM AND METHOD FOR ASSET TRACKING WITH ORGANIZATION-PROPERTY-INDIVIDUAL MODEL

CLAIM OF PRIORITY

This application claims priority from provisional application "SYSTEM FOR ASSET TRACKING WITH ORGANIZATION-PROPERTY-INDIVIDUAL MODEL" Application No. 60/344,740 filed Dec. 26, 2001, and which application is incorporated herein by reference.

FIELD OF THE INVENTION

This invention generally relates to property tracking systems and particularly to a system for property or asset tracking using an organization-property-individual model.

BACKGROUND

In the last few years, there have been tremendous advances in the development and expansion of the Internet making it a universal, world-wide communication medium. At the same time there have been significant increase of the number of types of personal electronic devices. There has always been theft, fire, flood, and forgetfulness that lead to the loss of one's personal property. For a number of years there have been a number of attempts to track personal property so that lost or stolen property can be returned if found or recovered to its owners.

A number of different approaches have been taken but each has resulted in less than acceptable results. To consider one example, local police or fire departments have been successful in getting children to register their bicycles. In most cases this is done with a paper card kept in a box in the local station. This approach has been ineffective because often when a piece of property such as a bicycle has been stolen, it is recovered in another city or there is difficulty in finding ownership information of the recovered bicycle.

Some have tried to create registries that cover a larger geographic region. These registries typically serve as merely a posting place where lost or found pieces of property can be listed. These make personal information available publicly and therefore limit those that feel comfortable using such registries. Others have provided a service where postings are not publicly available protecting privacy but are then dependent on a person to search through the entries and make a match.

A number of service providers provide labels with a user identification number. If a labeled item is found, the number of the item can be used to locate the owner. Some of these systems use courier or mail box companies to assist in the return of the property. This approach is useless if the thief removes the label. This approach also either exposes personal information regarding the finder or the owner, or requires the web site staff to do the work of making the match and handling the return.

The National Bike Registry has been in operation since 1984 and has been successful in establishing a national registry of bicycles. This registry uses a computer database to store data about bicycles and has been very successful at returning registered bicycles to its owners. Recently a World Wide Web interface has been added to the National Bike Registry allowing users to register their bicycles and easily report lost or stolen bicycles or the Internet. National Bike Registry personnel work with law enforcement agencies to locate recovered bikes and return them to registered owners. With all its success, the database of the National Bike Registry is limited to bicycles and requires a significant human effort to achieve its goals.

There are a number of problems that are not handled by property tracking systems. Many of these approaches are limited to a single type of item such as a bicycle or a pet. Because they are limited to a certain type of item the database only tracks a certain set of attributes that are limited to that type of item such as number of gears or number of wheels. These attributes do not apply to another type of item such as a laptop computer.

Many of these approaches described above require human effort to search the records to find matches. The requirement for human effort increases the cost of the service, delays the process, and is error prone.

Additionally, many of these approaches only track a limited number of attributes such as a serial number or label number. If that critical attribute is removed or modified, the system fails. These systems also require an exact match so items that close match are ignored.

The database design of many of these systems are based solely on a Property model, where information about the owner is stored in a redundant manner. This may suffice for a small database, but when an attempt is made to store information on a national or world-wide scale, the redundant data increases the size of the database. Redundant data is also harder to maintain as information changes, such as the address or phone number of an owner of multiple pieces of property.

Because of the rigid database model used by many of these systems, it is difficult and costly to make changes to the database design. Even a small change to incorporate a new type of property typically requires:
1. a change to the database schema (organization of data elements);
2. reprogramming the database access routines;
3. redesigning the web pages or user interfaces; and,
4. inadvertent defect introduction as a result of the change.

Many of these systems also fail to provide any type of integration with warranty management or insurance claim.

All of these problems result in found items not being returned to their owners and a loss to society as a whole through theft and/or destruction of property.

SUMMARY OF THE INVENTION

In accordance with an embodiment of the present invention a system is provided that comprises a universally accessible property tracking database, based on an Organization-Property-Individual model with automatic close-match searching, whereby any type of property can be reported found, registered, and reported lost, and whereby recovered property can be returned to its owner.

Objects and Advantages

Accordingly, beside the objects and advantages of the system described above, some additional objects and advantages of the present invention are:
1. to provide a database that supports multiple item types.
2. to provide a database that dynamically extensible such that new items or new item attributes can be added without redesigning the database schema and without reprogramming the data access routines.
3. to provide a database that can accept new attributes on item types that already exist in the database.

4. to provide a database that can accept new item types that are not currently supported in the database.
5. to provide a database that can be used internationally and by users who understand different languages.
6. to provide a system that uses labels that are universally recognized and that can be indicative of the registry even after the labels are removed.
7. to provide close match searching so that items that have missing or obscured attributes, such as a filed off serial number; can still be matched with its owner.
8. to provide automated searching so that the matching process is continual and not human intensive.
9. to provide an automated payment mechanism for various payment methods including credit cards, cash cards, electronic funds transfer, etc.
10. to provide a new benefit for credit card holders.
11. to provide a universal means for corporate asset tracking.
12. to provide an integrated system for making insurance claims.
13. to provide an off site record of personal property.
14. to provide an item's history (or chain of title) from manufacture, through distribution channels, to consumers, and finally, to decommission.
15. to provide an integrated system for consumers to inform manufacturers of their property ownership and receive warranty support and services, whereby warranty response is increased.
16. to provide a mechanism that allows travel and hospitality services, such as airlines, taxis, and hotels to return property to their owners and thereby reduce their duties, storage costs, and liability.
17. to provide multiple means of returning property its owner user public couriers or law enforcement through integrated interfaces.
18. to provide a universally accessible tool for local, state, national; and international law enforcement to solve crime to and reduce stolen property inventories.
19. to provide a system that allows multiple users in a single organization and determine access privileges based of organizational relationships.
20. to provide a system where users can automatically recover forgotten passwords.
21. to deter crime.
22. to provide system whereby family of accident victims can be more rapidly identified and notified.
23. to improve communication between business, citizens, and law enforcement.
24. to provide an anonymous means for finders of property can communicate with owners of property.
25. to provide a means of accessing relevant data outside the registry.
26. to facilitate reporting by organization such as law enforcement, collateral lenders, etc.
27. to automatically provide labels and other merchandise to new registrants and other users.
28. to provide a user input mechanism for defining new attributes for a item.

BRIEF DESCRIPTION OF THE DRAWINGS

In the drawings, closely related figures have the same number but different alphabetic suffixes.

FIG. 1A shows prior art registry systems.
FIG. 1B shows prior art data schema.
FIG. 1C shows examples of prior art data.
FIGS. 12-18 are illustrations of a system in accordance with an embodiment of the invention.

DETAILED DESCRIPTION

Figure 2A:
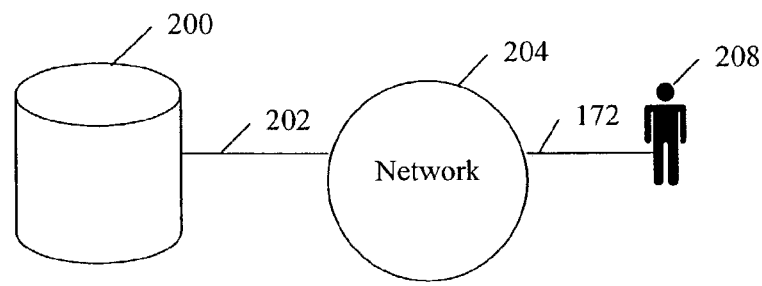
FIG. 2A shows a registry that is accessible over a network.

While the terms used in this specification should generally be interpreted according to their common meaning or their meaning to one skilled in the art, some terms are intended to have a specific meaning. The following terms are defined below for clarity and when these terms appear in this specification with capitalized first letters these terms should take precedence over the common meaning or meaning in the art:

Entity

An Entity is an abstract database concept which describes a real world thing or idea. An Entity may have one or more Relationships with other Entities. The Relationships between Entities can be illustrated in a graph which depicts the Entity-Relationship Model. An Entity is typically represented by a single table in a Database Management System. The attributes of the Entity are typically represented by fields in the database table. A Relationship to another Entity or itself is typically represented for a key field. For example, an Individual may belong to an Organization and both the Individual and the Organization relate to each other. In this example, the Individual Entity would have a key field that links the Individual to the Organization of which it is associated. One of the Entities disclosed in this specification is the "Entity" Entity—the meaning of the specific "Entity" Entity is the more common meaning of an universal abstract descriptor.

Relationship

A Relationship is an abstract database concept which describes the connections that an Entity has with another Entity. The Relationship describes how the Entities relate to each other.

Entity-Relationship Model

An Entity-Relationship Model is one way to describe how data is organized. Typically this model is shown graphically and may be referred to generally as a schema, although a schema more precisely includes a full definition of the attributes of each Entity.

Organization-Property-Individual Model

An Organization-Property-Individual Model is used to provide the core basis of the architecture of the database of the present invention. As described herein, Organization is an Entity; Property is an Entity; and Individual is an Entity. Each of these Entities may have multiple relationships with each other. For example a specific company which is a manufacture may appear as a record in the Organization table. It would be the manufacture of a piece of property which in turn would be appearing as a record in the Property table. That same piece of property may be insured by another organization which is the insurance company (represented by another record in the Organization table) and may be in the custody of a police department (represented by another record in the Organization table). People such as the insurance agent, the owner of the property, and the police officer who file the report may all be represented by distinct records in the Individual table. Only by treating Organizations, Property, and Individuals as separate Entities can the real world be modeled properly.

Database

A Database is generally more than a collection of files containing data. It generally is a collection of data stored in and accessed by a Database Management System (DBMS) that efficiently manages multiple tables that represent Entities and uses indexes based on fields or key fields to speed access based on Relationships in the schema.

Prior Art Registry

FIG. 1A illustrates a typical prior art property registry system. The prior art registry 100 comprises a prior art database 102 (which in some cases is a collection of paper cards) which is searchable by a human searcher 106 via a prior art human interface 104. A telephone user 116 may report lost or found items via a prior art telephone 112 through a prior art telephone interfaces 108. A mail user 118 may register items or report lost or found items by sending in paper prior art mail 114 via a prior art mail interface 108, such as the postal service or a courier service. As discussed above, many prior art registries 100 did not have a computer database and lacked any type of network interface.

FIG. 1B illustrates a typical prior art data schema. Many prior art registries 100, including the National Bike Registry, did not have the Organization-Property-Individual Model. Instead many of the early registries had a single Entity for tracking property and its 11 owner. FIG. 1B shows a prior art entity 130 that contains an owner's individual data 132 as fields in the same Entity (or table) as the property data 134.

FIG. 1C illustrates an example of a prior art database 102. The property table 140 contains individual data fields 142 and property data fields 144. This simple example property table 140 has three distinct pieces of property in the table, each represented as a row in the table. The first property 152 is a "red 10 speed" and the associated owner is the first individual 150, "John Doe". The second property 162 is a "pink strin-gray" and the associated owner is the second individual 160, "Mary Smith". The third property 172 is a "blue 3 speed" and the associated owner is the third individual 170, "John Doe". In the real world "John Doe" in 150 and 170 are the same individuals but because the prior art database is property-based the individual data fields 142 contain redundant information. When the number of fields of individual data gets complex by including more attributes such as address, city, state, zip, work phone, home phone, fax phone, etc., and when individuals register hundreds of pieces of property, when collectively thousands or millions of pieces of property are stored in the database, this redundant data present both a storage space problem and an update problem.

Network Accessible Registry

FIG. 2A illustrates a registry 200 that is directly accessed by a user 208 over a network 204. This access is provided by connecting the registry 200 to the network 204 via a first network connection 202 and by connecting the user to the network via the second network connection 206. In the present invention a user may access the registry 200 without the need of a human intermediary such as the human searcher 106 in FIG. 1A. This component of the invention eliminates the cost, delay and potential error that may result from the human intensive system of the prior art. This component also allows for computer automation of a large number of concurrent users and interactions with the data.

Multiple Channels of Individual/Organization Interaction

Figure 2B:
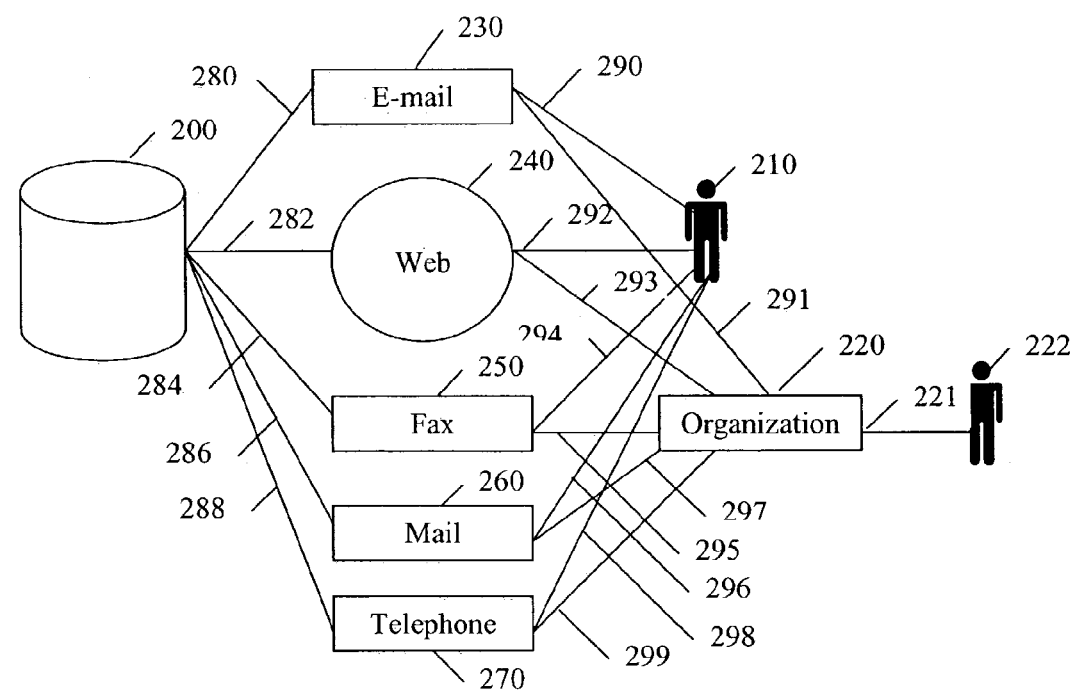
FIG. 2B shows a registry that interfaces with individuals and organizations through many channels.

FIG. 2B illustrates an embodiment of the present invention that incorporates several channels for interaction of individuals 210 and organizations 220 with the registry 200. These channels include e-mail 230, Internet World Wide Web (web) 240, facsimile (fax) 250, paper mail 260, and telephone 270. An organization representative 222 is associated with the organization 220 as represented by the organization representative link 221. The registry mail 280, registry web 282, registry fax 284, registry mail 286, registry telephone 288 are used to send and receive through each respective channel. The individual email 290, organization email 291, individual web 292, organization web 293, individual fax 294, organization fax 295, individual mail 296, organization mail 297, individual telephone 298, organization telephone 299 are used to send and receive through each respective channel for individuals 210 and organization representatives 222. The preferred embodiment of the present invention uses each of these channels communicate with its users. Each channel used increases the number of people that can access the system.

Individuals 210 and organizations 220 that may initially register an item include manufacturer, law enforcement (from community license programs), retailers including point of sale registrations, insurance companies, and individual consumers who are owners of property. It is an object and advantage of the present invention to provide a model (discussed below with FIG. 3A) and network site (discussed below in FIG. 4) that allows each organization 230 to have specific access privileges and access methods to enter data into the registry 200.

Individuals 210 and organizations 230 that can receive information from the registry 200 include law enforcement, manufacturers, consumers, insurance companies, recyclers, retailers, financial institutions, hospitality and transportation business, lenders (including collateral property lenders), and organizations such as courier and mailbox services that can assist in property recovery. It is an object and advantage of the present invention to provide a model (discussed below with FIG. 3A) and network site (discussed below in FIG. 4) that allows each organization 230 to have specific access privileges and access or reception methods to obtain information from the registry 200.

The Organization-Property-Individual Model

Figure 3A:
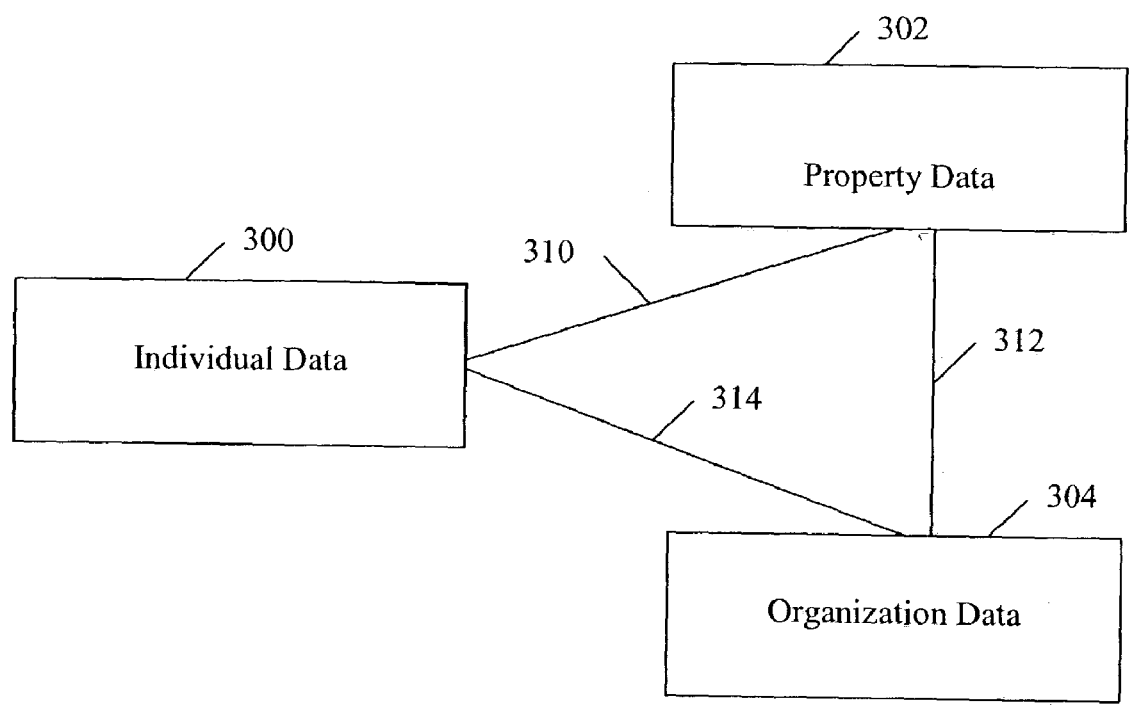
FIG. 3A shows the Organization-Property-Individual Model.

FIG. 3A illustrates the Organization-Property-Individual Model. Existing registries were limited by the data model upon which they were based. We determined that over the life of a product it has multiple relationships with multiple individuals, such as a salesman, an owner, an insurance agent, a thief, and a police officer and a new owner. We discovered the same to be true with, individuals and organizations. An organization may have many members and an individual may be associated with many organizations, such a police officer who represents a specific law enforcement agency, who is a head of a family, who is an owner of a bicycle and an antique rifle, and who is a coach of a youth Rugby football team. The same individual has different roles based on memberships in different organizations. We also discovered that a single piece of property may have relationships with multiple people and multiple people may be in the chain of custody of a single piece of property. Only by building our registry database on a core model that recognizes these critical relationships, could a superior system be provided that can meet the full objects and advantages of the present invention as described above.

Unlike the prior art model (see FIG. 1B) individual data 132 is organized separately from property data 134. The individual data is associated with an individual entity 300. The property data is associated with a property entity 302. The organization data is associated with an organization entity 304. This separation of data allows the many-to-many relationships between individuals, property, and organizations to be modeled by property individual relationships 310, organization-property relationships 312, and organization individual relationships 314.

Lost, Found, and Registered Items

Figure 3B:
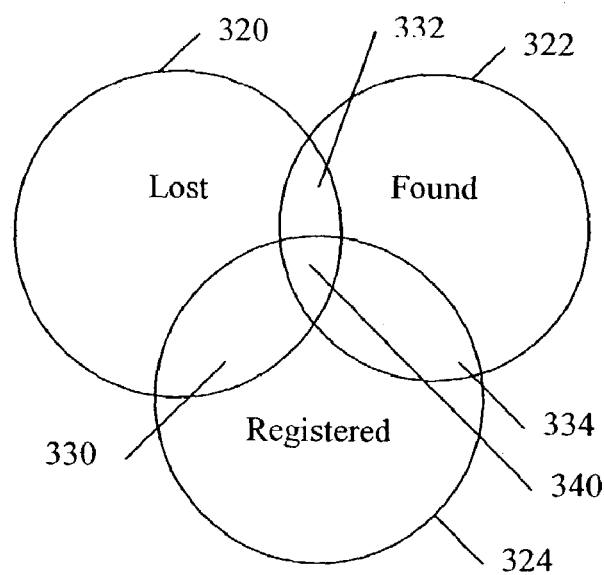
FIG. 3B shows a diagram of lost, found, and registered property.

FIG. 3B illustrates the possible combinations of states associated with lost, found, and registered items. The lost item 320 circle represents the set of items that are lost. The found item 322 circle represents the set of items that are found. The registered item 324 circle represents the set of items that are registered. The intersection of the lost item 320 circle and the registered item 324 circle represents the set of items that are both lost and registered, namely registered lost items 330. The intersection of the lost item 320 circle and the found item 322 circle represents the set of items that are both lost and found, namely lost and found items 332. The intersection of the found item 322 circle and the registered item 324 circle represents the set of items that are both found and registered, namely registered found items 334. The intersection of all three circles represents items that are registered, reported lost, and reported found, namely registered lost and found items 340.

In our analysis of existing registries, we discovered that many of them do not preregister items. Because a missing item is not pre-registered, it is often difficult for an owner of a missing item to accurately describe all of its attributes. Many systems require a serial number and many owners find it impossible to determine the serial number after the item is missing. We also discovered that many registries assume that an item will be reported lost before it is found, and therefore only provide a mechanism for search for an item that has already been reported missing. However, the present invention encourages registration of property before it is missing. The present invention allows for property to be registered when manufactured. If an item is found before it is reported missing, which is often the case, the registry 200 of the present invention will allow the finder to use the system to notify the owner that the property has been found. Early notification of the owner allows the police to gain information about the lost item in a much more timely manner and is more likely to allow them to solve the crime. Earlier notification is also a great benefit in cases where property identification helps identify an accident or crime victim. Many prior art registries cannot handle registered found items 334.

An embodiment of the present invention enforces a mechanism where lost items must be registered before they can be reported missing. This ensures that reported lost items will be a lost registered item 330 and will become a registered lost and found item 340 when it is reported found. An item that has been registered, reported lost, and reported found, namely a registered lost and found item 340, has the highest likelihood of being recovered.

An embodiment of the present invention provides a mechanism where found items may be registered with no owner. This allows that reported found item 322 will become a found registered item 334 and will become a registered lost and found item 340 when it is reported lost. An item that has been registered, reported found, and reported lost, namely a registered lost and found item 340, has the highest likelihood of being recovered.

Network Accessible Registry Detail

Figure 4:
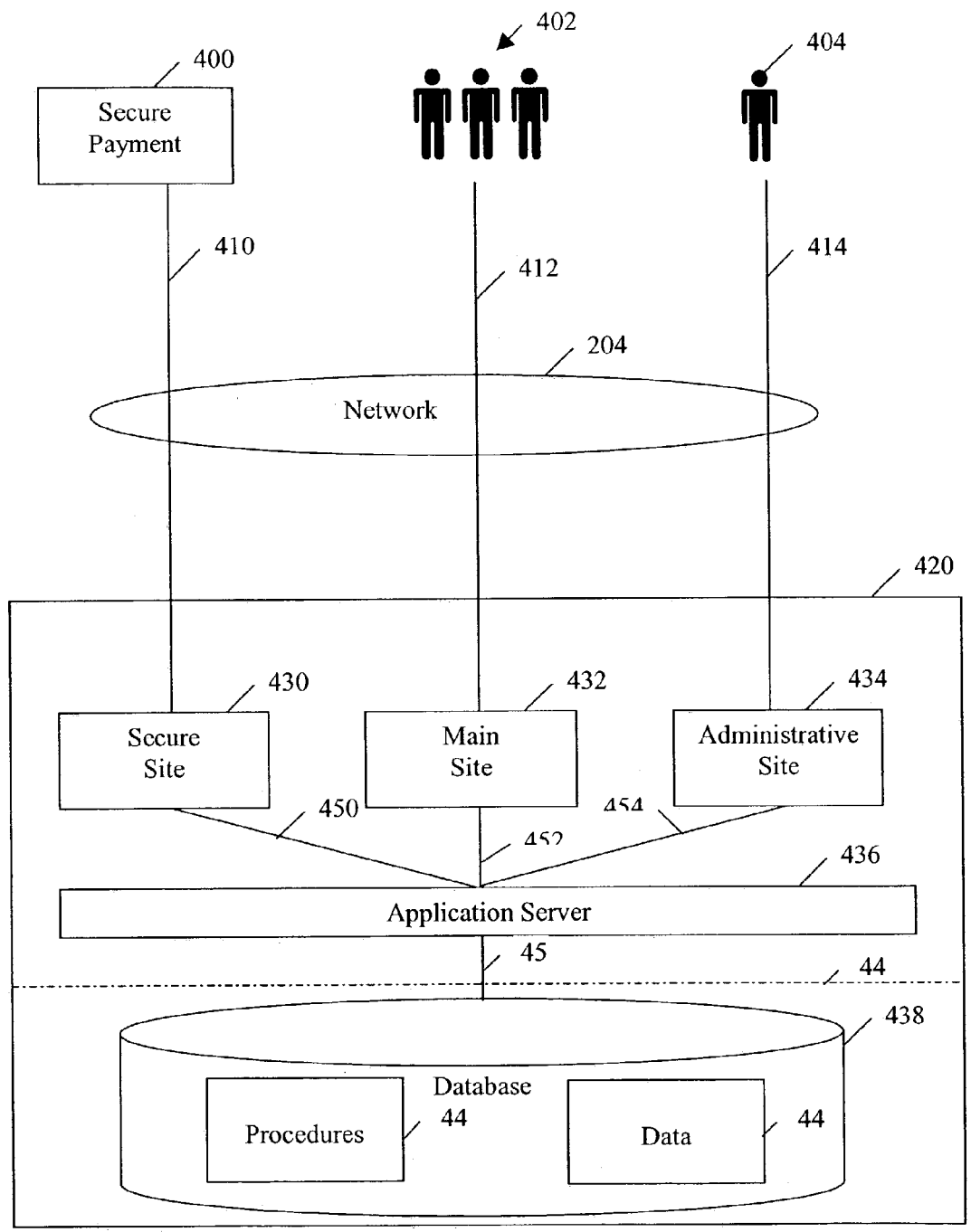
FIG. 4 shows detail of a network accessible registry.

FIG. 4 illustrates a preferred embodiment of the present invention. It shows the detail of a network accessible registry. A network 204 connects a secure payment processor 400 to the secure site 430 on the registry host 420 over an encrypted data connection 410. The network 204 is also the primary access mechanism of users 402, comprising individuals 210 and organizations 220, for accessing the main site 432 over the normal connection 412. The registry's administrator 404 also accesses the administrative site 434 over a password protected administrator connection 414. On the registry host 420, the applications server 436 provides support for network applications including the secure payment application 450 that provides the secure site, the main application 452 that provides the main site, and the administrative application 454 that provide the administrative site. The application server provides access to the database 438. In the preferred embodiment, the individual procedures 440 are stored in the database 438 along with the data 442 which is organized according to the Organization-Property-Individual Model described above and shown in FIG. 3A. The application server obtains the stored procedures 440 and the data 442 via the application connection 456. The registry host 420 can be single computer or can be a plurality of computers. In a layered embodiment the application server 436 can operate on one computer and the database 438 and it Database Management System can operate on one or more computers. A line indicates the logical place for the optional layering partition 444. Note that the application connection 456 may cross over the hardware boundary and over another network as is well known in the art.

Secure payment processors 400 are well known in the art. Two examples are CyberCash and Intellipay. When users 402 are ready to make a purchase or enter confidential information, their connection to the registry 420 is handed off from the main site 432 to the secure site 430. Application servers 436 are well known in the art. The application server of this preferred embodiment is the Oracle Application Server, but an application server could be implemented in any programming language such as perl, java, or C++. Other application servers are commercially available from database vendors and third-party tool developers. The stored procedures 440 of this preferred embodiment are Oracle's PL/SQL. Stored procedures 440 could be implemented in other languages. In another embodiment of this invention, the procedures would not be stored in the database at all, but would instead be standard application code as part of the application server 436 or the secure payment application 450, the main application 452, or the administrative application 454. One skilled in the art would understand this variation of the invention. The sites (430, 432, and 434) of this preferred embodiment are World Wide Web sites that are accessible through a network 204 that uses the Internet protocol. One skilled in the art would know that any network protocol could be used to practice the present invention. The use of the Internet, as the network in the preferred embodiment shown here, gives the registry 420 world wide, universal access. The database of the preferred embodiment is an Oracle DBMS. Other DBMS are well known to those skilled in the art of database design and implementation, and other DBMS could be used to implement the present invention.

The administrator 404 has special powers to add new property types and attribute types to the database. If a new type of property becomes publicly available, such as a flying car, the administrator 404 can add the new property type by defining it in the database. The applications (450, 452, and 454) and procedures 440 of this preferred embodiment are written so that they do not have to change when a new property type is added. The administrator 404 can also add new attributes, such as number of propellers, to a new type of property.

Users 402 access the registry 420 to join the registry, to buy marking labels and other merchandise and services, to register items, to report massing items, to report found items, to search for closely matching items, and to print various reports, including an insurance claim report. Financial transactions are handled in a secure manner by the computer rather than by a staff of human workers.

Item Search Method

Figure 5:
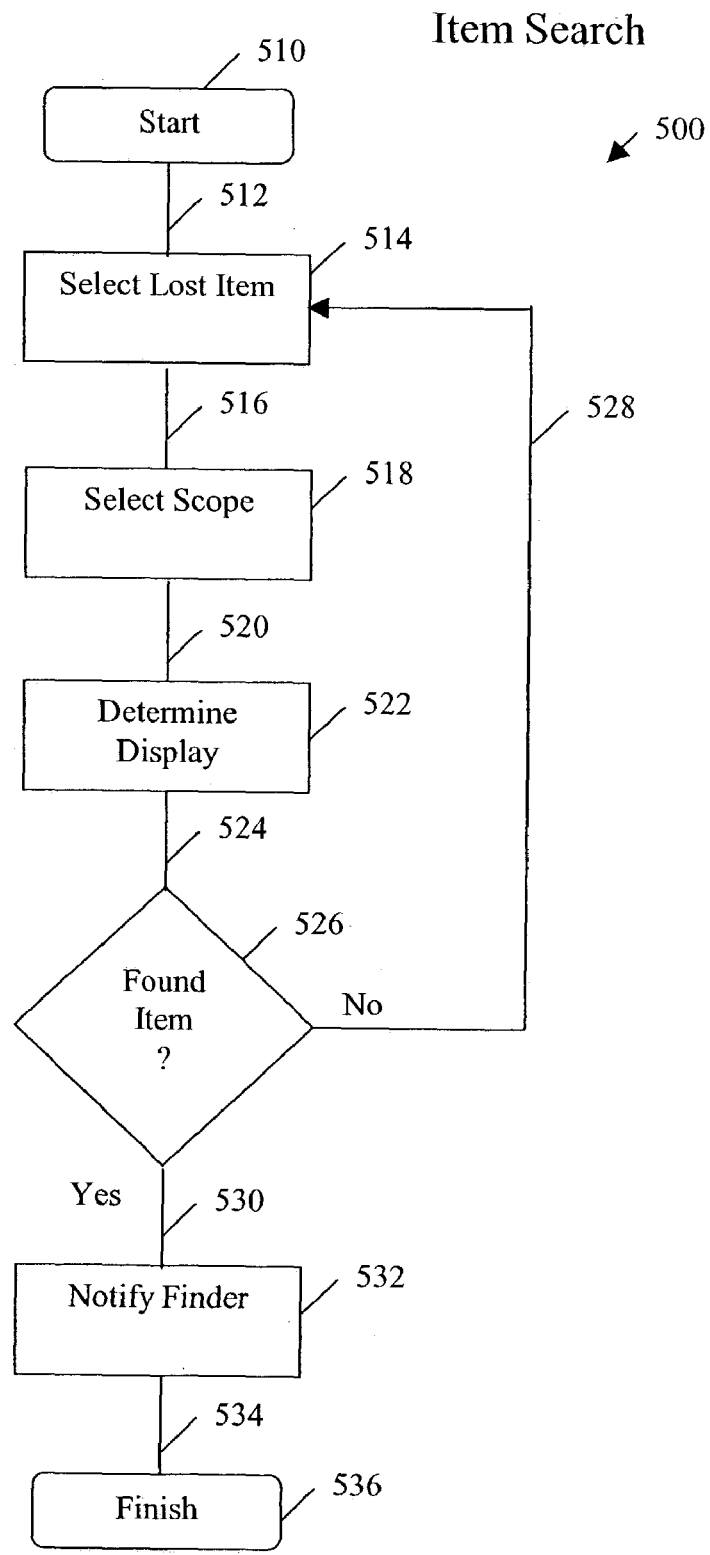
FIG. 5 shows a flow chart of the item search method.

FIG. 5 illustrates the item search method 500. In a preferred embodiment of the present invention, users 402 may initiate a search of the registry 200 to obtain found items 322 that are a close match to the item they have lost. The ability for users 402 to directly search the database 438, without registry personnel effort, is one of the objects and advantages of the present invention. Although the system automatically performs searches on a periodic basis, as will be explained below, users 402 may initiate the close match item search method 500 to find items that cannot be determined automatically with a high degree of certainty.

The item search method 500 starts at the item search entry point 510 via path 512 to the select item step 514. In the select item step 514 the user 402 is presented with a list of items associated with them. The user indicates that one or more items on the list are missing. Flow continues along path 516 to the select scope step 518 where the scope of the search is limited by the attributes the have valid values for the registered item. For example if the owner of the item has specified a color attribute on the registered item 324, then the owner can include color in the scope of the search with the same value as the registered item 324, such as "red". Once the scope is selected, flow continues along path 520 to the determining display step 522 where the database procedure searches the found items 322 and displays information about matching items. In the present invention the results of the search are ordered by the weight, number, and type of attributes that math. The administrator 404 assigns a weight to each attribute that they add for an item type. Certain attributes such as serial number or label number are usually given higher weight than other less distinguishing attributes such as color. Next, flow continues along path 524 to the found item decision 526 where the users 402 can indicate whether or not their items are a match.

If no items are found, or if the user does not believe the search found the right item, flow continues along path 528 where the process repeats through steps 514, 518, and 522 until an item is found.

If the found item 322 appears to be a match to the registered lost item 330, then process flow continues along path 530 to the notify finder step 532 where the finder is notified. Typically email is sent to the finder. Optionally, the user 402 can include more information or questions that will help establish the certainty that their lost item 320 has really be found. This method terminates along path 534 to the item search exit point 536.

If the finder is a law enforcement agency the owner can claim the property and provide law enforcement with more information about the loss. If the finder is a good Samaritan, the owner and finder have several options for arranging for the recovery of the property. The present invention provides a communication path to courier and mailbox services, so that both the owner and the finder can maintain their own privacy and personal security.

If no match is found the user 402 can return to the site and perform another close match search at a later time.

Lost/Found Report Method

Figure 6:
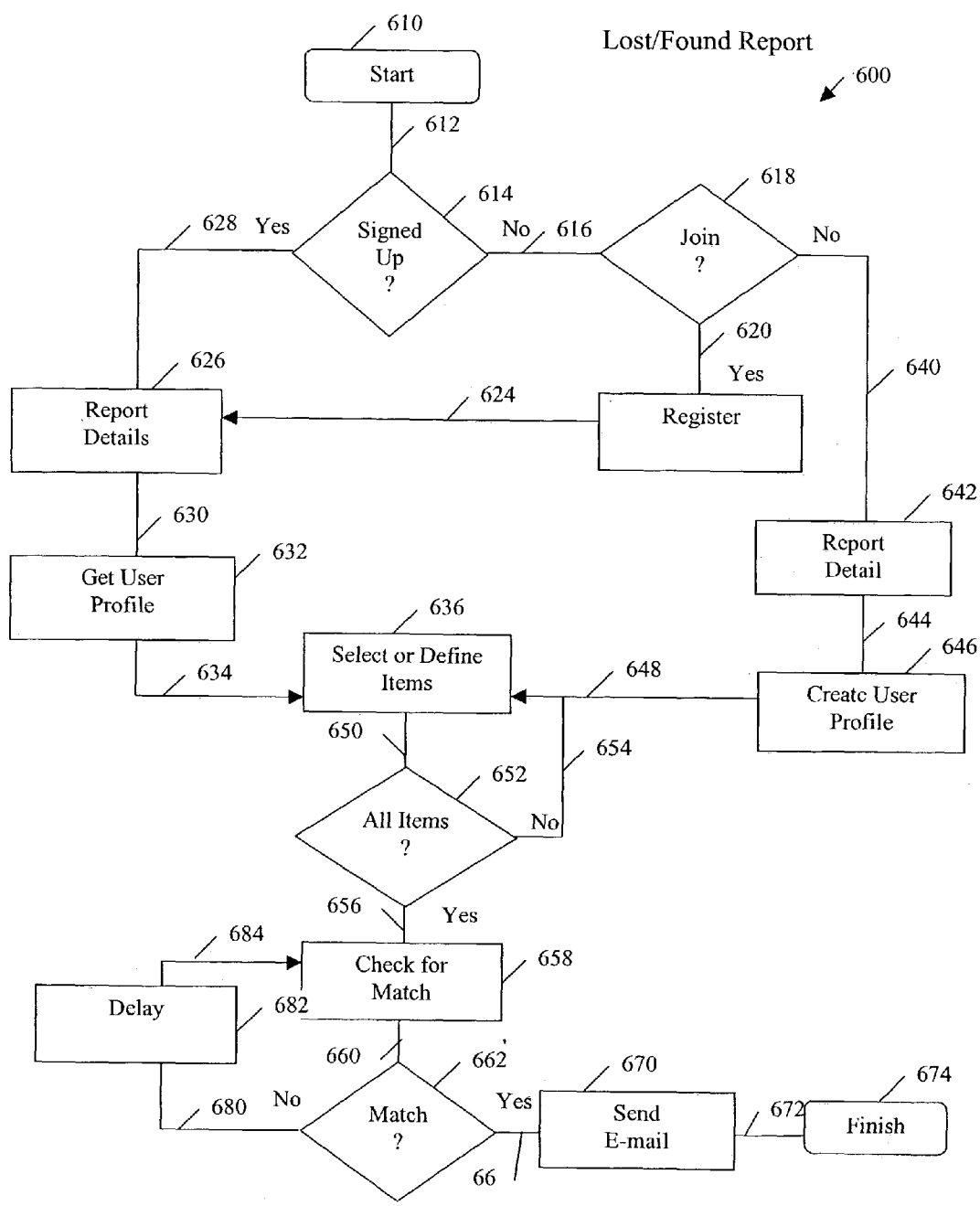
FIG. 6 shows a flow chart of a lost or found report method.

FIG. 6 illustrates the lost/found report method 600. In a preferred embodiment of the present invention, users 402 may report a lost item 320 or report a found item 322. The ability for users 402 to directly report lost or found items to the registry 200, without registry personnel effort, is one of the objects and advantages of the present invention. When a lost item 320 or a found item 322 is reported there may be an immediate certain match. However if there is not an immediate match, the present invention searches registered lost items 330 periodically to determine if a certain match can be determined. The same flow chart is used to show the process of steps for both a lost report and a found report. This method could be implemented with one set of code with minor variations between lost and found, respectively, handling, or it could be implemented as two separate but nearly identical sets of code.

The method starts at entry point 610 and continues along path 612 to the signed up decision where it is determined whether the user 402 is signed up as a member of the registry. If not, flow continues along path 616 to the join decision 618. The non-registered user is given an opportunity to become a full member of the registry. If they want to become a full member flow continues along path 620 to the register step 622 where the user 402 registers as a member and provides information about themselves. In the preferred embodiment, the user also pays the membership fees in this step. Next flow continues along path 624 the registered detail step 626. Also if the user was already registered in the signed up decision 614, flow continues along path 628 the registered detail step 626. In step 626, the user provides information regarding the lost (or found) incident, such as location, date and time. Flow continues along path 630 to the get user profile step 632 where the profile of the registered user is obtained from the database 438 and flow continues along path 634 to the select or define items step 636.

If the user 402 decides not to join (at the join decision 618), they can still register a found item. In this case, flow continues along path 640 to the unregistered details step 642 (which is similar if not identical to the registered details step 626) where the user provides information regarding the found incident, such as location, date and time. Flow continues along path 644 to the create user profile step 646, where the system creates an anonymous user profile. The present invention creates this user profile to track information that may help detect or prove fraud where a thief is using the system to obtain reward money or as a vehicle to gain trust of victims. Next, flow continues along path 648 to the select or define items step 636.

In the step 636, either a registered lost item 330 is selected from a list of registered items or a found item 322 is defined by its attributes. Flow continues along path 650 to the all items decision 652 where the user 402 can indicate that more items need to be selected (or defined). If so, flow continues along path 654 where more items can be selected (or defined).

When all lost or found items have been selected as lost or defined as found, the registry 200 checks for immediate certain matches by continuing along path 656 to the check for match step 658. In step 658, current set of reported found items are compared against the current set of reported missing items.

Flow continues along path 660 to the match decision 662 where the match is confirmed. If a match is made flow continues along path 664 to the send email step 670 where email messages are sent to both the finder and the owner indicating that a matching item has been found. Flow continues along path 672 to the exit point 674.

If no match was made at the match decision 662, then flow continues along path 680 to the delay step 682 where the method delays until the next scheduled time to check for a match. After the specified delay, flow continues along path 684 to the check for match step 658. In the present invention, once an item is reported lost (or found) the registry 200 will continue to search periodically to see if matching item has shown up. These newly reported items also become available for use by the close match search method 500 of FIG. 5.

Property Marking Labels

Figure 7A:
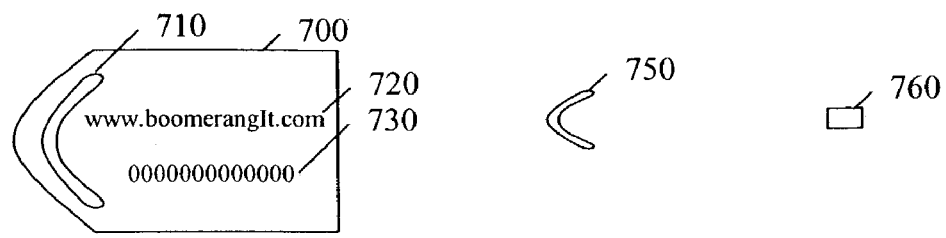
FIG. 7A shows a range of property marking labels.

FIG. 7A illustrates three examples of property marking labels. The standard label 700 is suitable for marking large items such as bicycles, cell phones, computers, paintings, etc. The standard label 700 and the mini-label 750 have a distinctive shape that can be recognized after the label has been removed. These labels can be attached with an adhesive which leaves a distinctive mark when the label is removed (either by leaving a dye, by leaving adhesive, or by etching the surface with a mild acid). The standard label 700 may also contain a stencil 710 consisting of a cutout or varied surface that also leaves a distinctive mark if the label is removed or covered over by another label, paint, or similar substance. The standard label 700 may contain contact text 720, such as the web site address (as a URL) or a telephone number. The mini-label can be attached to keys, eye glasses, and other small items.

The micro-label 760 is so small that it will not normally be noticed. T he micro-label 760 is etched with a microscopic laser so that the text or numbers written on it can only be read-with a magnifying glass. Several micro-labels can be placed on a large object in places that normally would not be checked for markings. For example a micro-label could be placed on each component or board inside a computer, or under the seat or other specific places on a bicycle. A standard label could also be placed on the item as a theft deterrent on as a decoy.

All three labels (700, 750 and 760) may contain an identification which when entered in the registry system will help determine a match with a high degree of certainty. The shape left by the label or the contact text 720 helps finders, either law enforcement or good Samaritans, know to go the registry 200 to report the found item 322 and find the owner.

Third Party Database Access

Figure 7B:
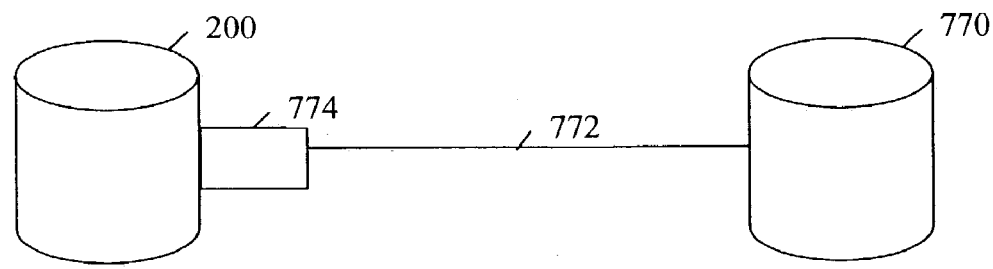
FIG. 7B shows a registry connected to an external database.

FIG. 7B illustrates third party database 770 access to the registry 200 via a third party link 772. Translation between the formats of the two databases (770 and 200) is performed by special third party gateway 774 code typically provided by the registry 200. It is an object and advantage of the present invention to allow the registry to search for matching items based on data found in third party databases 770 as well as registered items 324 found in the database 438.

Examples of third party databases are the FBI, local police departments, manufacturers, the CLETS database, the Department of Justice database, and the National stolen property database. Typically there is a significant mismatch between the attributes stored in the third party database 700 and the attributes stored in the registry 200. The third party gateway 774 is required to overcome this mismatch and to translate between the various protocols and formats.

International/Multilingual Model

Figure 7C:
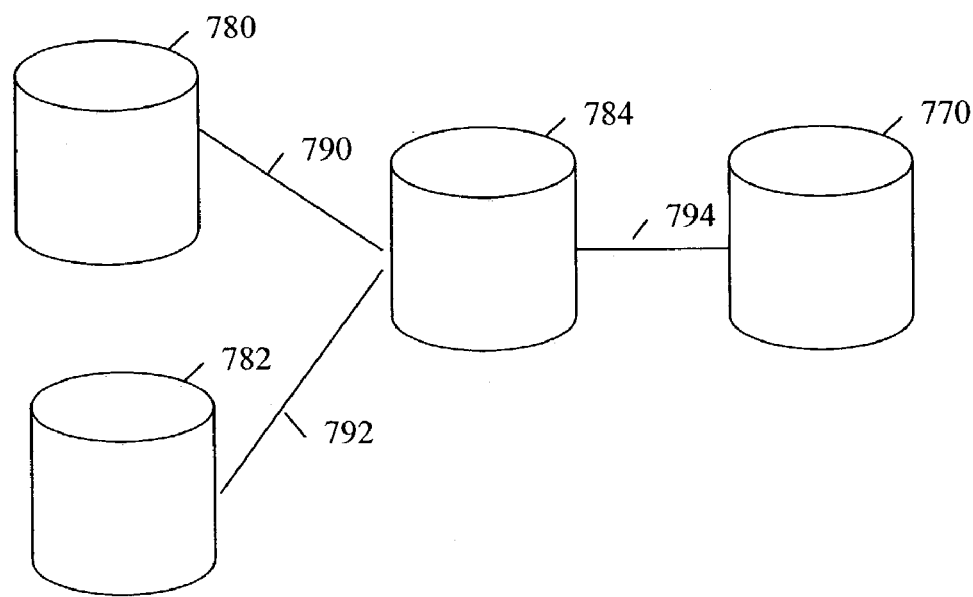
FIG. 7C shows an international registry system.

FIG. 7C illustrates the international/multilingual model of the present invention. The first national database 780 is a registry 200, such as the one shown in FIG. 4, that serves a single nation or locale. The second national database 782 represents another instance of a registry 200 that serves a second nation or local. According to the present invention, both of these database store attribute information in a universal format (discussed below with FIG. 8) so that each country can report and view information in their own language, but can also pass registered lost item 320 and found item 322 information to an international database 784 via a first national link 790 and a second national link 792. The system can have an unlimited number of national or regional databases that are connected to the international database, rather than just the two example database shown in FIG. 7C. The international database 784 could optionally be connected to one or more international third party databases 770 via an international third party link 794.

Examples of international third party database could include Interpol, Scotland Yard, or similar databases. As shown in FIG. 7B the international database 784 registry would need to have a gateway 774 to overcome the protocol and format boundaries between each third party database 770.

In a preferred embodiment of the present invention, the national databases (such as 780 and 782) handle all financial information and secure payment processor 400 interfaces, so that the international database is not burdened with the overhead of currency translation and exchange rates.

International/Multilingual Sub-Schema

Figure 8:
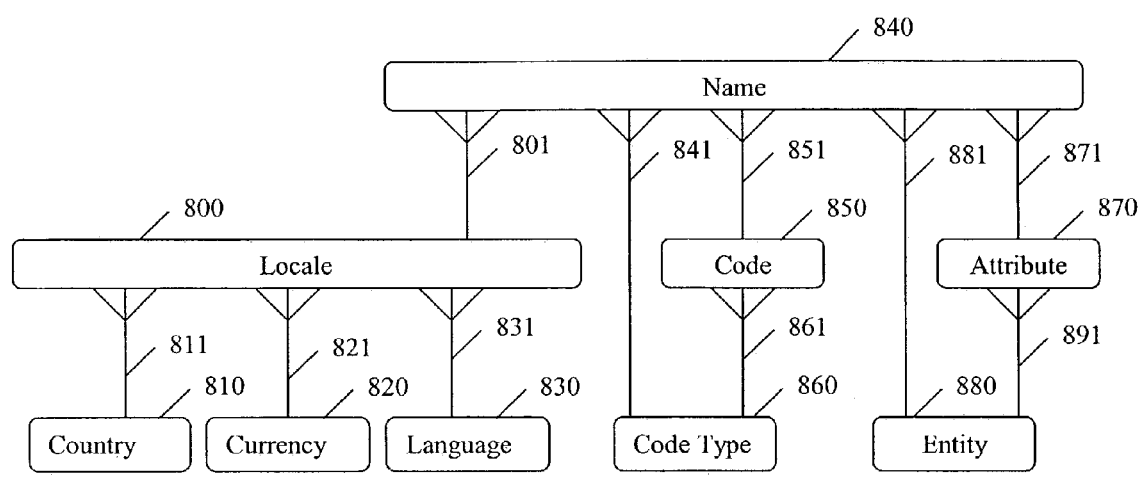
FIG. 8 shows a sub-schema that supports international and multi-language use.
Figure 9A:
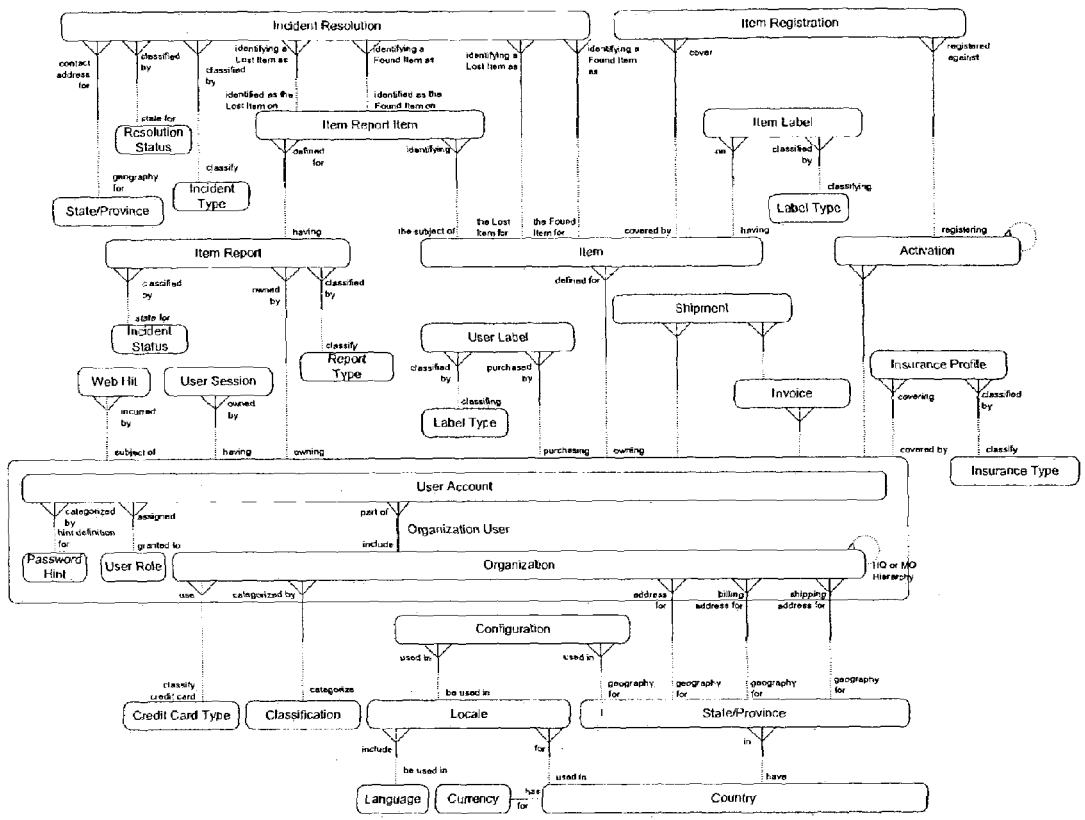
FIG. 9A shows a schema of a preferred embodiment user-organization.
Figure 9B:
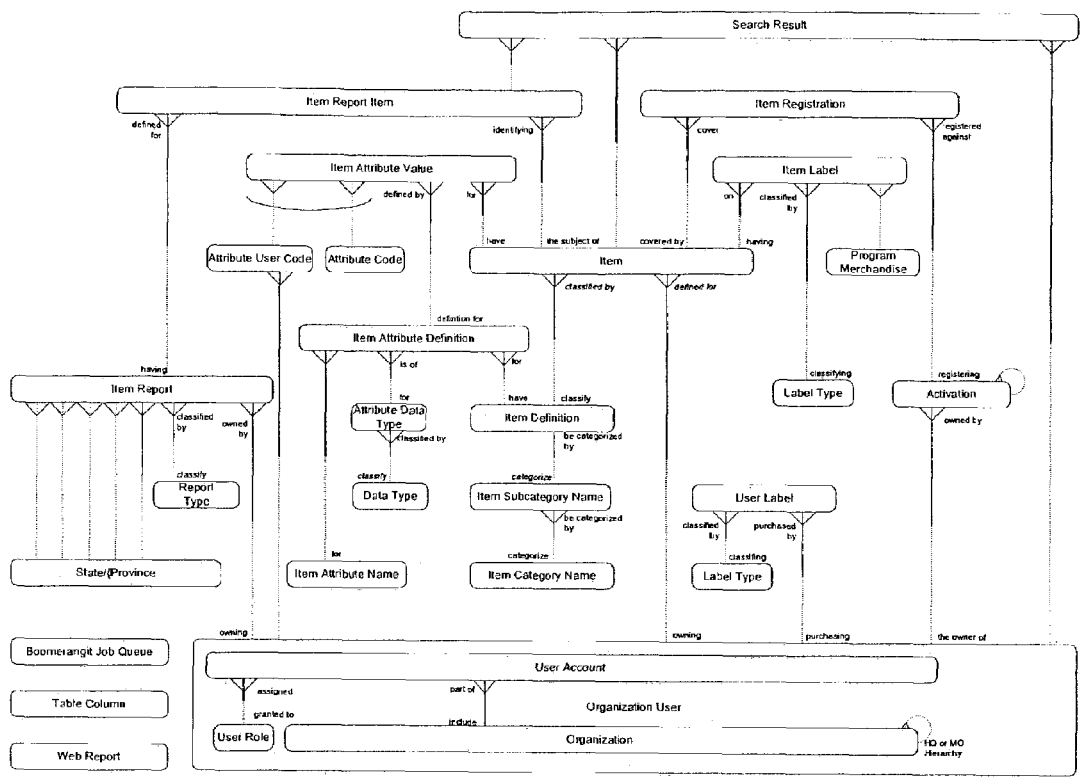
FIG. 9B shows a schema of a preferred embodiment item management.
Figure 9C:
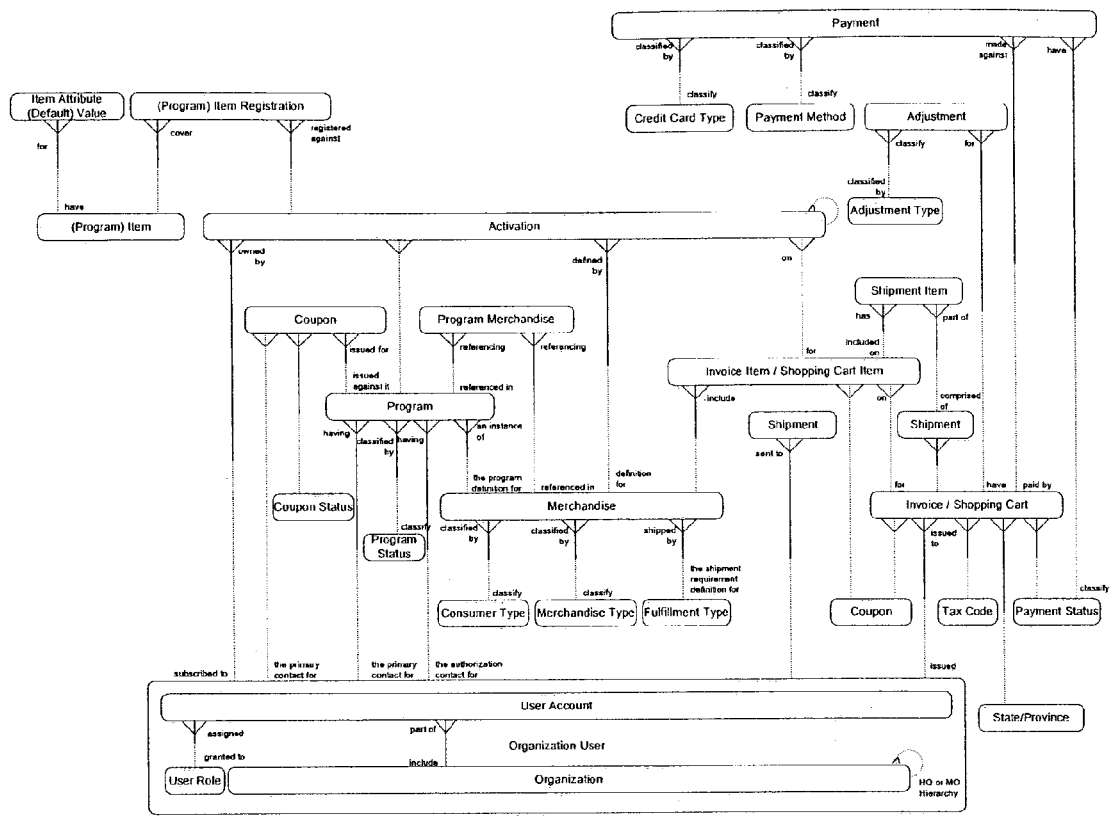
FIG. 9C shows a schema of a preferred embodiment store.
Figure 9D:
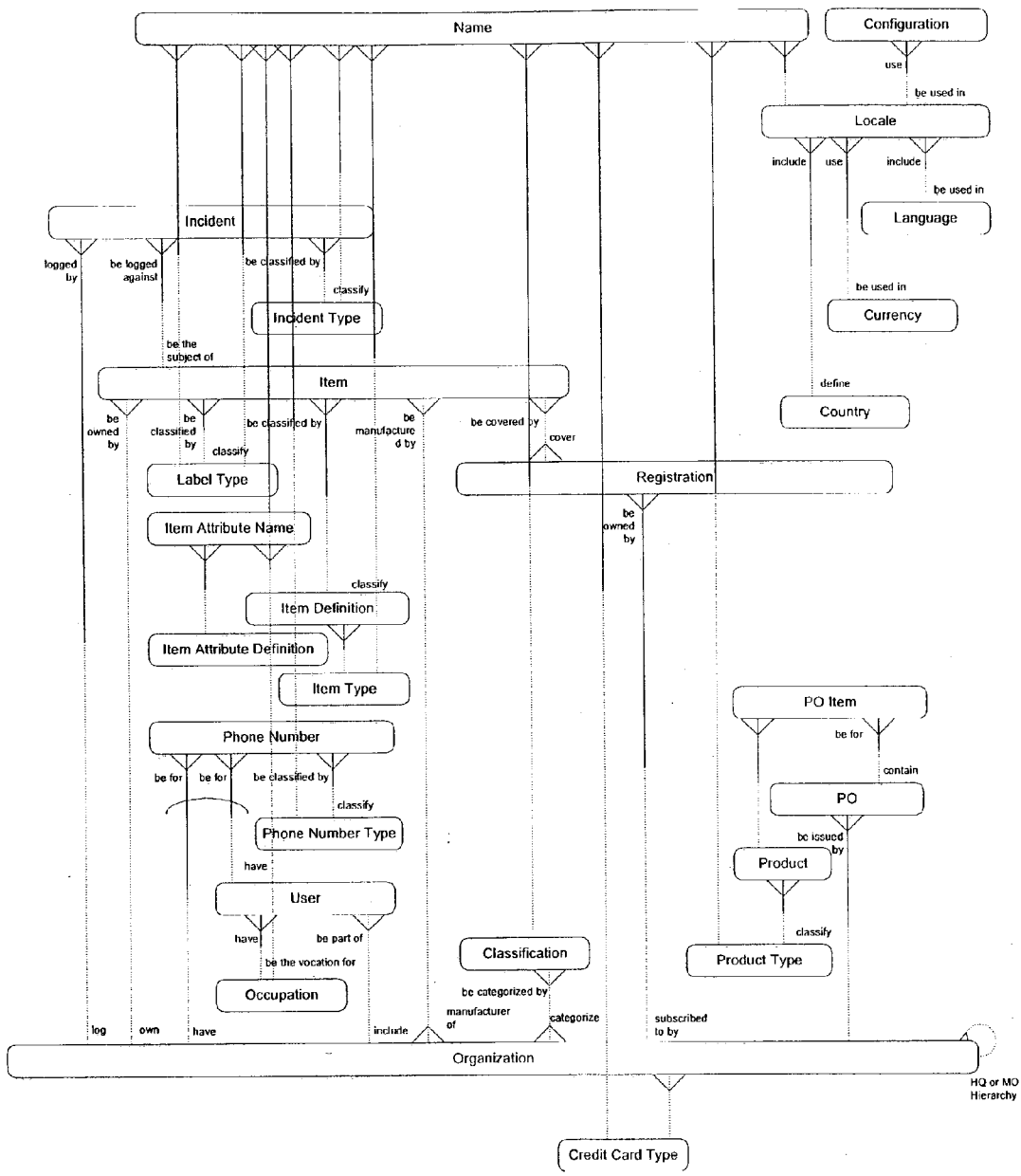
FIG. 9D shows a schema of a preferred embodiment ER model.

FIG. 8 illustrates a subset of the database schema of a preferred embodiment of the present invention. This sub-schema provides the necessary mechanism to support the international/multilingual model shown in FIG. 7C. A locale entity 800 is uniquely identified by a country entity 810, a currency entity 820, and a language entity 830 each of which have a one-to-many relationship to Locale: country relationship 811, currency relationship 821, and language relationship 831, respectively. The name entity 840 is associated to a code type entity 860 and a code entity 850 with a name relationship 841, a code relationship 851, and code type relationship 861. Also associated with the name entity 840 is an attribute entity 870 and an entity 880 which have a name relationship 881, attribute relationship 871 and entity relationship 891.

When a user 402 describes the attributes of an item, they are shown the choices in their own language; however, when the attribute value is stored, it is stored as a universal code as defined in the code entity 850. The locale and the code is used to select the right word out of the name entity 840. For example, in some locales in California, Peru, and Spain a name may be "rojo", in Louisiana, Quebec, and France the name for the same code may be "rouge" and in California, Australia, and England the name for the same code may be "red". The code type is used to distinguish between different code types. Note that attributes and item types (also called "entity") also have names that are translated based on the language of the user 402.

All data stored in the registry 200 is stored as codes. This facilitates support for multiple languages and eases the transmission of data between the national database and international database 794 as shown in FIG. 7C.

To add support for an new language, the registry administrator 404 simply loads a new list of translated names corresponding to the existing codes.

One example of the advantage of this approach is that a United States business traveler who loses something in France can report the item lost in English and the French-speaking finder can entered it found in French. On a periodic basis item information for both the lost report and the found report are transferred to the international database 784 which performs international matching similar to that disclosed in FIG. 5. Both the finder and the owner will be notified.

Schema of a Preferred Embodiment

FIGS. 9A-9D illustrate the full schema of the best mode preferred embodiment. Note that in FIGS. 9A-9D the Individual Entity 300 is entitled "User Account", the Property Entity 302 is entitled "Item", and the Organization Entity 304 is entitled "Organization"

One skilled in the art of database design and programming and in the art of asset tracking when enabled by the rest of the disclosures in these specifications would be able to implement the present invention without undue experimentation. It is also understood that variations to this schema could be made and the resulting registry would still provide the objectives and advantages of the present invention.

Figure 10A:
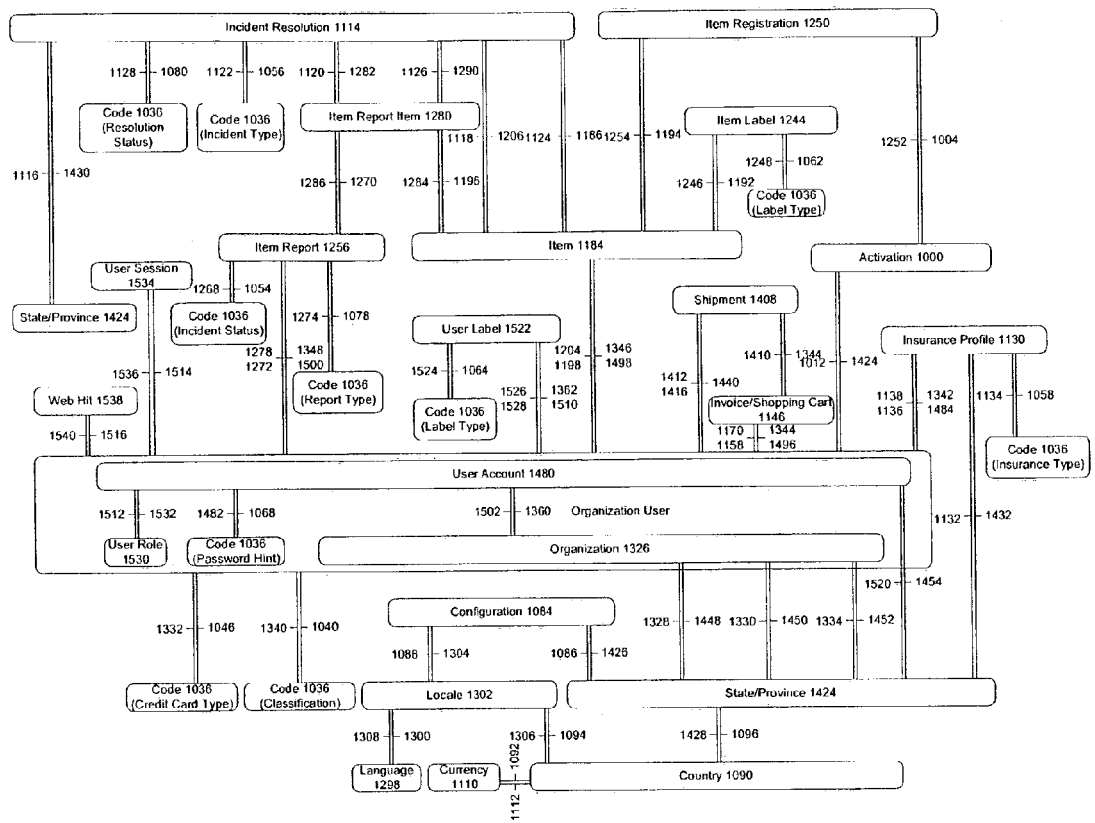
FIGS. 10A-10C are sections of FIGS. 9A-9D including figure labels.
Figure 10B:
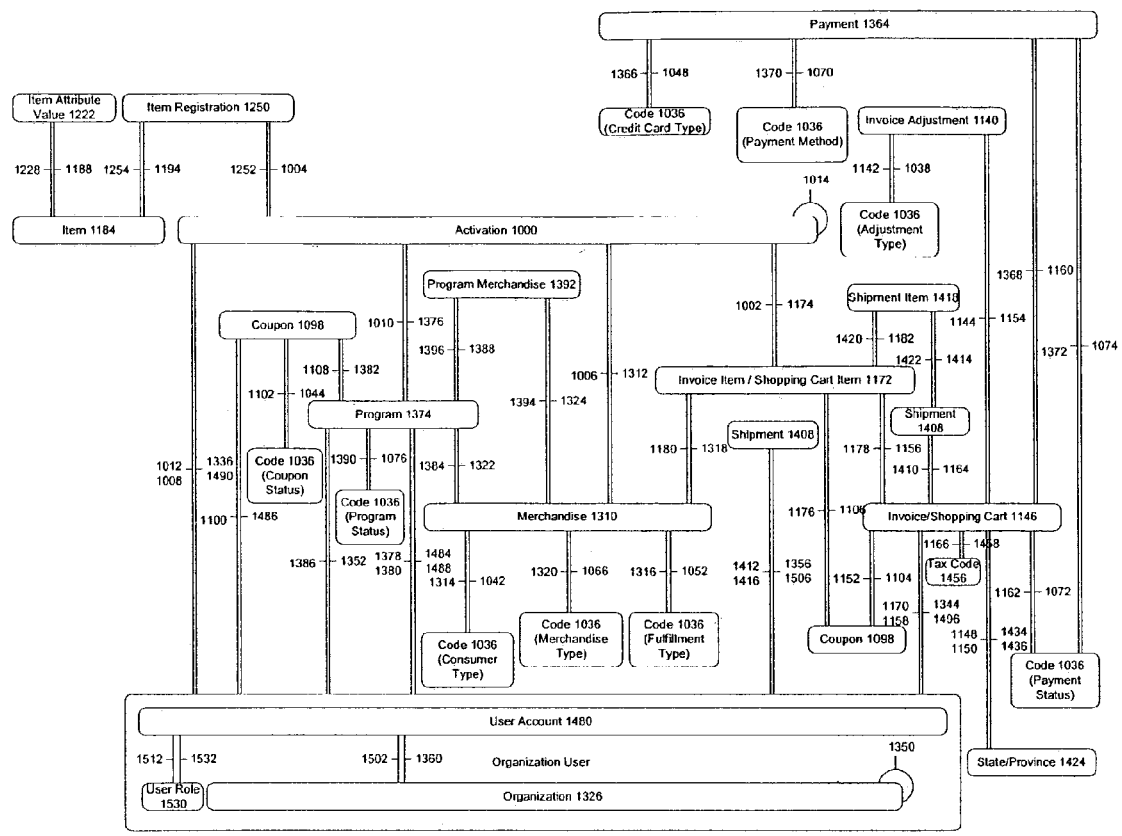
Figure 10C:
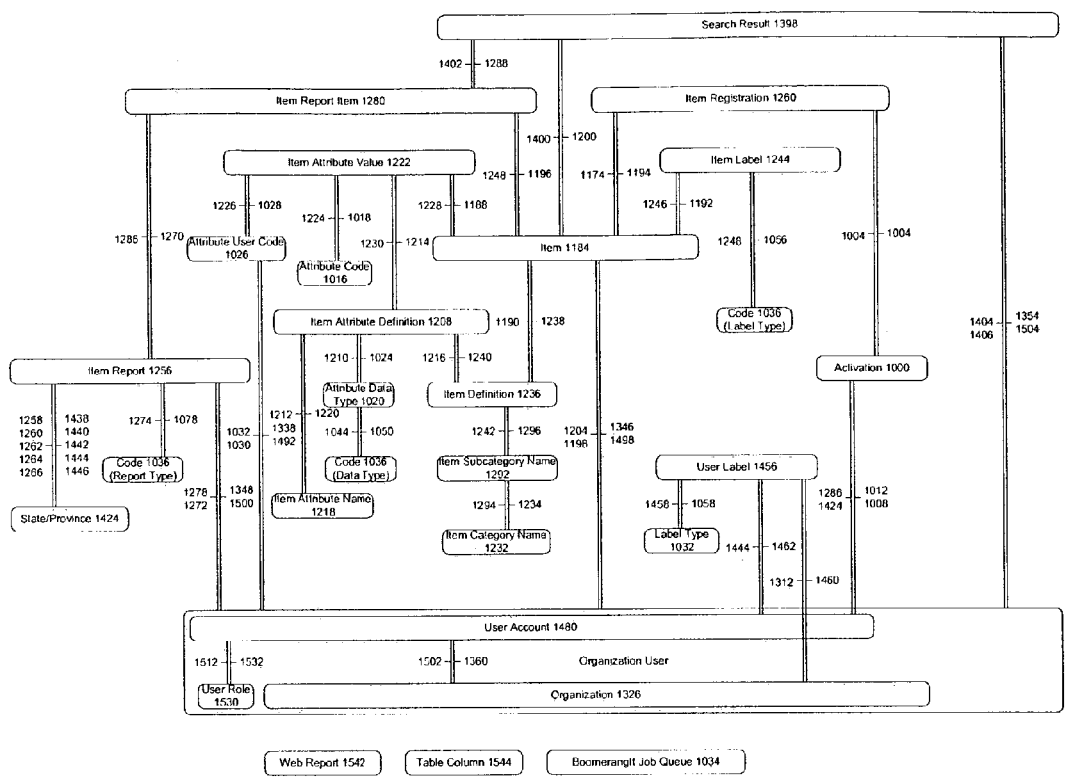

FIGS. 10A-10C illustrate in further detail the schema of this embodiment. Such an embodiment may be used as an underlying platform for a web-based system, further illustrated in the screenshots of FIGS. 19-29. As shown in FIGS. 10A-10C the system may include the following entities and relationships, some of which are optional:

Activation 1000

This entity manages the actual activations of the services (including registrations and programs) that are subscribed, bought and paid for. It has a relationship to the organization because it is the organization (even for individuals) that maintains all of the billing information. Activation 1000 has the following relationships:

The Activation/Invoice/Shopping Cart Item relationship 1002 specifies that "Each and every Activation must be included on one and only one Invoice/Shopping Cart Item."

The Activation/Item Registration relationship 1004 specifies that "Each and every Activation may be registering one or more Item Registrations."

The Activation/Merchandise relationship 1006 specifies that "Each and every Activation must be for one and only one Merchandise."

The Activation/Organization relationship 1008 specifies that "Each and every Activation must be subscriber to by one and only one Organization."

The Activation/Program relationship 1010 specifies that "Each and every Activation must be the activation of one and only one Program."

The Activation/User Account relationship 1012 specifies that "Each and every Activation must be subscriber to by one and only one User Account."

The Program Activation/Reference Activation relationship 1014 specifies that "Each and every Program Activation may be the source of one or more Reference Activations."

Attribute Code 1016

This entity manages the pre-defined values for item attributes that are constrained by code values. These include: Manufacturer, Supplier, etc. Attribute Code 1016 has the following relationships:

The Attribute Code/Item Attribute Value relationship 1018 specifies that "Each and every Attribute Code may be used to define the value of one or more Item Attribute Values."

Attribute Data Type 1020

This entity manages the data type definition for use with the item attributes. These definitions include data to perform physical data manipulation (inserts/updates) and HTML (display) parameters. Attribute Data Type 1020 has the following relationships:

The Attribute Data Type/Data Type relationship 1022 specifies that "Each and every Attribute Data Type must be classified by one and only one Data Type."

The Attribute Data Type/Item Attribute Definition relationship 1024 specifies that "Each and every Attribute Data Type may be specifying the data characteristics for one or more Item Attribute Definitions."

Attribute User Code 1026

This entity manages "other" values for the drop-down item attributes that are not contained in the list (Attribute Code table). These values are entered by by the User in the "other: field and are added to drop down list box for future use. These values may be added into the Attribute Code table for everyone to use. Attribute User Code 1026 has the following relationships:

The Attribute User Code/Item Attribute Value relationship 1028 specifies that "Each and every Attribute User Code may be used to define the value of one or more Item Attribute Values."

The Attribute User Code/Organization relationship 1030 specifies that "Each and every Attribute User Code must be entered by one and only one Organization."

The Attribute User Code/User Account relationship 1032 specifies that "Each and every Attribute User Code must be entered by one and only one User Account."

BoomerangIt Job Queue 1034

This entity manages the BoomerangIt job queue entries in the Oracle kernal using DBMS_JOB. BoomerangIt Job Queue 1034 has no relationships.

Code 1036

This entity manages entities that do not warrant having their own database tables. These values will be constrained through the use of drop down list boxes. Some examples may include: credit card type, payment type, etc. Code 1036 has the following relationships:

The Adjustment Type/Invoice Adjustment relationship 1038 specifies that "Each and every Adjustment Type may be the classification for one or more Invoice Adjustments."

The Classification/Organization relationship 1040 specifies that "Each and every Classification may be the categorization for one or more Organizations."

The Consumer Type/Merchandise relationship 1042 specifies that "Each and every Consumer Type may be the target market definition for one or more Merchandises."

The Coupon Status/Coupon relationship 1044 specifies that "Each and every Coupon Status may be the state definition for one or more Coupons."

The Credit Card Type/Organization's Credit Card relationship 1046 specifies that "Each and every Credit Card Type may be the classification for one or more Organization's Credit Cards."

The Credit Card Type/Payment relationship 1048 specifies that "Each and every Credit Card Type may be the credit card name for one or more Payments."

The Data Type/Attribute Data Type relationship 1050 specifies that "Each and every Data Type may be the classification for one or more Attribute Data Types."

The Fulfillment Type/Merchandise relationship 1052 specifies that "Each and every Fulfillment Type may be the shipment requirement definition for one or more Merchandises."

The Incident Status/Item Report relationship 1054 specifies that "Each and every Incident Status may be the state definition for one or more Item Reports."

The Incident Type/Incident Resolution relationship 1056 specifies that "Each and every Incident Type may be the classification for one or more Incident Resolutions."

The Insurance Type/Insurance Profile relationship 1058 specifies that "Each and every Insurance Type may be the type of policy for one or more Insurance Profiles."

The Label Type/Item Label relationship 1062 specifies that "Each and every Label Type may be the classification for one or more Item Labels."

The Label Type/User Label relationship 1064 specifies that "Each and every Label Type may be the classification for one or more User Labels."

The Merchandise Type/Merchandise relationship 1066 specifies that "Each and every Merchandise Type may be the categorization for one or more Merchandises."

The Password Hint/Account Password relationship 1068 specifies that "Each and every Password Hint may be the hint definition option for one or more Account Passwords."

The Payment Method/Payment relationship 1070 specifies that "Each and every Payment Method may be the payment specification for one or more Payments."

The Payment Status/Invoice/Shopping Cart relationship 1072 specifies that "Each and every Payment Status may be the state definition for one or more Invoice/Shopping Carts."

The Payment Status/Payment relationship 1074 specifies that "Each and every Payment Status may be the state definition for one or more Payments."

The Program Status/Program relationship 1076 specifies that "Each and every Program Status may be the state definition for one or more Programs."

The Report Type/Item Report relationship 1078 specifies that "Each and every Report Type may be the classification for one or more Item Reports."

The Resolution Status/Incident Resolution relationship 1080 specifies that "Each and every Resolution Status may be the state definition for one or more Incident Resolutions."

Configuration 1084

This entity manages the configuration for the current BoomerangIt database implementation. There may be a different database implementation per country. Parameters such as name, address, currency and locale are managed here. There will be only one record per database implementation in this entity. Configuration 1084 has the following relationships:

The Configuration's Address/State/Province relationship 1086 specifies that "Each and every Configuration's Address may be located in one and only one State/Province."

The Configuration/Locale relationship 1088 specifies that "Each and every Configuration must be defined with one and only one Locale."

Country 1090

This entity manages countries. It contains industry standard countries and codes that represent them. Country 1090 has the following relationships:

The Country/Currency relationship 1092 specifies that "Each and every Country may be tendering financial transactions in one or more Currencies."

The Country/Locale relationship 1094 specifies that "Each and every Country may be part of the specification for one or more Locales."

The Country/State/Province relationship 1096 specifies that "Each and every Country may be divided into one or more State/Provinces."

Coupon 1098

This entity manages the details of the Discount Coupon for the Program. Coupon 1098 has the following relationships:

The Coupon/Contact relationship 1100 specifies that "Each and every Coupon may be defined with one and only one Contact."

The Coupon/Coupon Status relationship 1102 specifies that "Each and every Coupon must be issued with one and only one Coupon Status."

The Coupon/Invoice/Shopping Cart relationship 1104 specifies that "Each and every Coupon may be the discount for one or more Invoice/Shopping Carts."

The Coupon/Invoice/Shopping Cart Item relationship 1106 specifies that "Each and every Coupon may be used on one or more Invoice/Shopping Cart Items."

The Coupon/Program relationship 1108 specifies that "Each and every Coupon must be issued for one and only one Program."

Currency 1110

This entity manages currencies. It contains the industry standard name and symbol for each currency. Currency 1110 has the following relationships:

The Currency/Country relationship 1112 specifies that "Each and every Currency must be the legal tender for one and only one Country."

Incident Resolution 1114

This entity manages the incident resolution results in the system. This table is used to store the results of a specific matched Lost and Found item and to present the results to the BoomerangIt Administrator, Finder or Owner of the item. Incident Resolution 1114 has the following relationships:

The Incident Resolution's Contact Address/State/Province relationship 1116 specifies that "Each and every Incident Resolution's Contact Address may be located in one and only one State/Province."

The Incident Resolution/Found Item relationship 1118 specifies that "Each and every Incident Resolution must be identifying a found item as one and only one Found Item."

The Incident Resolution/Found Item Report Item relationship 1120 specifies that "Each and every Incident Resolution must be identifying a found item as one and only one Found Item Report Item."

The Incident Resolution/Incident Type relationship 1122 specifies that "Each and every Incident Resolution must be classified by one and only one Incident Type."

The Incident Resolution/Lost Item relationship 1124 specifies that "Each and every Incident Resolution must be identifying a lost item as one and only one Lost Item."

The Incident Resolution/Lost Item Report Item relationship 1126 specifies that "Each and every Incident Resolution must be identifying a lost item as one and only one Lost Item Report Item."

The Incident Resolution/Resolution Status relationship 1128 specifies that "Each and every Incident Resolution must be defined with one and only one Resolution Status."

Insurance Profile 1130

This entity manages insurance profiles for the users of the system. Insurance Profile 1130 has the following relationships:

The Insurance Broker Address/State/Province relationship 1132 specifies that "Each and every Insurance Broker Address may be located in one and only one State/Province."

The Insurance Profile/Insurance Type relationship 1134 specifies that "Each and every Insurance Profile must be categorized by one and only one Insurance Type."

The Insurance Profile/Organization relationship 1136 specifies that "Each and every Insurance Profile must be covering one and only one Organization."

The Insurance Profile/User Account relationship 1138 specifies that "Each and every Insurance Profile must be covering one and only one User Account."

Invoice Adjustment 1140

This entity manages invoice adjustments. Invoice Adjustment 1140 has the following relationships:

The Invoice Adjustment/Adjustment Type relationship 1142 specifies that "Each and every Invoice Adjustment must be classified by one and only one Adjustment Type."

The Invoice Adjustment/Invoice/Shopping Cart relationship 1144 specifies that "Each and every Invoice Adjustment must be applied against one and only one Invoice/Shopping Cart."

Invoice/Shopping Cart 1146

This entity manages any accounts receivable activity in the system whether paid for immediately, by credit card, or paid after a statement is issued. All payment activities are made through the invoice entity.

This entity is used for both shopping carts and invoices. At the time of purchase, the contents of the shopping cart remain in place and automatically get converted to an invoice. This is done for efficiency since both entities contain the same information.

This entity manages the shopping cart for each shopper. In one embodiment, only registered users can shop. Defaults (pay by credit card and billing/shipping address) are obtained from the Organization entity. Finalizing the Order will result in the generation of an Invoice. Once the payments have been successfully processed, the Invoice is generated, the required products and services are created in the database for the Organization and the order is cleared and order items are deleted.

All Shopping Carts remain persistent, so that any given users shopping cart will always remain on the system once created.

Invoices will be generated for any combination of registrations, transactions and product purchases. The payment status of the last activity and the payment terms are denormalized at the invoice level for convenience. Invoice/Shopping Cart 1146 has the following relationships:

The Invoice/Shopping Cart's Billing Address/State/Province relationship 1148 specifies that "Each and every Invoice/Shopping Cart's Billing Address may be located in one and only one State/Province."

The Invoice/Shopping Cart's Shipping Address/State/Province relationship 1150 specifies that "Each and every Invoice/Shopping Cart's Shipping Address may be located in one and only one State/Province."

The Invoice/Shopping Cart/Coupon relationship 1152 specifies that "Each and every Invoice/Shopping Cart may be discounted by one and only one Coupon."

The Invoice/Shopping Cart/Invoice Adjustment relationship 1154 specifies that "Each and every Invoice/Shopping Cart may be the subject of one or more Invoice Adjustments."

The Invoice/Shopping Cart/Invoice/Shopping Cart Item relationship 1156 specifies that "Each and every Invoice/Shopping Cart may be comprised of one or more Invoice/Shopping Cart Items."

The Invoice/Shopping Cart/Organization relationship 1158 specifies that "Each and every Invoice/Shopping Cart must be issued to one and only one Organization."

The Invoice/Shopping Cart/Payment relationship 1160 specifies that "Each and every Invoice/Shopping Cart may be paid by one or more Payments."

The Invoice/Shopping Cart/Payment Status relationship 1162 specifies that "Each and every Invoice/Shopping Cart must be issued with one and only one Payment Status."

The Invoice/Shopping Cart/Shipment relationship 1164 specifies that "Each and every Invoice/Shopping Cart may be fulfilled by one or more Shipments."

The Invoice/Shopping Cart/Tax Code relationship 1166 specifies that "Each and every Invoice/Shopping Cart may be the subject of a sales tax by one and only one Tax Code."

The Invoice/Shopping Cart/User Account relationship 1170 specifies that "Each and every Invoice/Shopping Cart must be issued to one and only one User Account."

Invoice/Shopping Cart Item 1172

This entity manages the Items for an Invoice/Shopping Cart. Invoice/Shopping Cart Item 1172 has the following relationships:

The Invoice/Shopping Cart Item/Activation relationship 1174 specifies that "Each and every Invoice/Shopping Cart Item may be the item that includes one or more Activations."

The Invoice/Shopping Cart Item/Coupon relationship 1176 specifies that "Each and every Invoice/Shopping Cart Item may be using one and only one Coupon."

The Invoice/Shopping Cart Item/Invoice/Shopping Cart relationship 1178 specifies that "Each and every Invoice/Shopping Cart Item must be part of one and only one Invoice/Shopping Cart."

The Invoice/Shopping Cart Item/Merchandise relationship 1180 specifies that "Each and every Invoice/Shopping Cart Item must be an invoice entry for one and only one Merchandise."

The Invoice/Shopping Cart Item/Shipment Item relationship 1182 specifies that "Each and every Invoice/Shopping Cart Item may be fulfilled by one or more Shipment Items."

Item 1184

This entity manages items (lost, found, registered etc.) in the system. Items are defined using the Item Definition entity. Item 1184 has the following relationships:

The Found Item/Incident Resolution relationship 1186 specifies that "Each and every Found Item may be identified as a found item in one or more Incident Resolutions."

The Item/Item Attribute Value relationship 1188 specifies that "Each and every Item must be defined by one or more Item Attribute Values."

The Item/Item Definition relationship 1190 specifies that "Each and every Item must be classified by one and only one Item Definition."

The Item/Item Label relationship 1192 specifies that "Each and every Item may be identified with one or more Item Labels."

The Item/Item Registration relationship 1194 specifies that "Each and every Item may be covered by one or more Item Registrations."

The Item/Item Report Item relationship 1196 specifies that "Each and every Item may be the subject of one or more Item Report Items."

The Item/Organization relationship 1198 specifies that "Each and every Item must be entered by one and only one Organization."

The Item/Search Result relationship 1200 specifies that "Each and every Item may be the subject of one or more Search Results."

The Item/User Account relationship 1204 specifies that "Each and every Item must be entered by one and only one User Account."

The Lost Item/Incident Resolution relationship 1206 specifies that "Each and every Lost Item may be identified as a lost item in one or more Incident Resolutions."

Item Attribute Definition 1208

This entity manages the item attribute definitions. This includes correlating a name with a column in the item table. Item Attribute Definition 1208 has the following relationships:

The Item Attribute Definition/Attribute Data Type relationship 1210 specifies that "Each and every Item Attribute Definition must be categorized by one and only one Attribute Data Type."

The Item Attribute Definition/Item Attribute Name relationship 1212 specifies that "Each and every Item Attribute Definition must be identified by one and only one Item Attribute Name."

The Item Attribute Definition/item Attribute Value relationship 1214 specifies that "Each and every Item Attribute Definition may be used to define the type of one or more Item Attribute Values."

The Item Attribute Definition/Item Definition relationship 1216 specifies that "Each and every Item Attribute Definition may be for one and only one Item Definition."

Item Attribute Name 1218

This entity manages the item attribute name definitions. A separate entity is required to facilitate multiple languages. Item Attribute Name 1218 has the following relationships:

The Item Attribute Name/Item Attribute Definition relationship 1220 specifies that "Each and every Item Attribute Name may be having one or more Item Attribute Definitions."

Item Attribute Value 1222

This entity manages item attributes values in the system. Records only exist if the attribute actually has a value for the given item. Item Attribute Value 1222 has the following relationships:

The Item Attribute Value/Attribute Code relationship 1224 specifies that "Each and every Item Attribute Value may be utilizing one and only one Attribute Code."

The Item Attribute Value/Attribute User Code relationship 1226 specifies that "Each and every Item Attribute Value may be utilizing one and only one Attribute User Code."

The Item Attribute Value/Item relationship 1228 specifies that "Each and every Item Attribute Value must be specifying the value of an attribute one and only one Item."

The Item Attribute Value/Item Attribute Definition relationship 1230 specifies that "Each and every Item Attribute Value must be the definition for one and only one Item Attribute Definition."

Item Category Name 1232

This entity manages the item category name definitions. A separate entity is required to facilitate multiple languages. Item Category Name 1232 has the following relationships:

The Item Category Name/Item Subcategory Name relationship 1234 specifies that "Each and every Item Category Name may be the classification for one or more Item Subcategory Names."

Item Definition 1236

This entity manages the item definitions. This includes the supported items (bicycles, cars etc.) and the attributes for each item type. Item Definition 1236 has the following relationships:

The Item Definition/Item relationship 1238 specifies that "Each and every Item Definition may be classifying the type for one or more Items."

The Item Definition/Item Attribute Definition relationship 1240 specifies that "Each and every Item Definition may be having one or more Item Attribute Definitions."

The Item Definition/item Subcategory Name relationship 1242 specifies that "Each and every Item Definition must be classified by one and only one Item Subcategory Name."

Item Label 1244

This entity manages the labels placed on registered items. The different labels are defined by the label type. Item Label 1244 has the following relationships:

The Item Label/Item relationship 1246 specifies that "Each and every Item Label must be applied on one and only one Item."

The Item Label/Label Type relationship 1248 specifies that "Each and every Item Label must be classified by one and only one Label Type."

Item Registration 1250

This entity manages the many to many relationship between the Item and the Activation (Registration) entity. If the activation is for a User Registration service, then the Item is a user's item and is consuming one of his available registrations. If the registration is for a Business-to-Business (B2B) Program, then the item is the Organizations item that is eligible in the program, including default parameters. Item Registration 1250 has the following relationships:

The Item Registration/Activation relationship 1252 specifies that "Each and every Item Registration must be registered against one and only one Activation."

The Item Registration/Item relationship 1254 specifies that "Each and every Item Registration must be cover one and only one Item."

Item Report 1256

This entity manages all of the reports defined by the users. These reports are controlled by report type and include lost, found, custom etc. A report is synonymous with an actual physical report. Item Report 1256 has the following relationships:

The Item Report's Incident Address/State/Province relationship 1258 specifies that "Each and every Item Report's Incident Address may be located in one and only one State/Province."

The Item Report's Insurance Broker Address/State/Province relationship 1260 specifies that "Each and every Item Report's Insurance Broker Address may be located in one and only one State/Province."

The Item Report's Police Address/State/Province relationship 1262 specifies that "Each and every Item Report's Police Address may be located in one and only one State/Province."

The Item Report's User Address/State/Province relationship 1264 specifies that "Each and every Item Report's User Address may be located in one and only one State/Province."

The Item Report's Witness Address/State/Province relationship 1266 specifies that "Each and every Item Report's Witness Address may be located in one and only one State/Province."

The Item Report/Incident Status relationship 1268 specifies that "Each and every Item Report may be filed with one and only one Incident Status."

The Item Report/Item Report Item relationship 1270 specifies that "Each and every Item Report may be the document for one or more Item Report Items."

The Item Report/Organization relationship 1272 specifies that "Each and every Item Report must be filed by one and only one Organization."

The Item Report/Report Type relationship 1274 specifies that "Each and every Item Report must be classified by one and only one Report Type."

The Item Report/User Account relationship 1278 specifies that "Each and every Item Report must be filed by one and only one User Account."

Item Report Item 1280

This entity manages the items that appear on an item report. Each report must have at least one item. An item can appear on multiple reports. Item Report Item 1280 has the following relationships:

The Found Item Report Item/incident Resolution relationship 1282 specifies that "Each and every Found Item Report Item may be identified as a found item in one or more Incident Resolutions."

The Item Report Item/item relationship 1284 specifies that "Each and every Item Report Item must be the reference for one and only one Item."

The Item Report Item/item Report relationship 1286 specifies that "Each and every Item Report Item must be the subject of one and only one Item Report."

The Item Report Item/Search Result relationship 1288 specifies that "Each and every Item Report Item may be identifying a found item as one or more Search Results."

The Lost Item Report Item/Incident Resolution relationship 1290 specifies that "Each and every Lost Item Report Item may be identified as a lost item in one or more Incident Resolutions."

Item Subcategory Name 1292

This entity manages the item subcategory name definitions. A separate entity is required to facilitate multiple languages. Item Subcategory Name 1292 has the following relationships:

The Item Subcategory Name/Item Category Name relationship 1294 specifies that "Each and every Item Subcategory Name must be classified by one and only one Item Category Name."

The Item Subcategory Name/Item Definition relationship 1296 specifies that "Each and every Item Subcategory Name may be the classification for one or more Item Definitions."

Language 1298

This entity manages languages. It contains industry standard languages and codes. Language 1298 has the following relationships:

The Language/Locale relationship 1300 specifies that "Each and every Language may be part of the specification for one or more Locales."

Locale 1302

This entity manages locales which are combinations of countries and languages. It contains industry standard locales and codes. Locale 1302 has the following relationships:

The Locale/ConFigureuration relationship 1304 specifies that "Each and every Locale may be the default language specification for one or more configuration."

The Locale/Country relationship 1306 specifies that "Each and every Locale must be include one and only one Country."

The Locale/Language relationship 1308 specifies that "Each and every Locale must be include one and only one Language."

Merchandise 1310

This entity manages the definition of the different products, services and programs available to the public and to businesses in the BoomerangIt.com store. Programs and Services include B2B Programs and consumer Services (item registrations). Products can be labels, pens, stencils, T-shirts etc. A Program is an approved B2B BoomerangIt service for an organization. Merchandise 1310 has the following relationships:

The Merchandise/Activation relationship 1312 specifies that "Each and every Merchandise may be the subject of one or more Activations."

The Merchandise/Consumer Type relationship 1314 specifies that "Each and every Merchandise must be categorized by one and only one ConsumerType."

The Merchandise/Fulfillment Type relationship 1316 specifies that "Each and every Merchandise must be shipped by one and only one Fulfillment Type."

The Merchandise/Invoice/Shopping Cart Item relationship 1318 specifies that "Each and every Merchandise may be referenced in one or more Invoice/Shopping Cart Items."

The Merchandise/Merchandise Type relationship 1320 specifies that "Each and every Merchandise must be categorized by one and only one Merchandise Type."

The Merchandise/Program relationship 1322 specifies that "Each and every Merchandise may be the program definition for one or more Programs."

The Merchandise/Program Merchandise relationship 1324 specifies that "Each and every Merchandise may be referenced in one or more Program Merchandises."

Organization 1326

This entity manages individuals, families, couples, agencies (CIA), fire departments, manufacturers, IBD etc. Essentially every entity identified by the Classification. It contains the primary contact information and billing information. Each organization must have one corresponding primary contact (or User). Organization 1326 has the following relationships:

- The Organization's Address/State/Province relationship 1328 specifies that "Each and every Organization's Address may be located in one and only one State/Province."
- The Organization's Billing Address/State/Province relationship 1330 specifies that "Each and every Organization's Billing Address may be located in one and only one State/Province."
- The Organization's Credit Card/Credit Card Type relationship 1332 specifies that "Each and every Organization's Credit Card may be identified by one and only one Credit Card Type."
- The Organization's Shipping Address/State/Province relationship 1334 specifies that "Each and every Organization's Shipping Address may be located in one and only one State/Province."
- The Organization/Activation relationship 1336 specifies that "Each and every Organization may be the owner of one or more Activations."
- The Organization/Attribute User Code relationship 1338 specifies that "Each and every Organization may be the owner one or more Attribute User Codes."
- The Organization/Classification relationship 1340 specifies that "Each and every Organization must be categorized by one and only one Classification."
- The Organization/insurance Profile relationship 1342 specifies that "Each and every Organization may be covered by one or more Insurance Profiles."
- The Organization/Invoice/Shopping Cart relationship 1344 specifies that "Each and every Organization may be issued one or more Invoice/Shopping Carts."
- The Organization/item relationship 1346 specifies that "Each and every Organization may be the owner one or more Items."
- The Organization/Item Report relationship 1348 specifies that "Each and every Organization may be filing one or more Item Reports."
- The Organization/Organization relationship 1350 specifies that "Each and every Organization may be the headquarter for one or more Organizations."
- The Organization/Program relationship 1352 specifies that "Each and every Organization may be granted one or more Programs."
- The Organization/Search Result relationship 1354 specifies that "Each and every Organization may be issued one or more Search Results."
- The Organization/Shipment relationship 1356 specifies that "Each and every Organization may be sent one or more Shipments."
- The Organization/User Account relationship 1360 specifies that "Each and every Organization must be the institution for one or more User Accounts."
- The Organization/User Label relationship 1362 specifies that "Each and every Organization may be the owner of one or more User Labels."

Payment 1364

This entity manages any payment activity invoices. Payment 1364 has the following relationships:

- The Payment/Credit Card Type relationship 1366 specifies that "Each and every Payment may be payed with one and only one Credit Card Type."
- The Payment/Invoice/Shopping Cart relationship 1368 specifies that "Each and every The Payment/Payment Method relationship 1370 specifies that "Each and every Payment must be payed with one and only one Payment Method."
- The Payment/Payment Status relationship 1372 specifies that "Each and every Payment must be classified by one and only one Payment Status."

Program 1374

A Program is an approved B2B BoomerangIt service for an organization. This entity manages the details of the Program. Program 1374 has the following relationships:

- The Program/Activation relationship 1376 specifies that "Each and every Program may be activated through one or more Activations."
- The Program/Authorization Contact relationship 1378 specifies that "Each and every Program must be defined with one and only one Authorization Contact."
- The Program/Contact relationship 1380 specifies that "Each and every Program must be defined with one and only one Contact."
- The Program/Coupon relationship 1382 specifies that "Each and every Program may be issued against one or more Coupons."
- The Program/Merchandise relationship 1384 specifies that "Each and every Program must be an instance of one and only one Merchandise."
- The Program/Organization relationship 1386 specifies that "Each and every Program must be requested by one and only one Organization."
- The Program/Program Merchandise relationship 1388 specifies that "Each and every Program may be referenced in one or more Program Merchandises."
- The Program/Program Status relationship 1390 specifies that "Each and every Program must be defined with one and only one Program Status."

Program Merchandise 1392

This entity manages the details of the merchandise (registrations, etc.) for programs such as the Original Equipment Manufacturer (OEM) program and the Discount program. It also handles the label serial number range (including a prefix and suffix) for the Retail program. Program Merchandise 1392 has the following relationships:

- The Program Merchandise/Merchandise relationship 1394 specifies that "Each and every Program Merchandise must be referencing one and only one Merchandise."
- The Program Merchandise/Program relationship 1396 specifies that "Each and every Program Merchandise must be referencing one and only one Program."

Search Result 1398

This entity manages all the item search results in the system. This table is used to temporarily store the result set of a search and present the results to the user in sorted order. Search Result 1398 has the following relationships:

- The Search Result/Item relationship 1400 specifies that "Each and every Search Result may be returning one and only one Item."

The Search Result/Item Report Item relationship 1402 specifies that "Each and every Search Result may be identified as the matching item one and only one Item Report Item."

The Search Result/Organization relationship 1404 specifies that "Each and every Search Result must be issued to one and only one Organization."

The Search Result/User Account relationship 1406 specifies that "Each and every Search Result must be issued to one and only one User Account."

Shipment 1408

This entity manages the fulfillment (shipping) for the items ordered on an invoice. An invoice may require more than one shipment to be fulfilled. This shipment entity tracks the person and date of fulfillment. Shipment 1408 has the following relationships:

The Shipment/Invoice/Shopping Cart relationship 1410 specifies that "Each and every Shipment must be the fulfillment for one and only one Invoice/Shopping Cart."

The Shipment/Organization relationship 1412 specifies that "Each and every Shipment must be sent to one and only one Organization."

The Shipment/Shipment Item relationship 1414 specifies that "Each and every Shipment may be comprised of one or more Shipment Items."

The Shipment/User Account relationship 1416 specifies that "Each and every Shipment must be sent to one and only one User Account."

Shipment Item 1418

This entity manages the items included in a Shipment. Shipment Item 1418 has the following relationships:

The Shipment Item/Invoice/Shopping Cart Item relationship 1420 specifies that "Each and every Shipment Item must be the fulfillment for one and only one Invoice/Shopping Cart Item."

The Shipment Item/Shipment relationship 1422 specifies that "Each and every Shipment Item must be a component of one and only one Shipment."

State/Province 1424

This entity manages any geographic sub-divisions such as states and/or provinces for a given country. Industry standard abbreviations are stored. State/Province 1424 has the following relationships:

The State/Province/ConFigururation's Address relationship 1426 specifies that "Each and every State/Province may be the location for one or more ConFigureuration's Addresses."

The State/Province/Country relationship 1428 specifies that "Each and every State/Province must be the division of one and only one Country."

The State/Province/Incident Resolution's Contact Address relationship 1430 specifies that "Each and every State/Province may be the location for one or more Incident Resolution's Contact Addresses."

The State/Province/Insurance Broker Address relationship 1432 specifies that "Each and every State/Province may be the location for one or more Insurance Broker Addresses."

The State/Province/Invoice/Shopping Cart's Billing Address relationship 1434 specifies that "Each and every State/Province may be the location for one or more Invoice/Shopping Cart's Billing Addresses."

The State/Province/Invoice/Shopping Cart's Shipping Address relationship 1436 specifies that "Each and every State/Province may be the location for one or more Invoice/Shopping Cart's Shipping Addresses."

The State/Province/Item Report's Incident Address relationship 1438 specifies that "Each and every State/Province may be the location for one or more Item Report's Incident Addresses."

The State/Province/Item Report's Insurance Broker Address relationship 1440 specifies that "Each and every State/Province may be the location for one or more Item Report's Insurance BrokerAddresses."

The State/Province/Item Report's Police Address relationship 1442 specifies that "Each and every State/Province may be the location for one or more Item Report's Police Addresses."

The State/Province/Item Report's User Address relationship 1444 specifies that "Each and every State/Province may be the location for one or more Item Report's User Addresses."

The State/Province/Item Report's Witness Address relationship 1446 specifies that "Each and every State/Province may be the location for one or more Item Report's Witness Addresses."

The State/Province/Organization's Address relationship 1448 specifies that "Each and every State/Province may be the location for one or more Organization's Addresses."

The State/Province/Organization's Billing Address relationship 1450 specifies that "Each and every State/Province may be the location for one or more Organization's Billing Addresses."

The State/Province/Organization's Shipping Address relationship 1452 specifies that "Each and every State/Province may be the location for one or more Organization's Shipping Addresses."

The State/Province/User's Drivers Licence relationship 1454 specifies that "Each and every State/Province may be the location for one or more User's Drivers Licences."

Tax Code 1456

This entity manages the sales tax in the BoomerangIt store and invoice. In one embodiment the values are constrained through the use of drop down list boxes. Tax Code 1456 has the following relationships:

The Tax Code/Invoice/Shopping Cart relationship 1458 specifies that "Each and every Tax Code may be the sales tax for one or more Invoice/Shopping Carts."

User Account 1480

This entity manages all users with accounts and their login and password information, whether active or expired. These users must at some point have been registered to receive an account. Every activity in the system must be performed by a user. All activities can be automatically logged against a user in the database. User Account 1480 has the following relationships:

The Account Password/Password Hint relationship 1482 specifies that "Each and every Account Password must be categorized by one and only one Password Hint."

The Authorization Contact/Program relationship 1484 specifies that "Each and every Authorization Contact may be the authorization contact for one or more Programs."

The Contact/Coupon relationship 1486 specifies that "Each and every Contact may be the contact for one or more Coupons."

The Contact/Program relationship 1488 specifies that "Each and every Contact may be the contact for one or more Programs."

The User Account/Activation relationship 1490 specifies that "Each and every User Account may be the owner of one or more Activations."

The User Account/Attribute User Code relationship 1492 specifies that "Each and every User Account may be the owner one or more Attribute UserCodes."

The User Account/insurance Profile relationship 1494 specifies that "Each and every User Account may be covered by one or more Insurance Profiles."

The User Account/Invoice/Shopping Cart relationship 1496 specifies that "Each and every User Account may be issued one or more Invoice/Shopping Carts."

The User Account/Item relationship 1498 specifies that "Each and every User Account The User Account/Item Report relationship 1500 specifies that "Each and every User Account may be filing one or more Item Reports."

The User Account/Organization relationship 1502 specifies that "Each and every User Account must be part of one and only one Organization."

The User Account/Search Result relationship 1504 specifies that "Each and every User Account may be issued one or more Search Results."

The User Account/Shipment relationship 1506 specifies that "Each and every User Account may be sent one or more Shipments."

The User Account/User Label relationship 1510 specifies that "Each and every User Account may be the owner of one or more User Labels."

The User Account/User Role relationship 1512 specifies that "Each and every User Account must be assigned one and only one User Role."

The User Account/User Session relationship 1514 specifies that "Each and every User Account may be the initiator of one or more User Sessions."

The User Account/Web Hit relationship 1516 specifies that "Each and every User Account may be the subject of one or more Web Hits."

The User's Drivers Licence/State/Province relationship 1520 specifies that "Each and every User's Drivers Licence may be obtained in one and only one State/Province."

User Label 1522

This entity manages the labels sent to the users (subscribers). The different labels are defined by the label type. User Label 1522 has the following relationships:

The User Label/Label Type relationship 1524 specifies that "Each and every User Label must be classified by one and only one. Label Type."

The User Label/Organization relationship 1526 specifies that "Each and every User Label must be purchased by one and only one Organization."

The User Label/User Account relationship 1528 specifies that "Each and every User Label must be purchased by one and only one User Account."

User Role 1530

This entity manages the role of every BoomerangIt user. This role governs privileges to execute various Web site functions. User Role 1530 has the following relationships:

The User Role/User Account relationship 1532 specifies that "Each and every User Role may be granted to one or more User Accounts."

User Session 1534

This entity manages the user's BoomerangIt session. It uses a unique session number that is generated each time the user visits the BoomerangIt web site. It provides an anonymous, abstract way of managing a session. The expiration timestamp is used to manage the session expiration. User Session 1534 has the following relationships:

The User Session/User Account relationship 1536 specifies that "Each and every User Session must be initiated by one and only one User Account."

Web Hit 1538

This entity logs each time a user accesses any web page on the BoomerangIt.Com site.

The Web Hit/User Account relationship 1540 specifies that "Each and every Web Hit may be incurred by one and only one User Account."

Web Report 1542

This entity manages all the web reports in the system. The web reports have been designed to run on-line via the web. Web Report 1542 has no relationships.

Table Column 1544

This entity manages the definitions of all the database tables and columns. It is used for the Web Reports. This table is automatically populated upon database creation. Table Column 1544 has no relationships.

As described above, systems developed in accordance with the present invention include many new features and advantages over prior methods, some of which are described in further detail below.

Dynamic Comprehensive Attribute Database

The database of the present invention is dynamic in that its contains entities (or tables) that describe the item types and attributes and procedures that use those tables to access and display data. The administrator can add, delete, or modify attributes at any time without having to reprogram the database or redesign the database schema. The database of the present invention is comprehensive. It provides support for multiple item types including items that have not yet been invented and items whose attributes are evolving.

User Definable Attribute Values

Typically an attribute's value must be selected from a fixed list of values. If the correct value is not in the list the user is forced to enter an inaccurate value or be stopped from continuing. One of the objectives of the present invention is to allow the user to define accurate values in a "Other" category when the fixed choices are not appropriate. This provides an integrated feedback mechanism. The administrator can review the "Other" category values from time to time and update the set of attribute values to include the more common values. A procedure can be run to update the attribute records to use the new code and clear the "Other" value, making the database more searchable and more valuable.

Close Match Searching

The present invention provides for matching of items that are close but may not match exactly because an attribute is missing or has be obscured.

Automatic Searching and Payments

The present invention automatically and continually searches for matches greatly reducing human intervention and providing timely results. The system also reduces the human intervention requirements for making payments so the overhead of operating the service is reduced.

Product Genealogy

The attribute database based on the Organization-Property-Individual Model allows a piece of property to be tracked from is creation at the factory to its decommission or any time segment in between. A list of multiple owners would comprises a chain of title. An items relationship to its manufacture, warrantee companies, insurance companies, and law enforcement could all be tracked.

World Wide Registry

The present invention provides for a world wide registry. If property becomes lost or stolen, the present invention offers a clearinghouse for locators of missing property, including police and good Samaritans, to return property to their owners.

The present invention supports multiple languages within a national database and provides for a universal, globally searchable, international repository of lost and found items. The registry has the ability to access third party databases to extend its power beyond its own data. The system provides for secure communication between owners of missing property and finders and provides safe and easy mechanisms to return the property.

Flexible Label Marking

The present invention incorporates state-of-the-art label technology, so that even labels that have been removed can lead to identification and recovery of property.

Crime Prevention and Deterrence

The present invention makes crime riskier, more time consuming, and less rewarding. Thieves have to work hard at finding and removing labels. They have to worry about getting caught with marked items. Most of the factory-marked products will be difficult to pawn or sell on the black market. For those people with or without alarms, the present invention offers increased theft detergence.

Crime Solution and Victim Notification

The present invention empowers law enforcement to solve more crime, more quickly obtain information about crime, and return stolen property. Accident or crime victims can be quickly identified by their marked property and be notified. Rapid notification will help law enforcement get more complete information and give them an edge of catching criminals before they get away or dispose of property or of the evidence. Communication between business, citizens, and law enforcement is improved.

Additional Implementations And Uses

The present invention provides many new uses of registry technology, including but not limited to the following:

Credit cards can be tracked using this system, and an organizational interface can be include to ease the notification of credit card companies of the lost and recovery of missing cards.

Corporations can use this system to track corporate assets, especially laptop computers and cell phones of business travels. The present invention provides for increased security, theft detergence, and rapid recovery of equipment and its data.

The present invention includes an organizational interface so that participating insurance companies can quickly receive notice of claims and accurate information on missing or damaged property.

Individuals can use the registry to maintain a permanent, offsite record of their valuable property.

The present invention provides a chain of title for a piece of property. Lenders including pawn shops can use the system to prepare required reports and can reduce their risk of loan money secured by stolen property.

Manufacturers can use the system to increase warranty response and make warranty handling easier for both the consumer and the manufacture. Extended warranty programs can also be provided and tracked.

Hotels, taxis, airlines, and other travel and hospitality services can provide quicker returns and thereby reduce their duties, liabilities, and storage and handling costs.

Web-Based System Implementation

An embodiment of the invention includes a web-based system or front-end which is accessible by a user (otherwise referred to as a customer) via a browser and an Internet connection.

Figure 11:
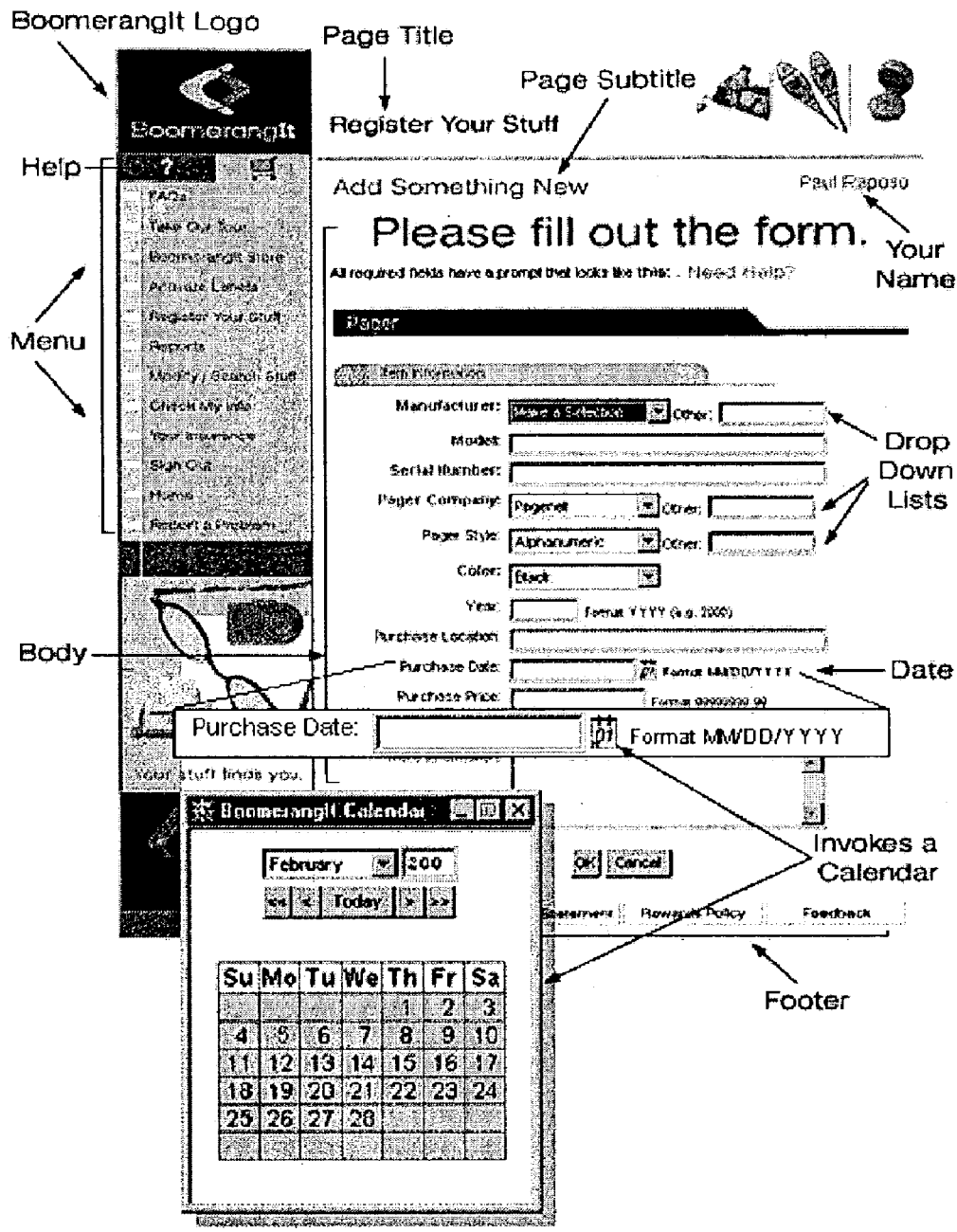
FIG. 11 is an overview of a web site in accordance with an embodiment of the invention.

FIG. 11 shows an overview of a web-based system in accordance with an embodiment of the invention. The web-based system includes a web site that allows a user to register and track items, belongings, personal possessions, etc. The system takes advantage of a web-based/browser platform to provide ease of use and convenient access from anywhere in the world with an Internet connection.

FIG. 12 through FIG. 18 illustrate high level details of an embodiment of the invention. The invention may be used to track any type of objects some of which are shown in FIG. 12, including, but not limited to, large objects such as kayaks and bicycles, or smaller objects such as cell phones and laptop computers. Any manner of object may be registered with the system. This is in large part due to the advanced features and inherent flexibility of the system.

Figure 13:
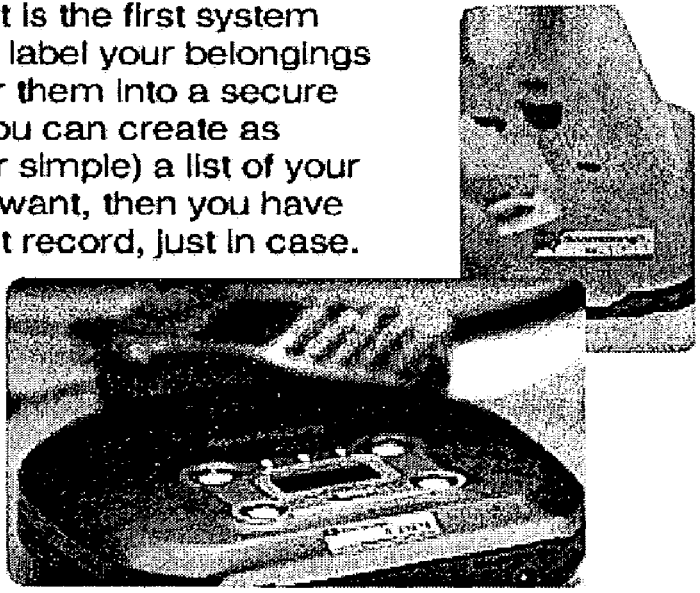

FIG. 13 illustrates the placement of object identification labels on various objects including personal music devices and cellular telephones. As illustrated in FIG. 14, these labels may be designed to be tamper resistant and to be available in various sizes for a wide variety of applications. The label may carry an identification number that can be either unique to each object, a group of objects, or an owner, and may also include a contact number or a URL (a Uniform Resource Locator) for finders to use when an object is found.

Figure 15:
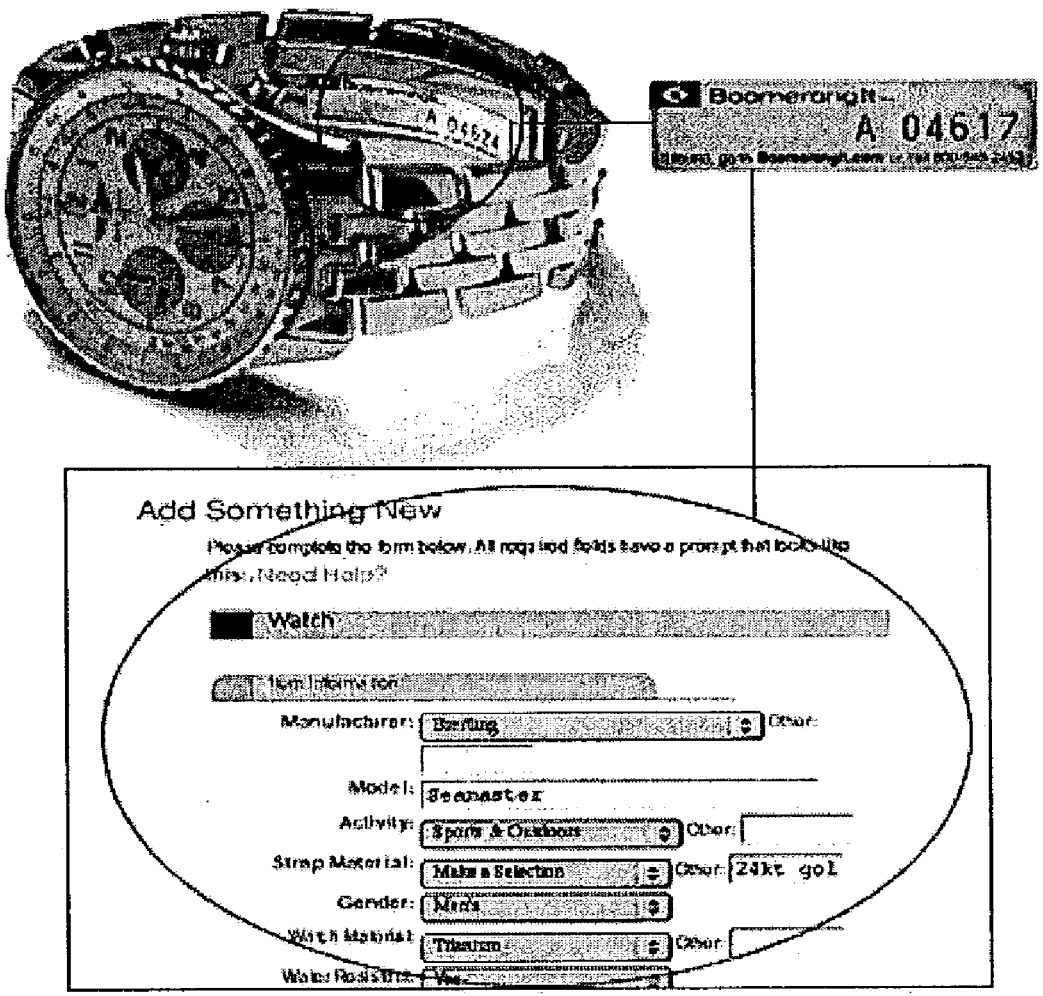

When an object or item is registered, information about that object can be recorded and referenced to a unique identification number within the system. As illustrated in FIG. 15, this information may include such values as the manufacturer, model, and serial number of the object.

Figure 17:
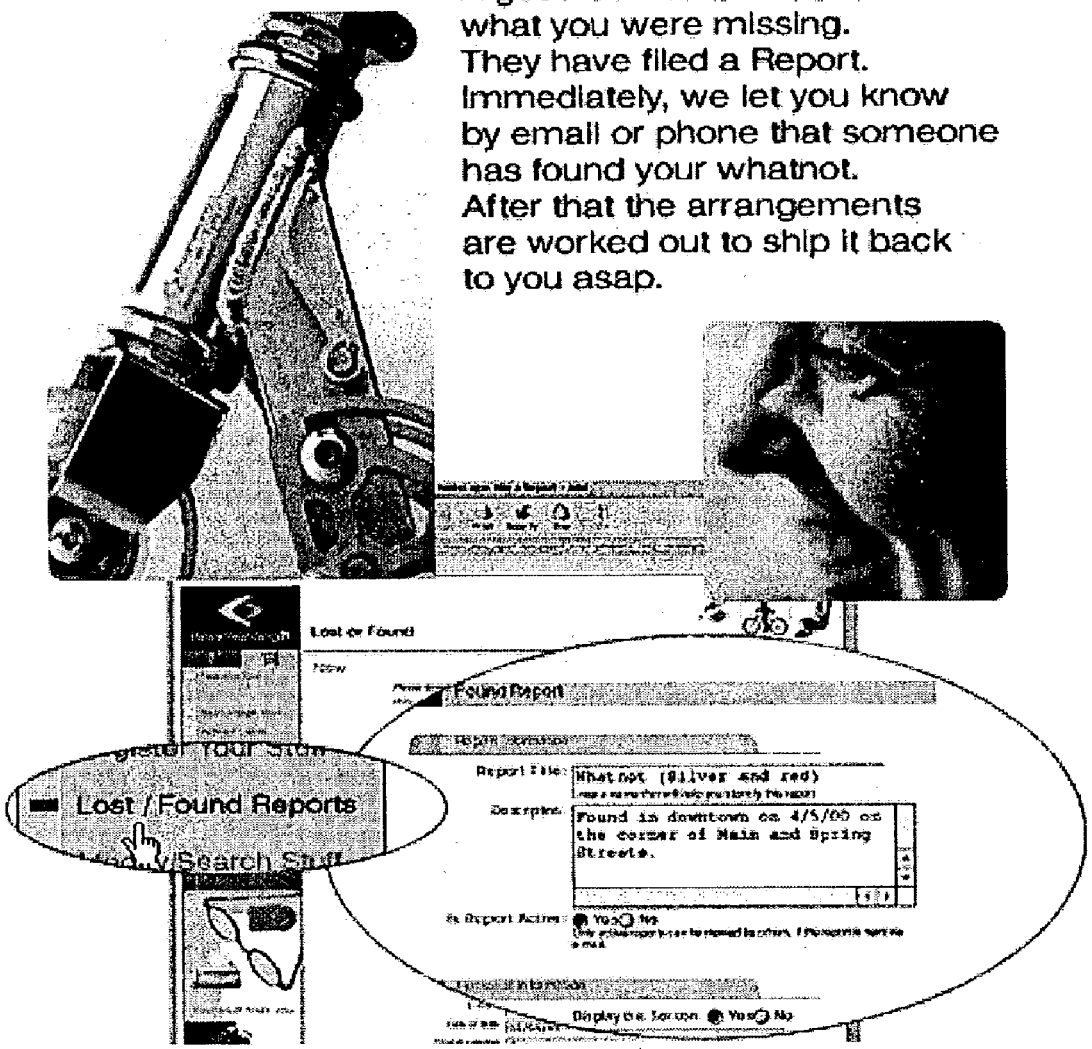

FIG. 16 illustrates the use of a report mechanism for reporting lost or damaged items. This creates a reference to the item in the database of lost items. When the object or item is eventually found, a found report, such as the one shown in FIG. 17, is used to create a reference in the database of found items. When a match is made the item can be returned to the proper owner.

Figure 18:

Some embodiments of the invention may include a reward mechanism illustrated in FIG. 18 for sending rewards to the finders, either automatically (on receipt of a found report perhaps) or at the discretion of the lossee (the original owner of the item).

Web-Site Customer Access

FIG. 19 through FIG. 29 illustrate screenshots of an actual customer interaction with a Web site in accordance with an embodiment of the invention. This particular embodiment is known as BoomerangIt (accessible via the Internet at BoomerangIt.com). It will be evident that other implementations can be developed within the spirit and scope of the invention, and that the invention is not limited to the features provided by the BoomerangIt implementation described below.

BoomerangIt is the Internet's helpful way of getting stuff back if it is lost or stolen. Through BoomerangIt a user can create a secure permanent record of ownership that they can access any time, and from anywhere. They can use this record in case their property gets lost, stolen or damaged, such as in an earthquake or fire, and then report the loss to their insurance company or the product manufacturer.

BoomerangIt is similar to the Department of Motor Vehicles, but better and for everything. BoomerangIt labels act like Vehicle Identifications Numbers (VINs), but are intended for all types of a users personal property. A user can keep track of their belongings all in one place—BoomerangIt—from their home, office, or abroad.

How BoomerangIt Works

The BoomerangIt embodiment of the system works as follows:

Label Items

A user may buy BoomerangIt labels online or at a retail store. They place the labels on anything they would like to get back if it ever became lost or stolen. Then they sign-in to their BoomerangIt account and list their labels to connect the label numbers to their personal name or identification. A user can label and register virtually anything and everything—for example a cell phone, key chain, paintings, luggage or even animals.

Register stuff

The user may also enter a brief description of each item they have placed a label on. Registering gives them an inventory, and allows communication with the manufacturer, insurance, police and others about the item. To register, they just fill out a brief description of the item.

Create reports

In the unfortunate event of having an item break or become lost or stolen, the user can go to their BoomerangIt account and fill-out an appropriate "Report". They can update their file and e-mail a report anywhere, including to the police or an insurance company.

Get the item back

When good Samaritans or Police find something with a BoomerangIt label on, they log on to the web site and fill out a Found Item Report, including the label number, a description of what they found, and where is the item at that current moment. If there is an exact lost-and-found match, then the system can automatically inform the original owner via e-mail. Otherwise, the user or owner can search the BoomerangIt database of found items to determine if a similar item has been found, which may eventually turn out to be their missing-one. The user can communicate and arrange directly with the finder how to get their item back. If they prefer, for a small fee BoomerangIt arranges to ship the item to them.

In order to use the BoomerangIt service, all that is needed is a computer connected to the Internet, typically running a secure web browser such as Netscape Navigator, Internet Explorer, AOL or another type of browser.

BoomerangIt has developed some of the best and most practical labels available anywhere in the world that are almost impossible to remove. On each label and tag are included the words "Return for Reward".

Sign-Up

Figure 19A:
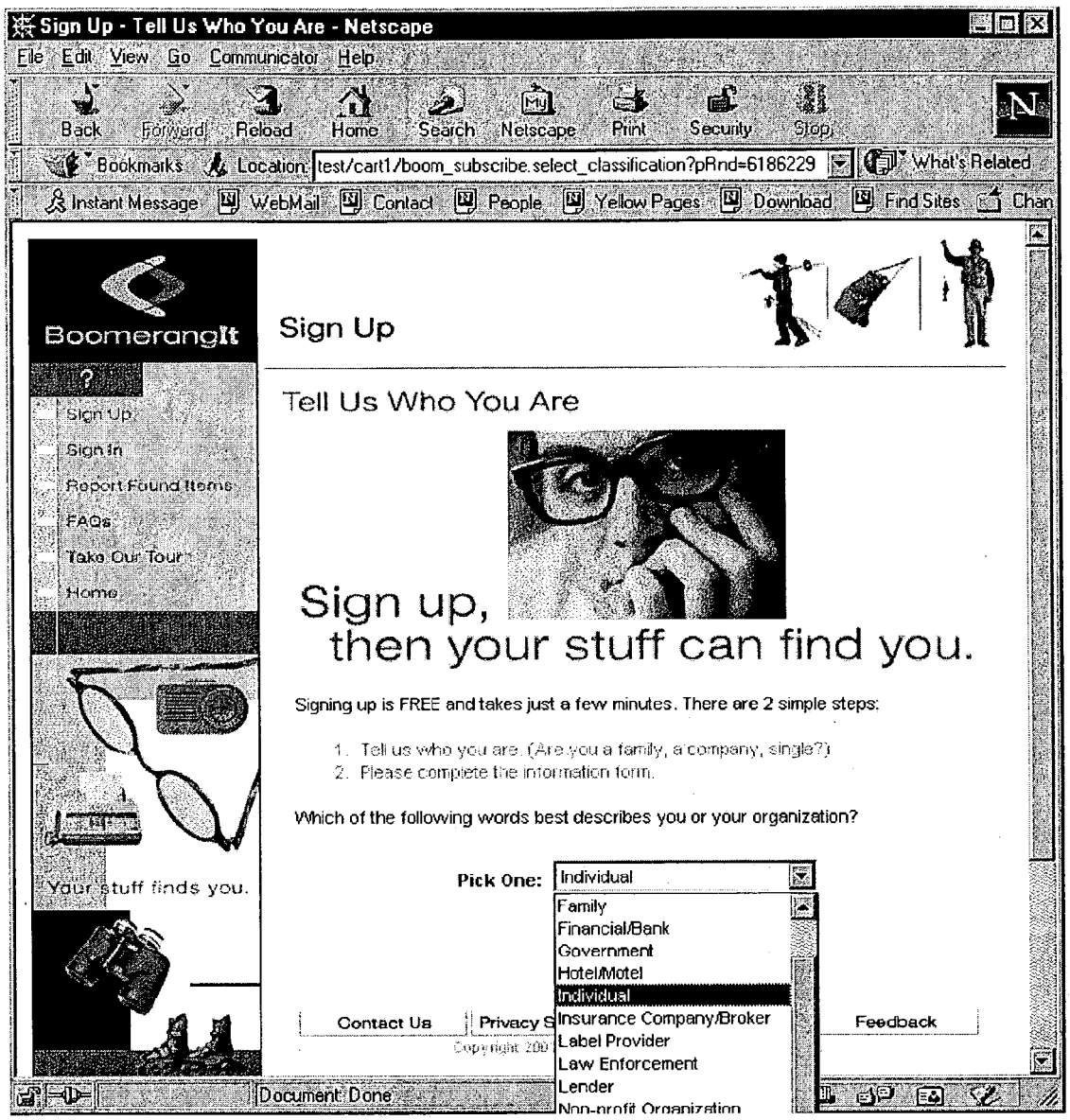
FIGS. 19-29 are screenshots of a web site in accordance with an embodiment of the invention.
Figure 19B:
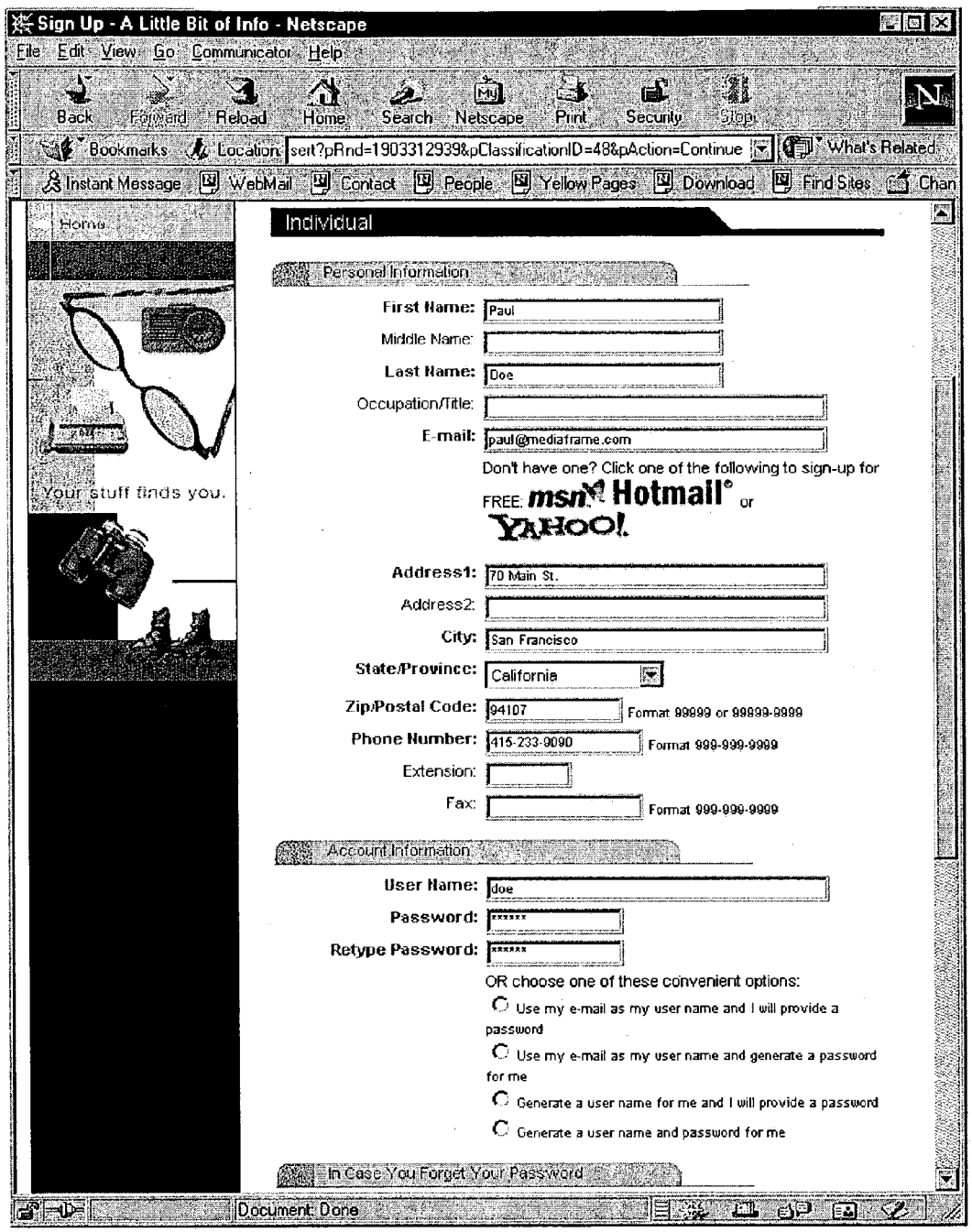

FIGS. 19A-19B show screenshots of a sign-up screen. The prospective user may provide contact information and create a username and password. In order to use BoomerangIt services they need to create an account at BoomerangIt database, or in other words, sign-up. It is required that they also provide a valid e-mail. Here is how the user signs up:

Go to the BoomerangIt website

Click on Sign-up

Select a category and click on Continue

Fill-out the form. Click on OK.

That's it! A confirmation e-mail will be sent to the user.

To sign up, the user should complete the following sections:

Personal information—in this section the user is required to fill-out contact information such as address and phone numbers, so that they can be notified when a lost/stolen item that may be theirs has been reported as found.

Account Information—a user needs a user name and password to access their secure BoomerangIt account. The user can make them up, or chose one of the convenient system generated options.

In case you forget your password-the system allows the user to enter a hint question and answer—this way Boomerang It can automatically e-mail the user name and/or password when requested by the user.

Questions—terms and conditions to be read before proceeding with the BoomerangIt sign-up.

E-mail is the primary means of communication at BoomerangIt. In order to use the system, the user must have an e-mail account.

Sign-On

Figure 20:
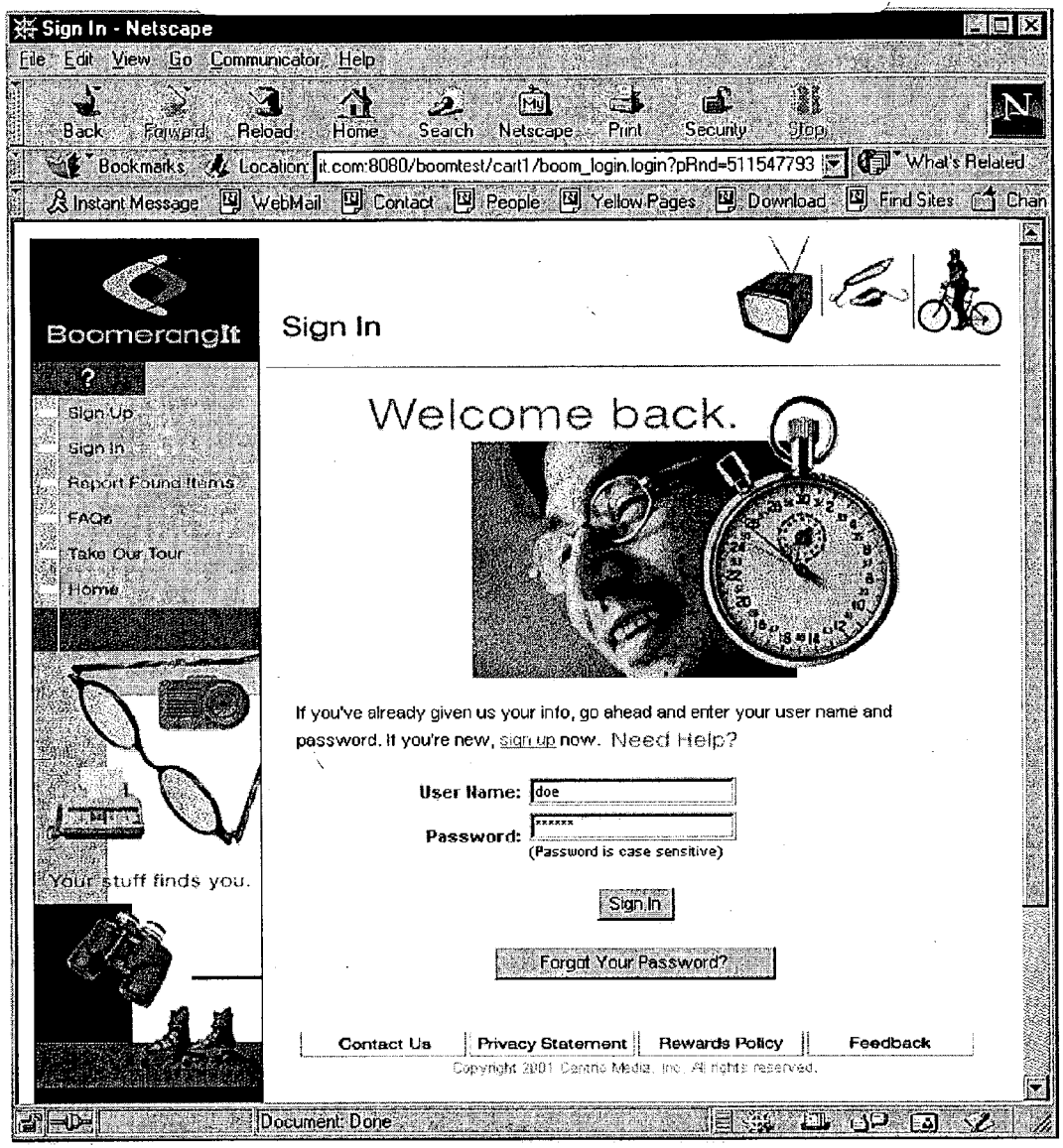
Figure 21A:
Figure 21B:
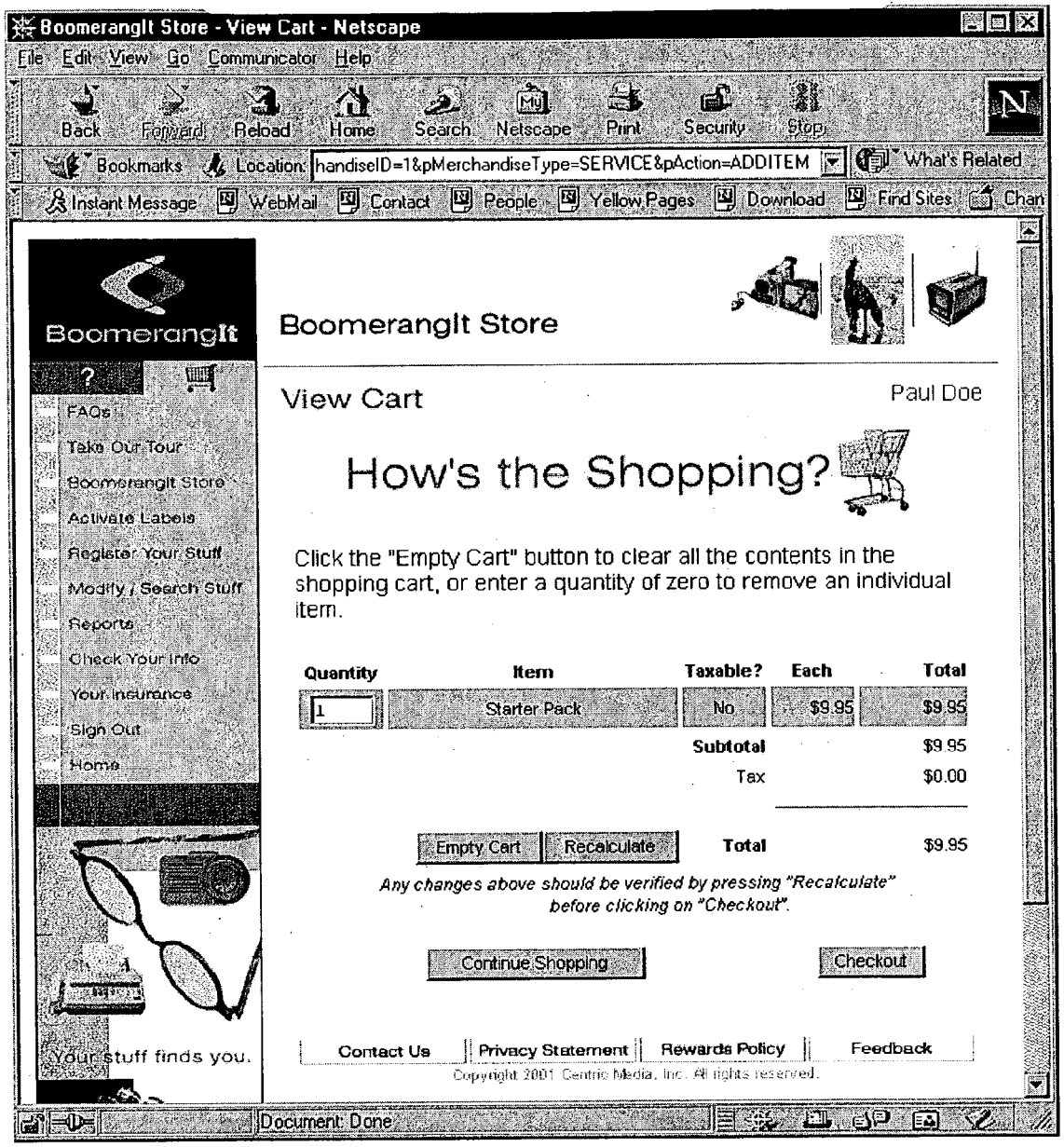
Figure 21D:
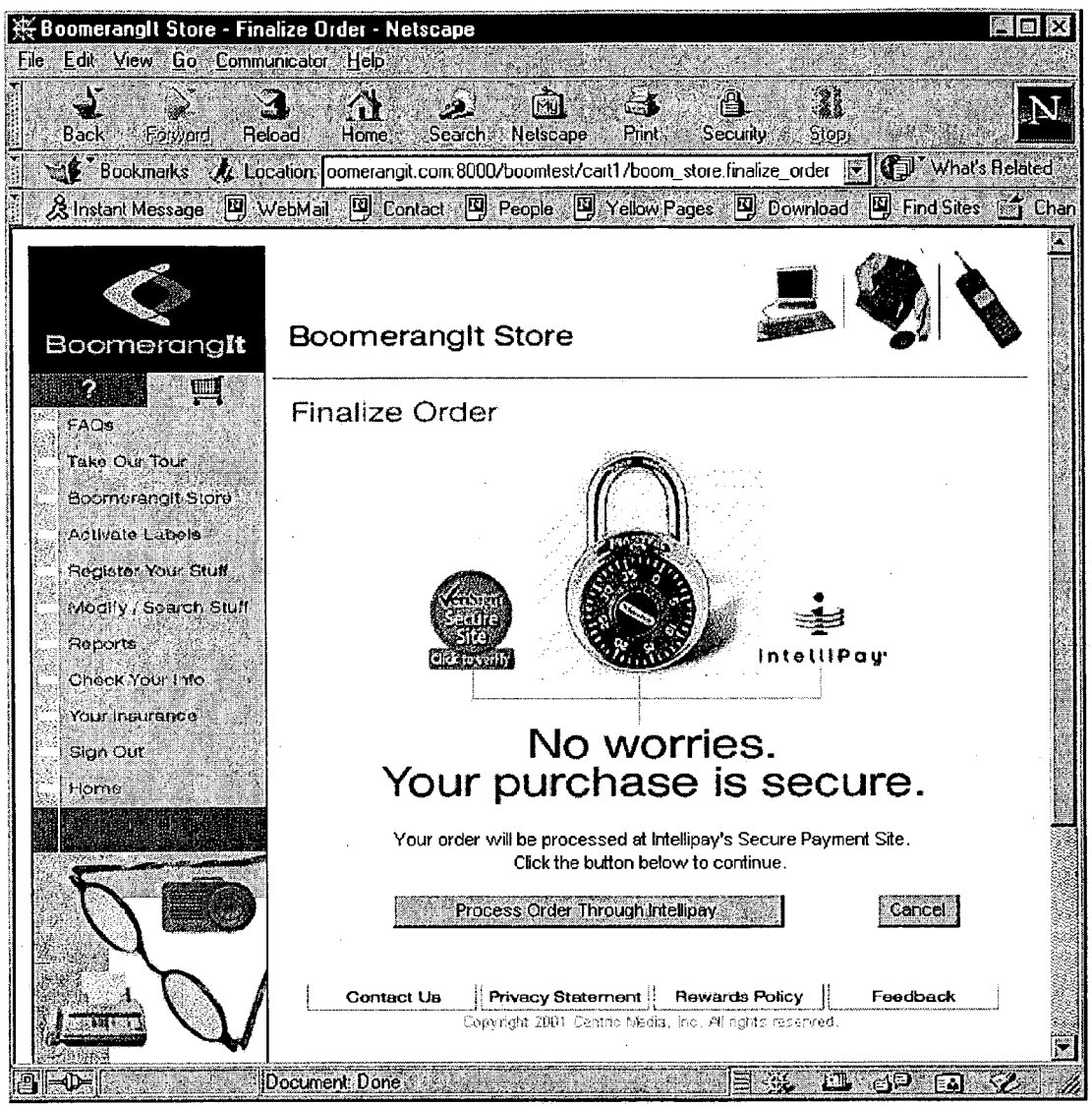
Figure 21E:
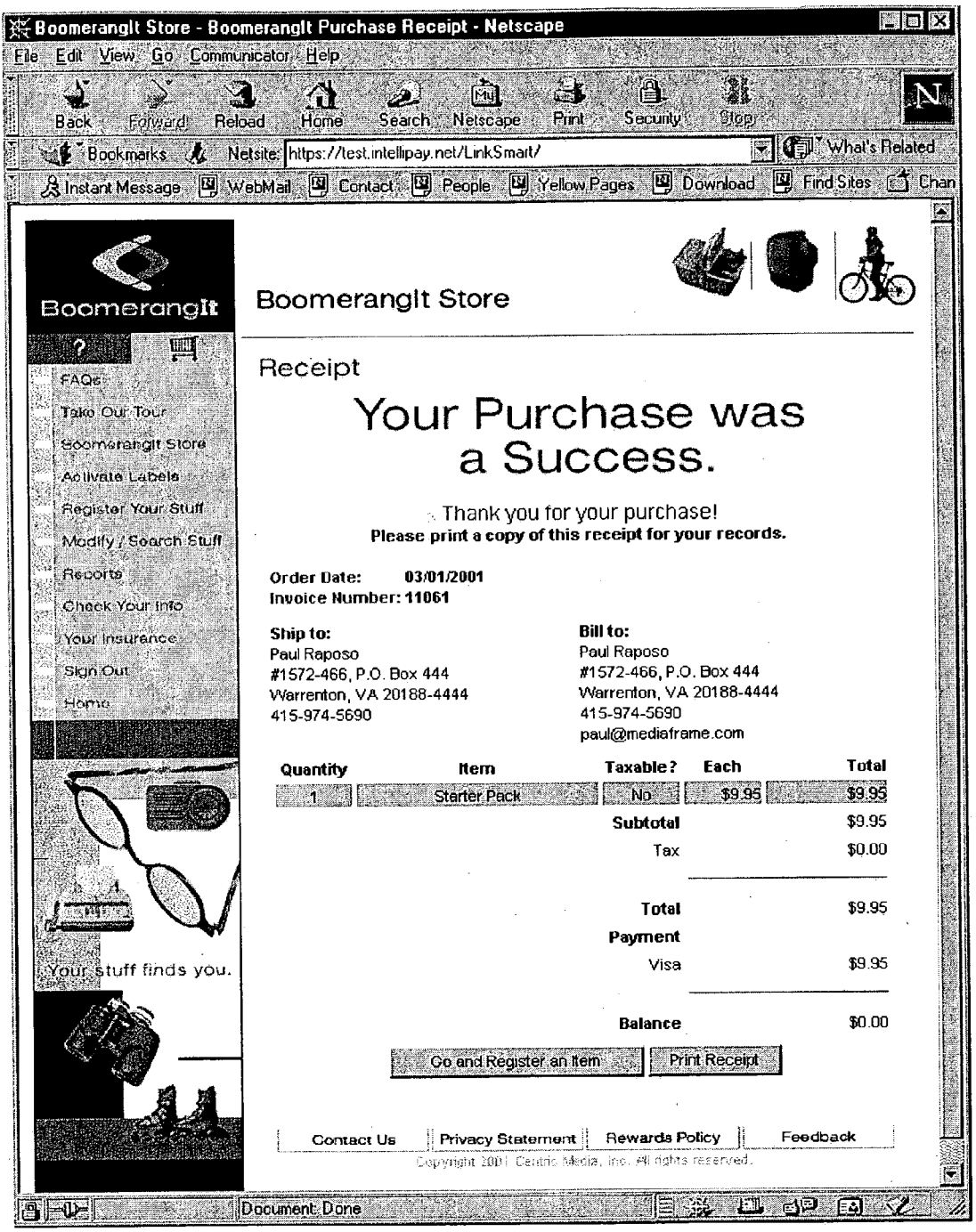

FIG. 20 shows screenshots of a sign-on screen. The user may use their username and password to access the system from anywhere in the world with an Internet (Web) connection. This may include wireless Web devices. To sign-in to their BoomerangIt account, the user types in their user name and password, and then clicks on Sign-in.

When a user signs-up, BoomerangIt sends a confirmation e-mail with the user name and password. If the user has provided a hint question and answer when they signed-up, BoomerangIt can automatically retrieve their password when the user types in the correct answer to the hint question and display it on the screen. If the user did not enter a hint question and answer, BoomerangIt can e-mail the password to the user. To use this feature the user must provide their user name, full name and address to match against information stored in the database. If they have forgotten both their user name and password, BoomerangIt can still e-mail them, if they provide a full name and address.

Purchase Registrations

Figure 21C:
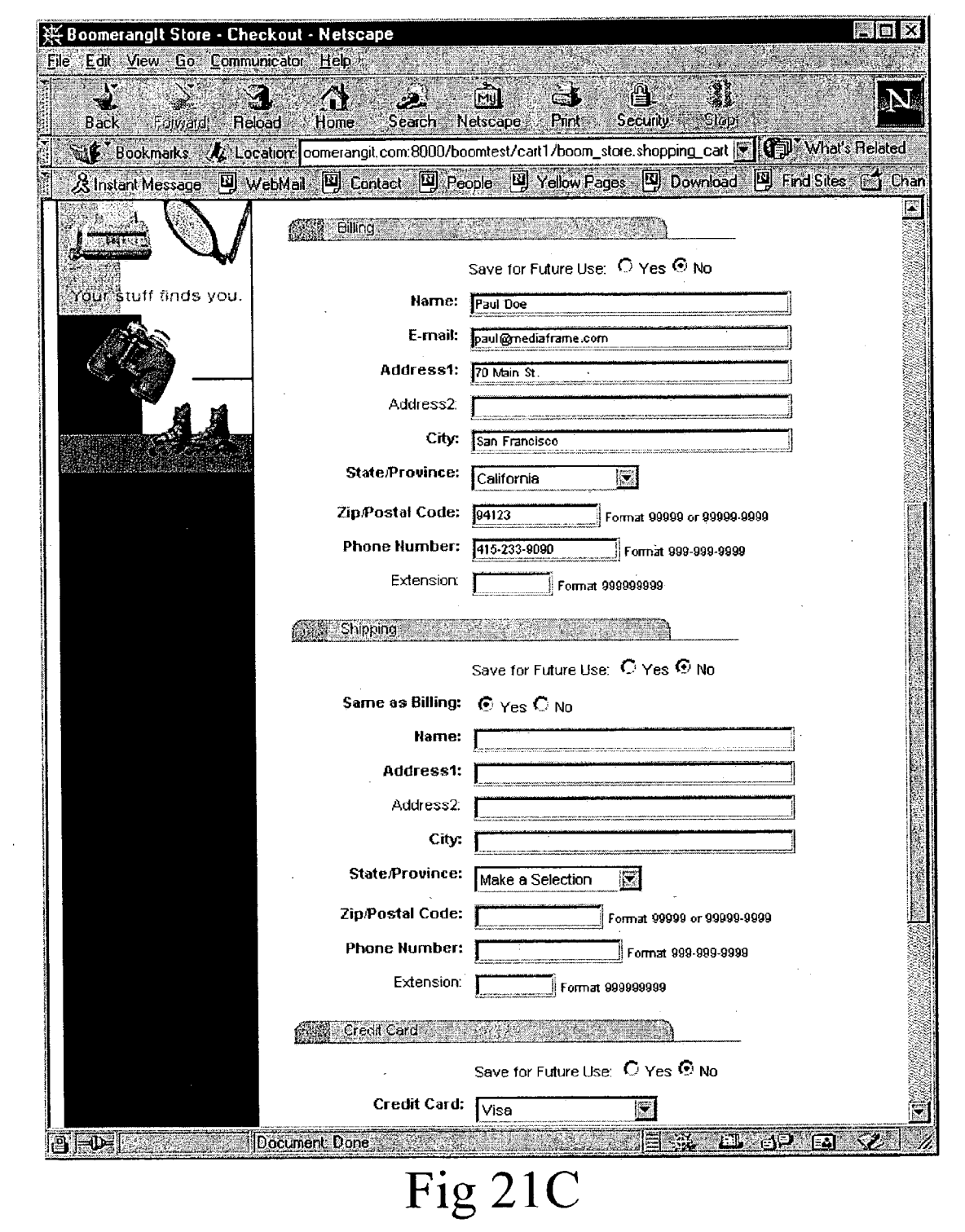

FIGS. 21A-21E show screenshots of a registration purchase screen. In this example the user has already signed-up for a secure BoomerangIt account. In order to be able to use the BoomerangIt service, they need to buy labels and registrations first. At the online store, BoomerangIt offers a variety of labels and markers for different items to best suit the user's needs. The user can also purchase label packages from participating retail stores. At the BoomerangIt Store, the user's credit card is processed through the BoomerangIt secure website, which guarantees the security and privacy of their order.

The following series of steps outlines how to purchase labels and registrations at the BoomerangIt Store:

Go to the BoomerangIt Store.

Add to Cart selected label package.

Continue Shopping to Add to Cart another label package.

Enter the discount coupon number if you are eligible for a quantity discount.

Click on Recalculate.

Click on Checkout.

Fill-out the order form and Finalize Order.

Click on Process Order.

An electronic receipt will be displayed, which BoomerangIt keeps on file for the user. The label package is then sent on its way to the user's specified location. A user can go to the BoomerangIt Store and review the different label packages and select the ones that best suit their needs, then click on the Add to Cart next to their selection. On their screen, they will see the contents of the shopping cart. To order multiple label packages of the same kind, they can type in the number requested in the "Quantity" field of the order form. They can also order a different label pack by clicking on Continue Shopping and Add to cart the next label package, or can clear all the contents of the shopping cart by clicking on "empty cart."

The user can view the contents of their cart at any time by clicking on the shopping cart icon on the navigation bar. The Checkout screen/form has the following sections:

Order Information is completed from the contents of your shopping cart.

Billing address is already retrieved from your account for your convenience. If your billing address is different than the address you provided when signing up, you may change it at any time on this form, or in your profile.

Shipping address fills itself out, if you click on "Yes", i.e. if shipping address is the same as billing. If shipping address is different than billing, or you are sending a label package as a present to a friend, please fill it out.

Credit Card information should be entered in the format requested, so that we can properly execute your order on our secure server.

Order Instructions section may include any details regarding the shipment of your order.

Save for Future Use:" allows you to store the information you have provided in your account information, so the next time you would like to make a purchase at the BoomerangIt website, you would not have to enter it again.

When the user has completed the order form, they can click on Finalize order to proceed to the secure payment site and go to Process Order. The order is processed through an online payment service, e.g. Intellipay., and then the label package is sent on its way.

Activate Labels

Figure 22A:
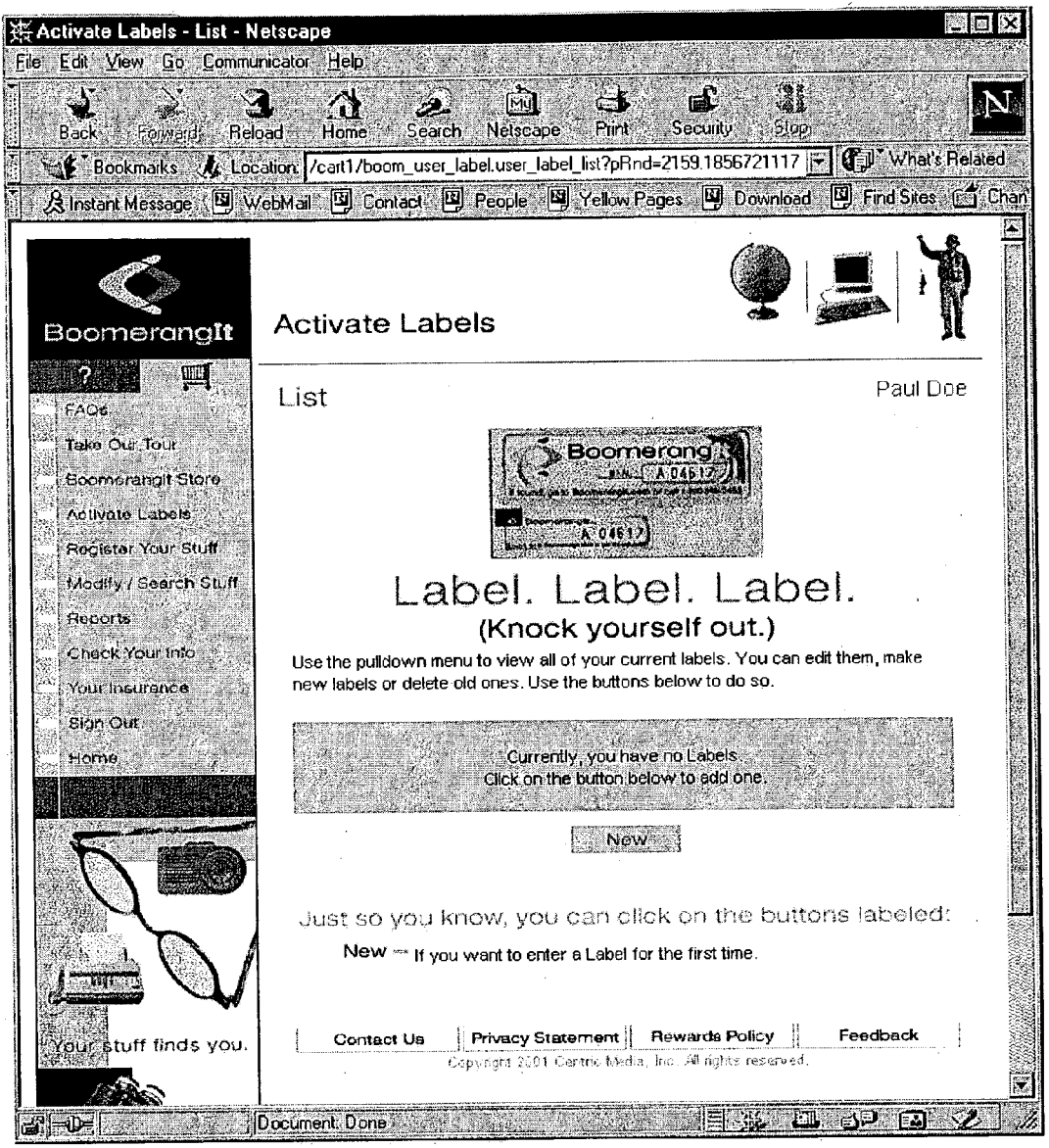
Figure 22B:
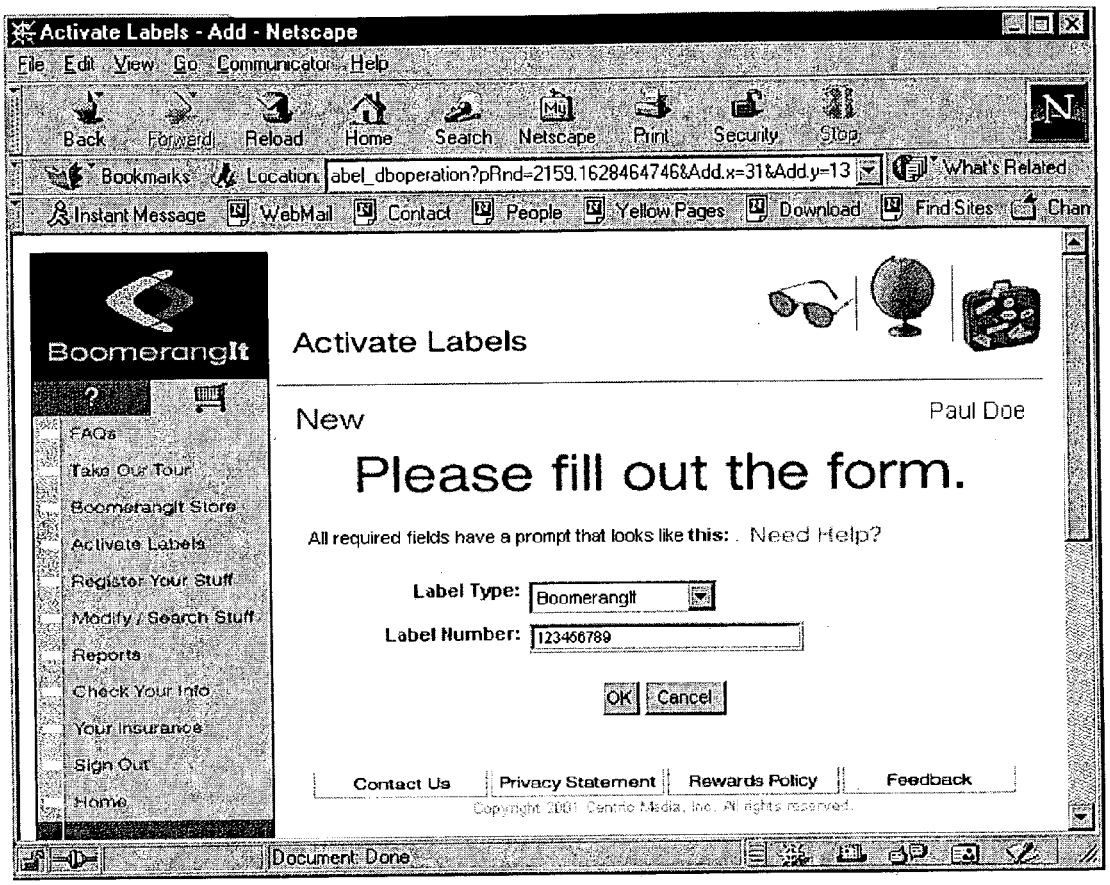

FIGS. 22A-22B show screenshots of a label activation screen. BoomerangIt system has been designed to be both easy to use, and efficient in returning lost and stolen property to its rightful owners. The "Activate Labels" feature addresses both of these factors. By entering the BoomerangIt Identification Number (BIN) that is printed on the labels into a user account in the BoomerangIt database, the user connects this number to that account. Activating a label takes seconds, and this is enough for a found item with that label to be identified as belonging to the user even if the label is not individually registered. Activating labels also saves time when you proceed to register your stuff. The following steps outline how a user activates their labels:

Go to Activate Labels.
Click on New.
Select the type of label ("BoomerangIt" or "Other")
Type in the label number and click on OK.
That's it! Repeat for all the labels you got.

How to Make Changes to an Activated Label:
Go to Activate Labels.
Select the type of label you would like to delete from the drop-down list. Click on Modify.
Select the correct label type and/or type in the correct label number and click on OK.
That's it. If the user has already used the incorrect label number to register one or more of your items, they may need to go and manually change these label numbers in the description of the item.

How to Delete an Activated Label:
Go to Activate Labels.
Select the type of label you would like to delete from the drop-down list. Click on Delete.
A confirmation screen with the label information will be displayed. Click on OK to delete it.
That's it.
If the user has already used this label number to register one or more of their items, it will not be automatically deleted from the description of their items, and they may have to manually delete it.

How to Put the BoomerangIt Labels on Items

The website displays a congratulations for purchasing the BoomerangIt labels. Labels have been designed for use on any and all surfaces. The user will typically place the label on a spot that it will be easily noticed because thieves are less likely to steal marked property. Now your stuff can find you!

Register Items

Figure 23A:
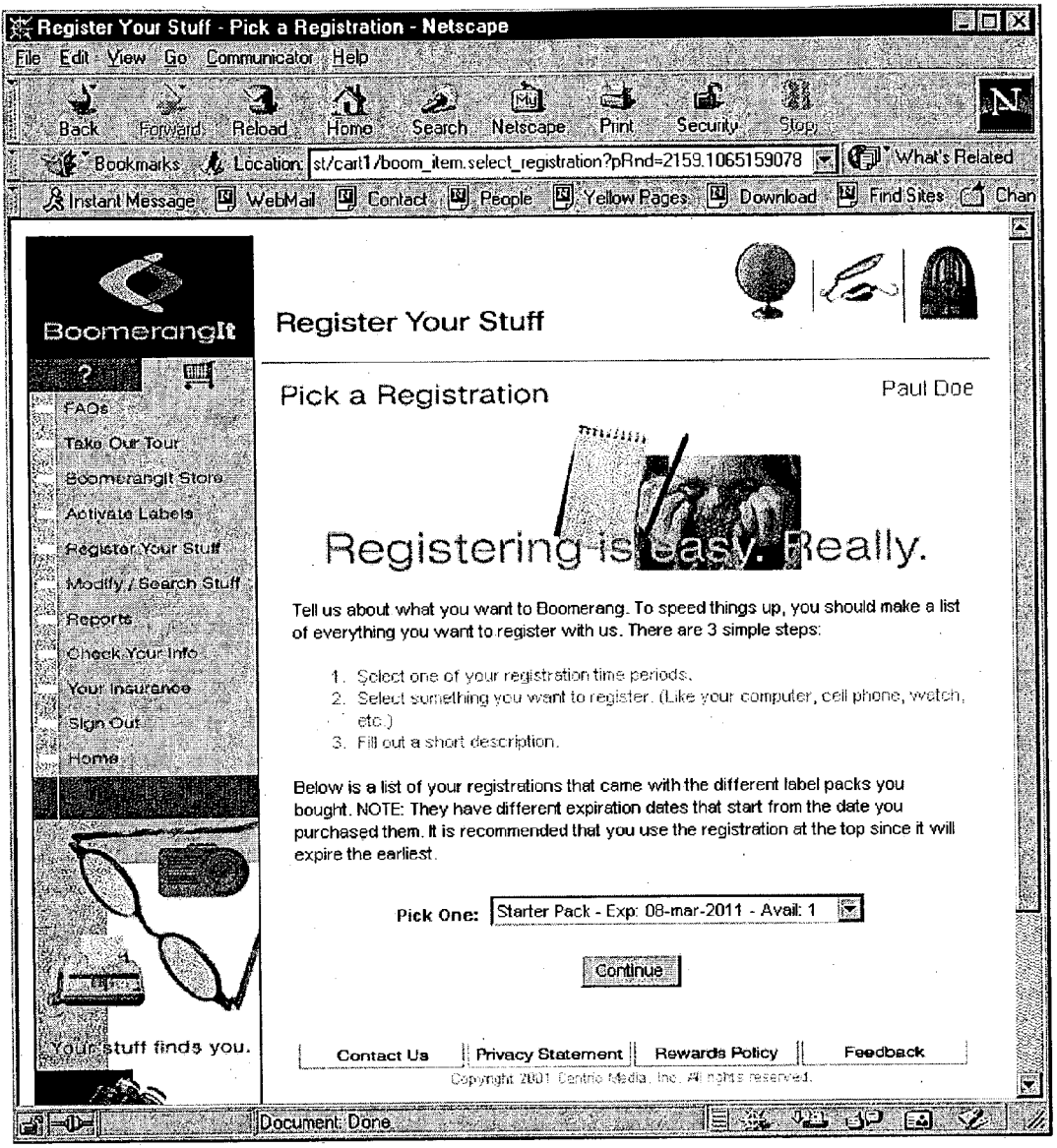
Figure 23B:
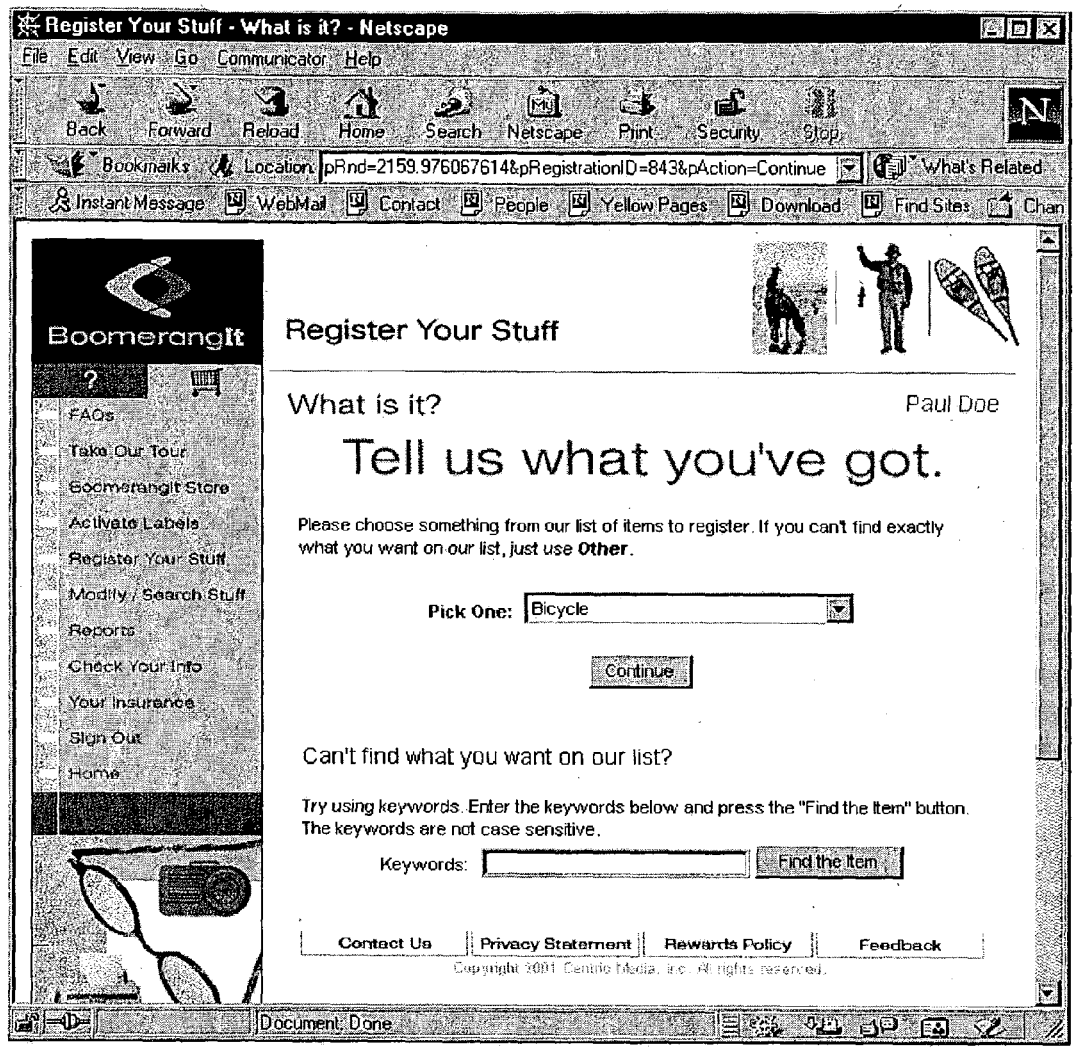
Figure 23C:
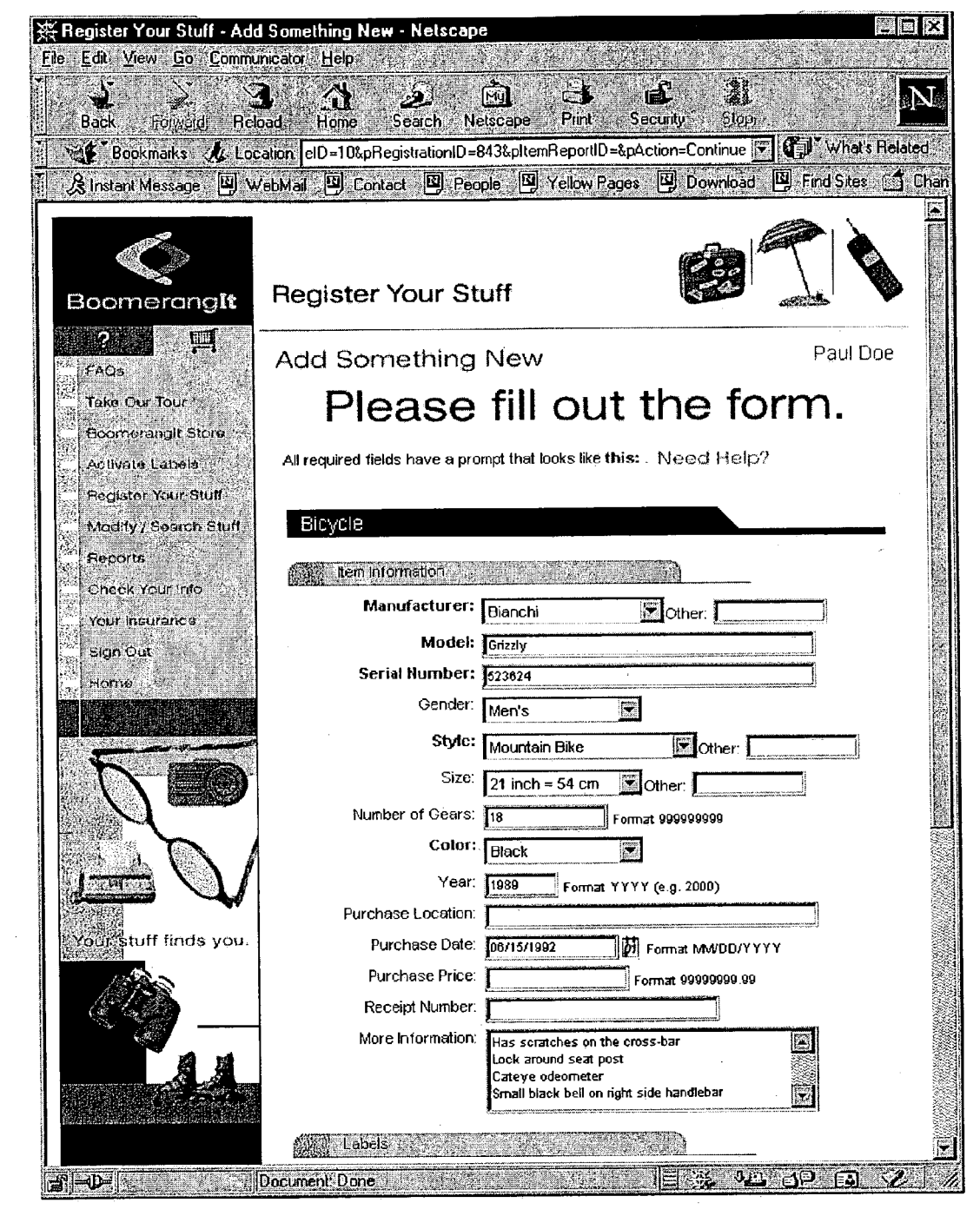

FIGS. 23A-23C show screenshots of an item registration screen. The user must purchase labels and/or registrations before they are able to register property items. The user can purchase labels and registration online or at a participating retail store. The following steps outline how to register the items:

Sign-in to your BoomerangIt account.
Go to Register your Stuff.
Select the registration package/term. Click on Continue.
Select the item you would like to register. Click on Continue.
Fill-out the form, including the label type and number placed on the item. Then click on OK to submit the information.
That's all! Now your item will be able to find its way home if ever lost or stolen.

Click on Register Your Stuff on the Navigation Bar.
If you have purchased label packages, a list of all available terms will be displayed.
If you do not have any available, now is the time to go shopping.
The user should select the label package at the top of the list, if they have multiple packages, as it will expire the earliest. Then the should select the item they wish to register from the pull-down menu. The items are displayed in alphabetical order. If an item is no included in that list, the user may type in a keyword and try searching for it. If the keyword search does not succeed, the user can use the "Other" attribute to register that particular item.

The user is then prompted to fill-out as much information as they think is necessary to identify the item. The more details they provide about the item, the easier it would be to get it back if lost or stolen.

The user is then prompted to include at least one label that is found on the item. It may be any type of identification label. If the item has not been labeled, the serial number can serve as a label number. BoomerangIt recommend that the user label items that do not have serial numbers, such as agendas, sunglasses, paintings, etc. If the user has already activated their labels, they may select them from the drop-down list.

View Registered Items

Figure 24:
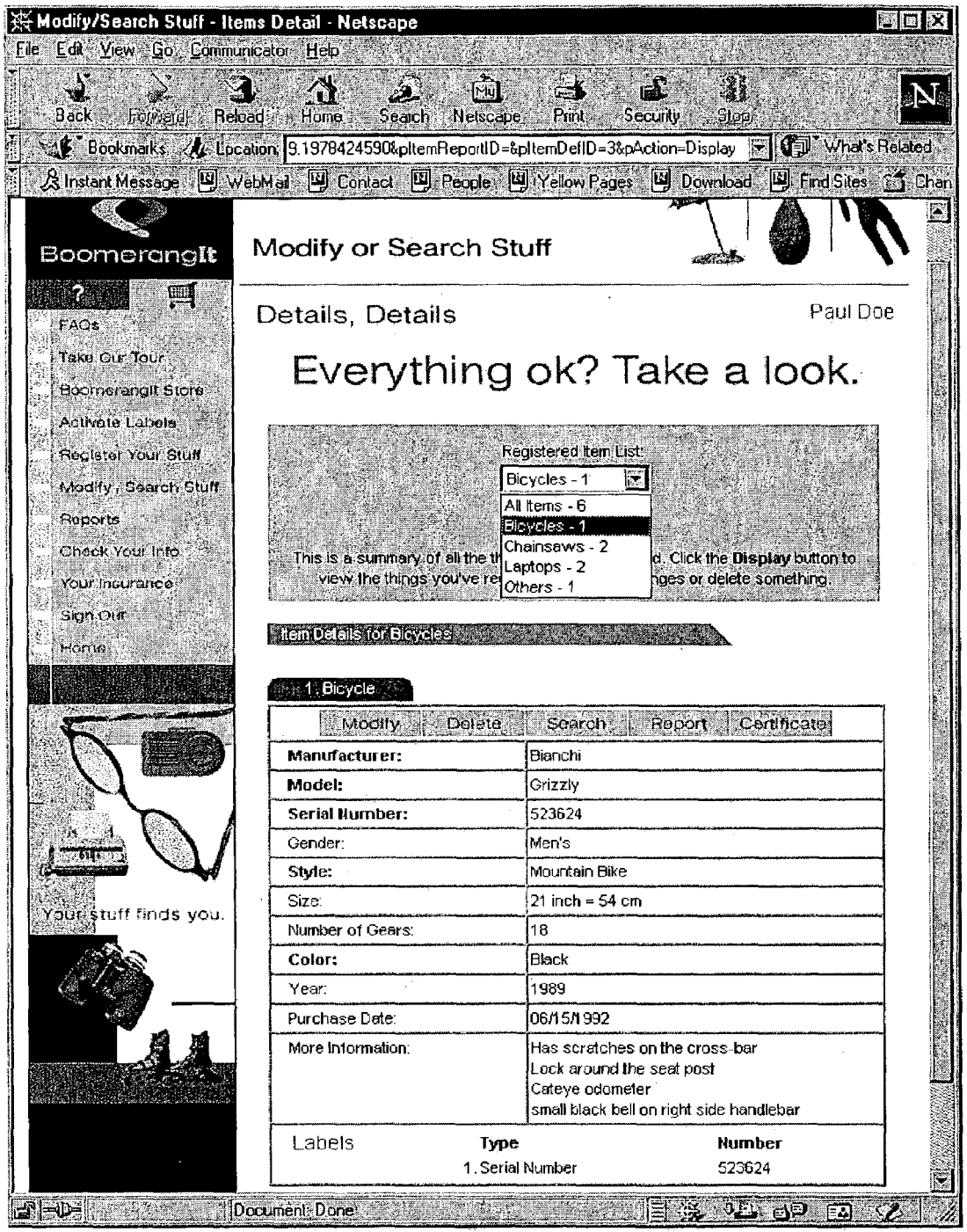
Figure 25:
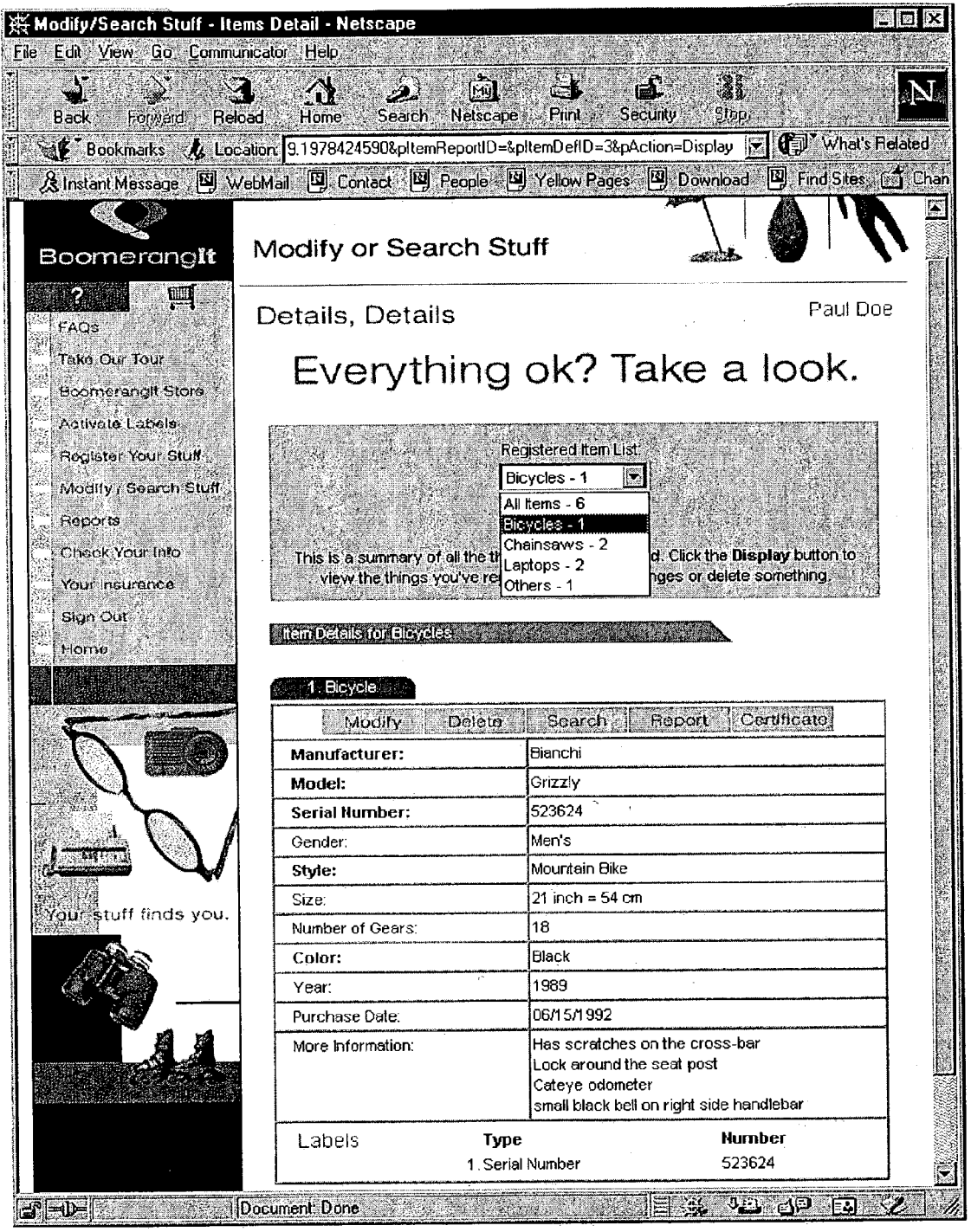

FIG. 24 shows a screenshot of a registered item view screen, while FIG. 25 shows a screenshot of a registered item modification screen. If a mistake is made, or if any of the item attributes have been changed, the user can access their BoomerangIt account and update the information online. The following steps poutline what the user needs to do:

Sign-in to your BoomerangIt account.

Go to Modify/Search Stuff.
Click on Modify.
Make the necessary changes to the online form.
When you are done, click on OK.
That's all! it is important that you update the descriptions of your items to ensure the information is always correct.

BoomerangIt has been designed not only as a lost-and-found service, but it also is indicia of ownership and proof of registration of the item. Once the user has registered their item, they can print a Certificate of Registration for it. The following steps outline what the user needs to do:

Sign-in to your BoomerangIt account.
Go to Modify/Search Stuff.
Select the category the item belongs to. Click on Display.
From the list of displayed items, select the item for which you would like to print a certificate. Click on Certificate. It will be displayed in anew browser window.
Click on the Print button on your browser.

Now the user has a hard-copy and a proof of registration of their item. If the user needs Certificates for their other items, they can repeat the steps above.

How to Search the Database of Found Items for Lost Items

Boomerang It allows a user to search the database of found items to find out if their lost item has been reported found. In accordance with one embodiment, the user needs to register the item and report it as lost before they can search for it. The following steps outline how a user can search the database of found items:

Sign-in to your BoomerangIt account.
Go to Modify/Search Stuff.
Select the category the item belongs to. Click on Display.
Locate the item you have lost on the screen and click on the Search button next to it.
Results will be displayed in descending order from the most likely to the least likely match.
To contact the person, who found what you believe may be your item, click on the Contact the Finder by E-mail button next to the description of the found item to send an e-mail to BoomerangIt lost-and-found support.
A confirmation that your e-mail has been sent will be displayed.

How to Delete an Item

Sign-in to your BoomerangIt account.
Go to Modify/Search Stuff.
Select the category the item belongs to. Click on Display.
Locate the description of the item to be deleted.
Click on the Delete button next to the item you would like to delete.
A confirmation screen will be displayed with the item details.
Click on OK to delete the item.

If the user has deleted the item by mistake, they can always register it again. When the user deletes an item, one registration is restored to their list of available registrations.

How to Check What Reports an Item is Attached to

If the user has registered multiple items, and has multiple reports, it is easy to view which reports each item is attached to. The following steps outline how to see the reports for an item:

Sign-in to your BoomerangIt account.
Go to Modify/Search Stuff.
Select the category the item belongs to. Click on Display.
Locate the item you would like to see a report for and click on the Report button next to it.
A list with all reports this item is attached to will be displayed.

From here, the user can create new reports, modify, delete, view and e-mail existing reports containing the selected item.

Figure 26:
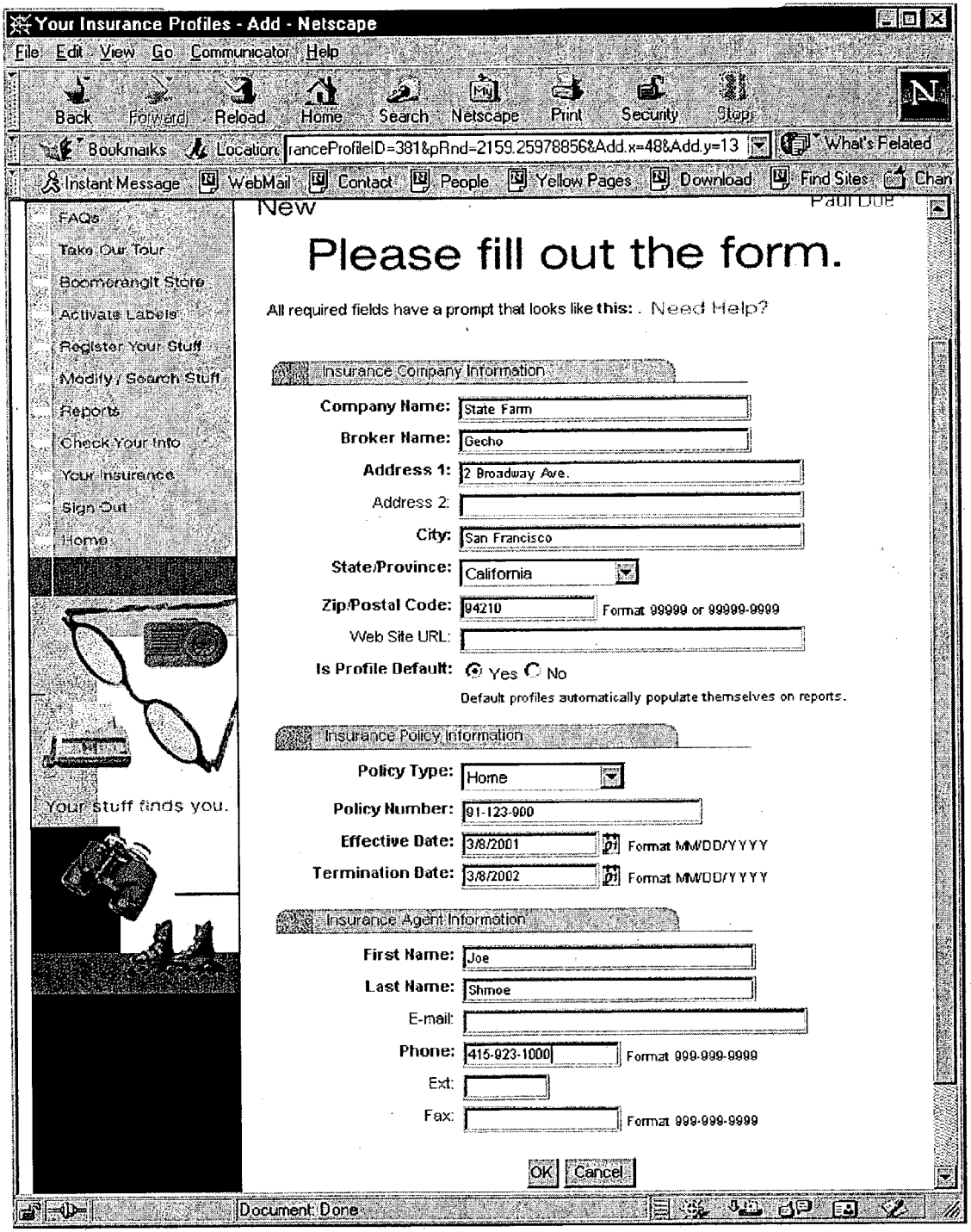

FIG. 26 shows a screenshot of an insurance profile creation screen. BoomerangIt provides a handy medium in which to keep insurance information. Once the user has filled out their profile, the information will be automatically filled out in BoomerangIt reports. They can then e-mail claims to the insurance company through their BoomerangIt account. This saves time for both the user and their agent, and clearly and accurately presents the information needed for a claim. The following steps outline how to create the Insurance Profile:

Sign-in to your BoomerangIt account.
Go to Your Insurance.
Fill-out the form, including the following sections:
Insurance Company Information
Insurance Policy Information
Insurance Agent Information
Click on OK when you are done.

The default insurance profile automatically displays when the user creates reports. If the default profile is not the one wanted in a particular report, the user may click on the drop down menu and pick the insurance policy that covers the incident they are reporting. The following steps outline how to make changes to a users current insurance profile:

Sign-in to your BoomerangIt account
Bo to Your Insurance
Select the profile you would like to update from the pull-down list (profiles are listed by insurance company and policy type)
Make the necessary changes to the online form and click on OK. Your insurance information will be updated into the database.

How to Delete an Insurance Profile

Sign-in to your BoomerangIt account
Go to Your Insurance
Select the profile you would like to delete from the pull-down list (profiles are listed by insurance company and policy type) and click on the Delete button.
A confirmation with the profile details will be displayed.
To delete it, click on the Delete button.

If a policy is deleted by mistake, the user can always go back to Your Insurance and enter it again.

Figure 27A:
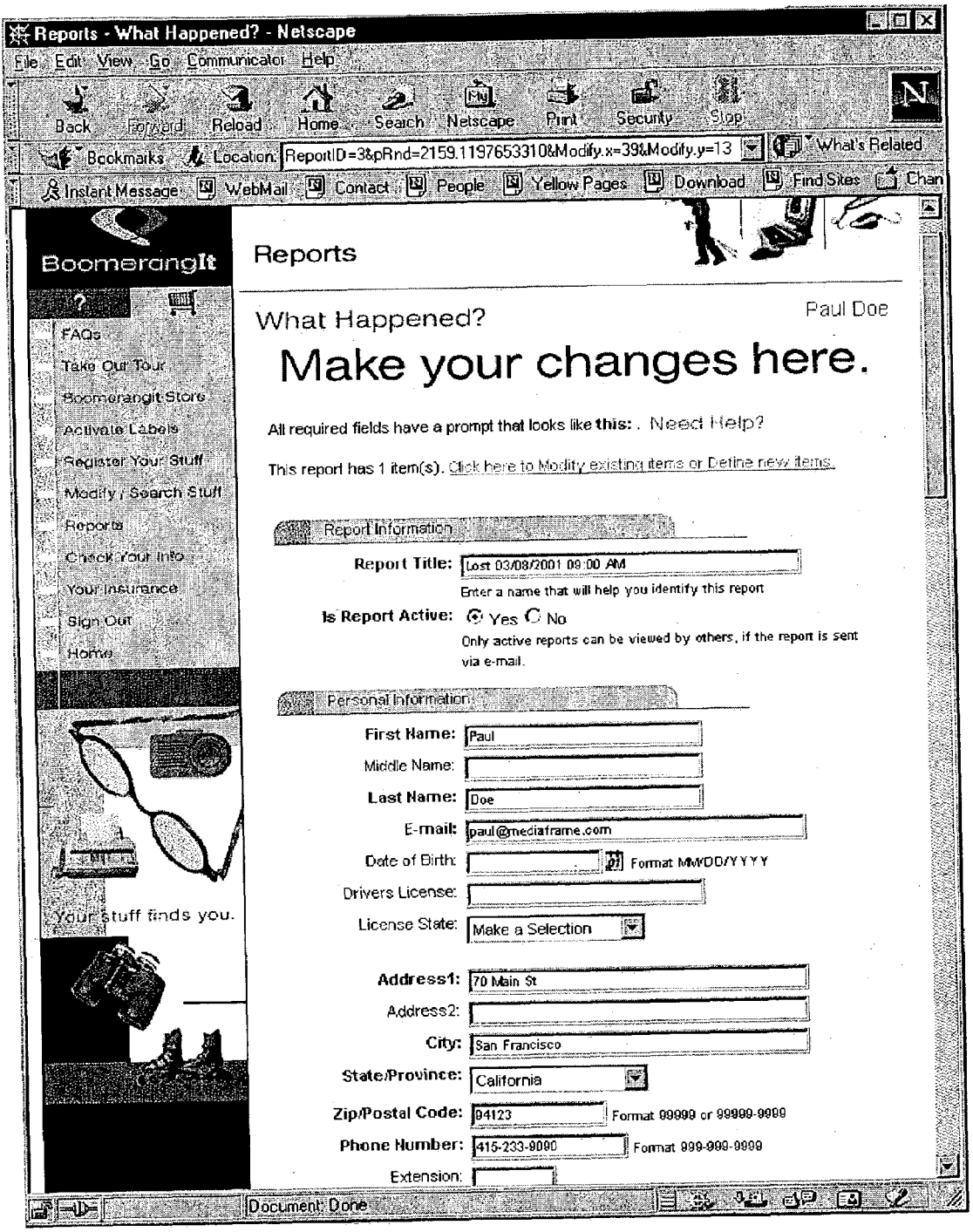
Figure 27B:
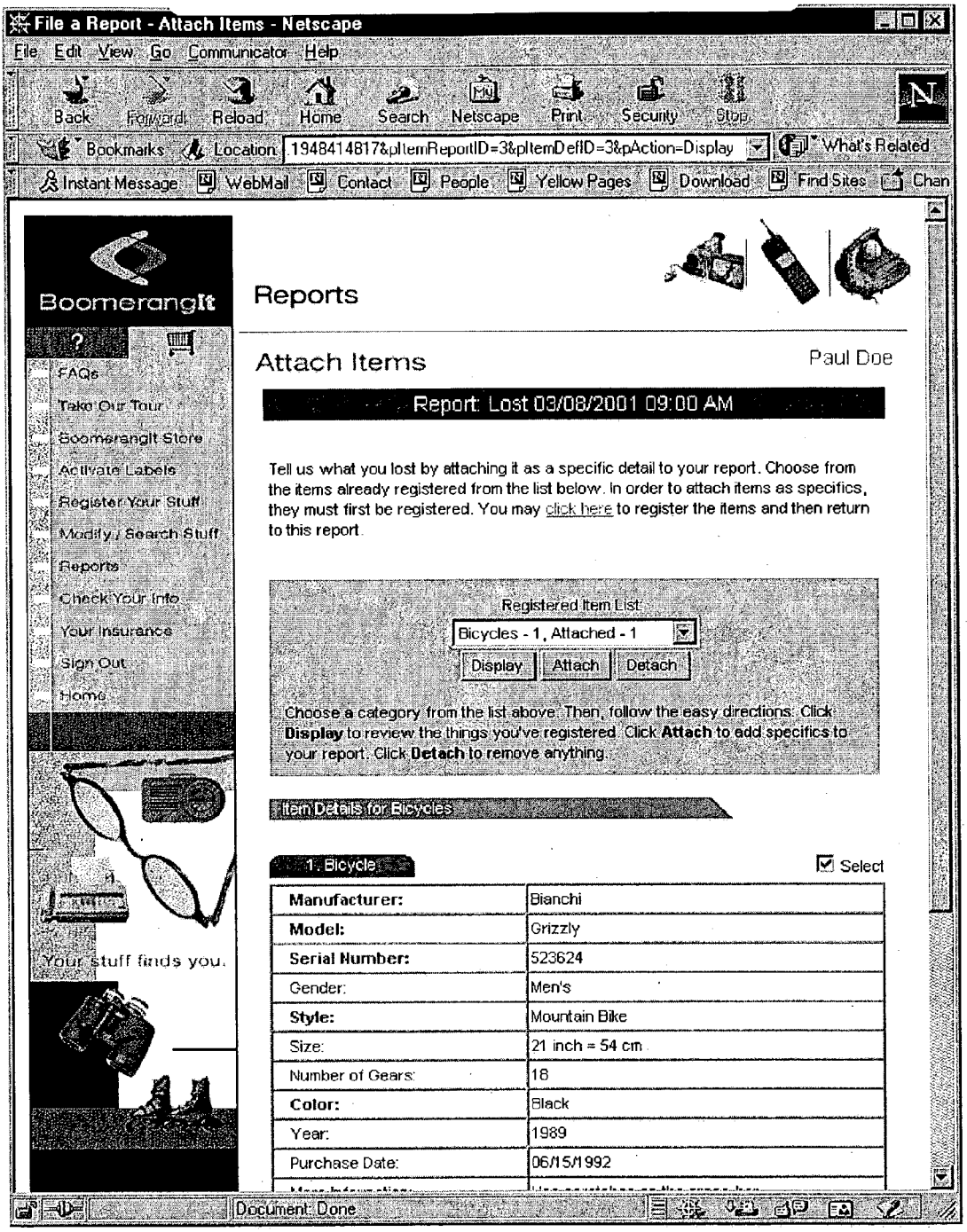

FIGS. 27A-27B show screenshots of a lost item report screen. The following steps outline what the user needs to do to return the item found to its owner:

Step 1: Go to the BoomerangIt website, even if the item you found does not have a BoomerangIt label on. The owner can still check to find the item by the description of the incident and the item.
Step 2: Create a Found Item Report, including your contact information and details about when and where you found the item
Step 3: Attach a description of the item you found to the report you have just created. Enter as detailed description of the item you found as possible by filling in the attribute fields. The item's manufacturer, model, serial number, and BoomerangIt or other identifying label number, if any, are the most important attributes. It will be very helpful if you find them on the item and enter them into the system. Important Note: If you are not sure about an attribute of the found item, it is better to leave the field blank.
Step 4: Wait for BoomerangIt to contact you. You will receive an e-mail comparing the descriptions of the item and the incident to confirm we have matched the right owner to the item you found. Your first job is to make sure the item you found matches the item that the owner lost. It is possible that several people have lost similar items, that a serial number is close but doesn't match, or that the attributes are close but don't match exactly, but it could still be the same item:

Step 5: Return the item. You can return the item by leaving it at a drop off location such as a lost-and-found or a police department. BoomerangIt may also arrange to have the item shipped from your home or office.

Step 6: Receive a reward. BoomerangIt rewards you with a set of labels and tags which you can use to protect your personal belongings.

If the owner has posted additional cash reward, the finder can use E Reward and contract with BoomerangIt to collect the reward for them. Or, they may instead arrange with the owner of the item found to send the entire reward directly to the finder. For good Samaritans who happen to find items, BoomerangIt highly recommends that they deposit the item at a police department and then file a report. The finder will still get the free BoomerangIt labels and registration pack, and any reward provided by the owner when the item eventually gets returned.

Figure 28A:
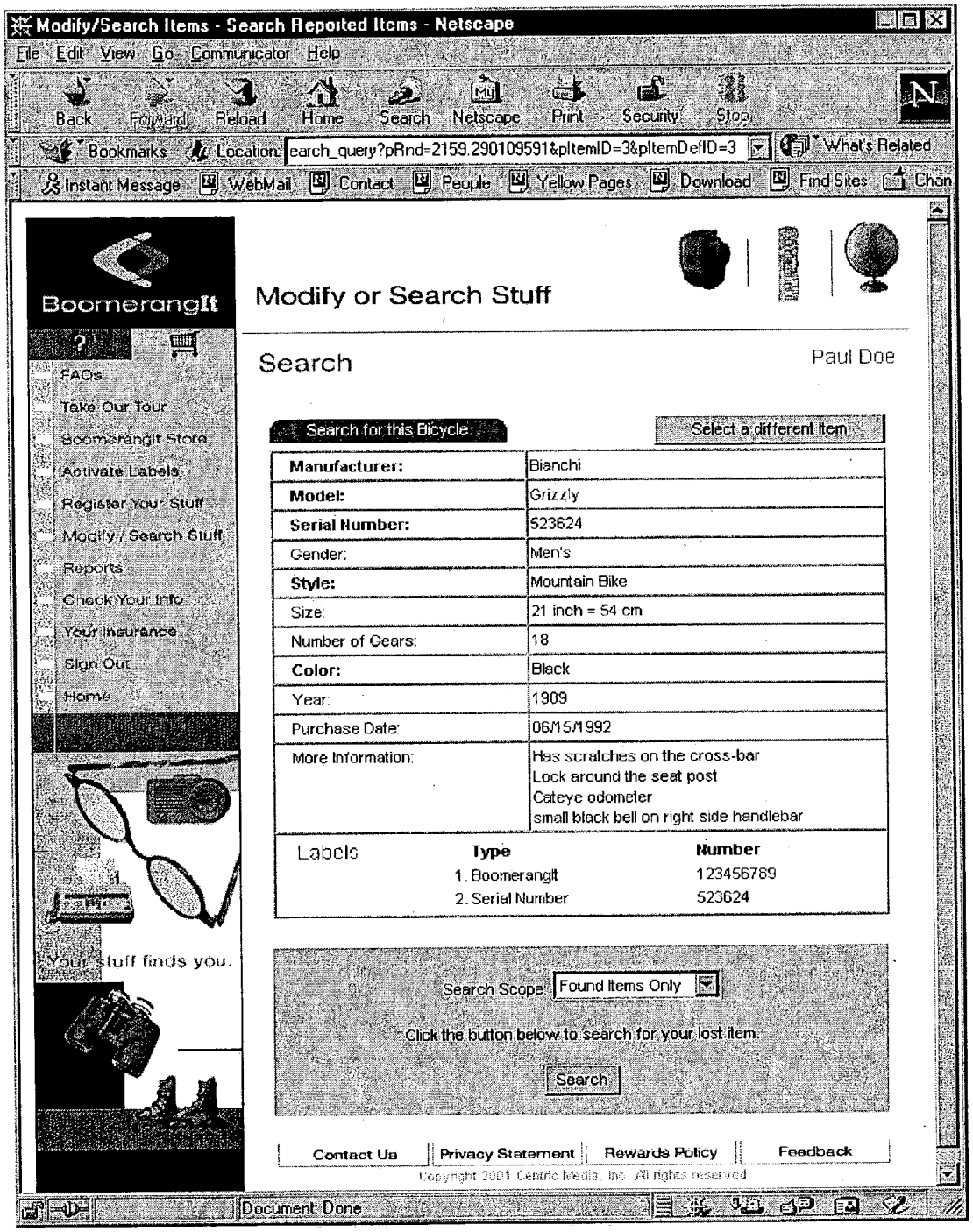
Figure 28B:
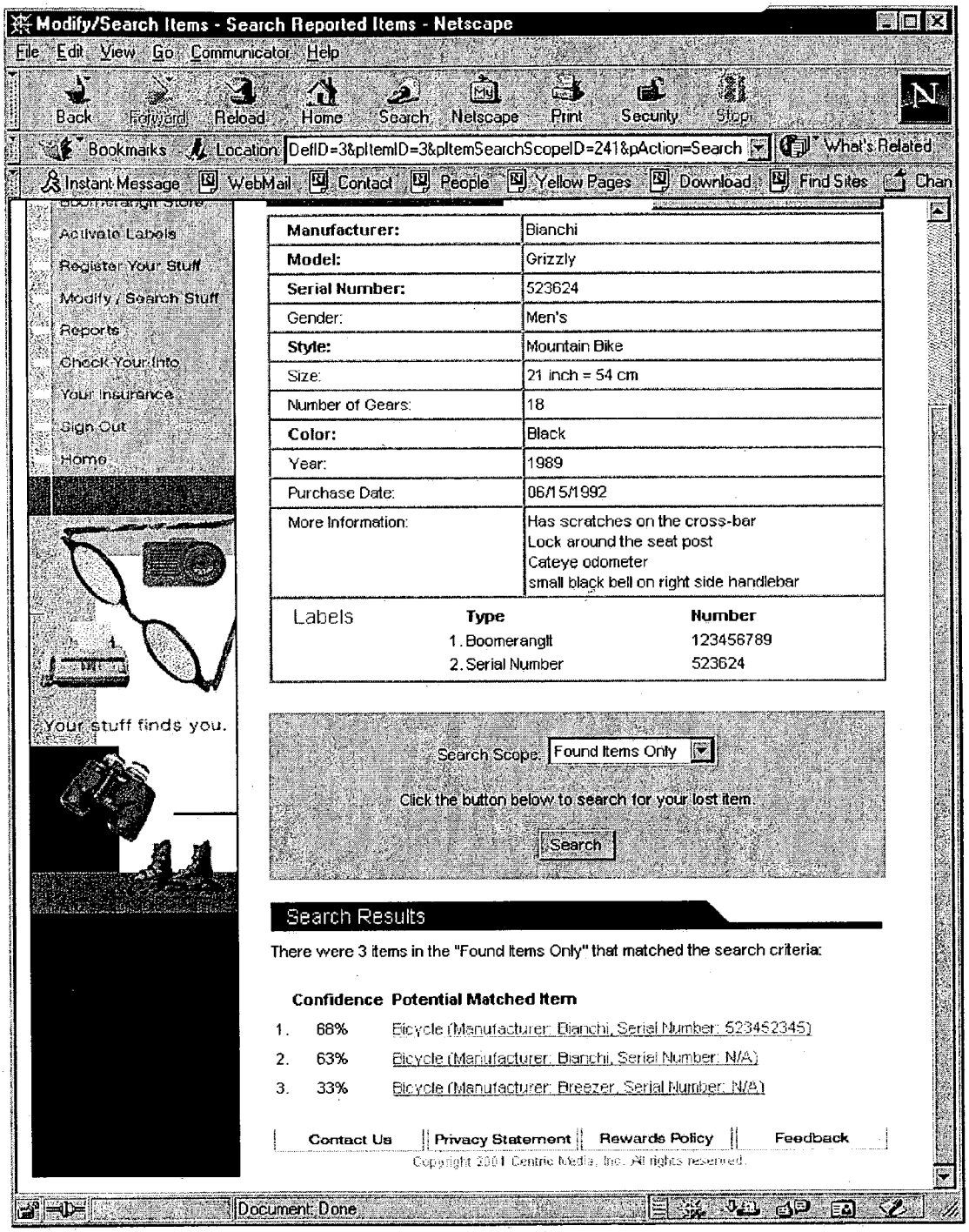
Figure 28C:
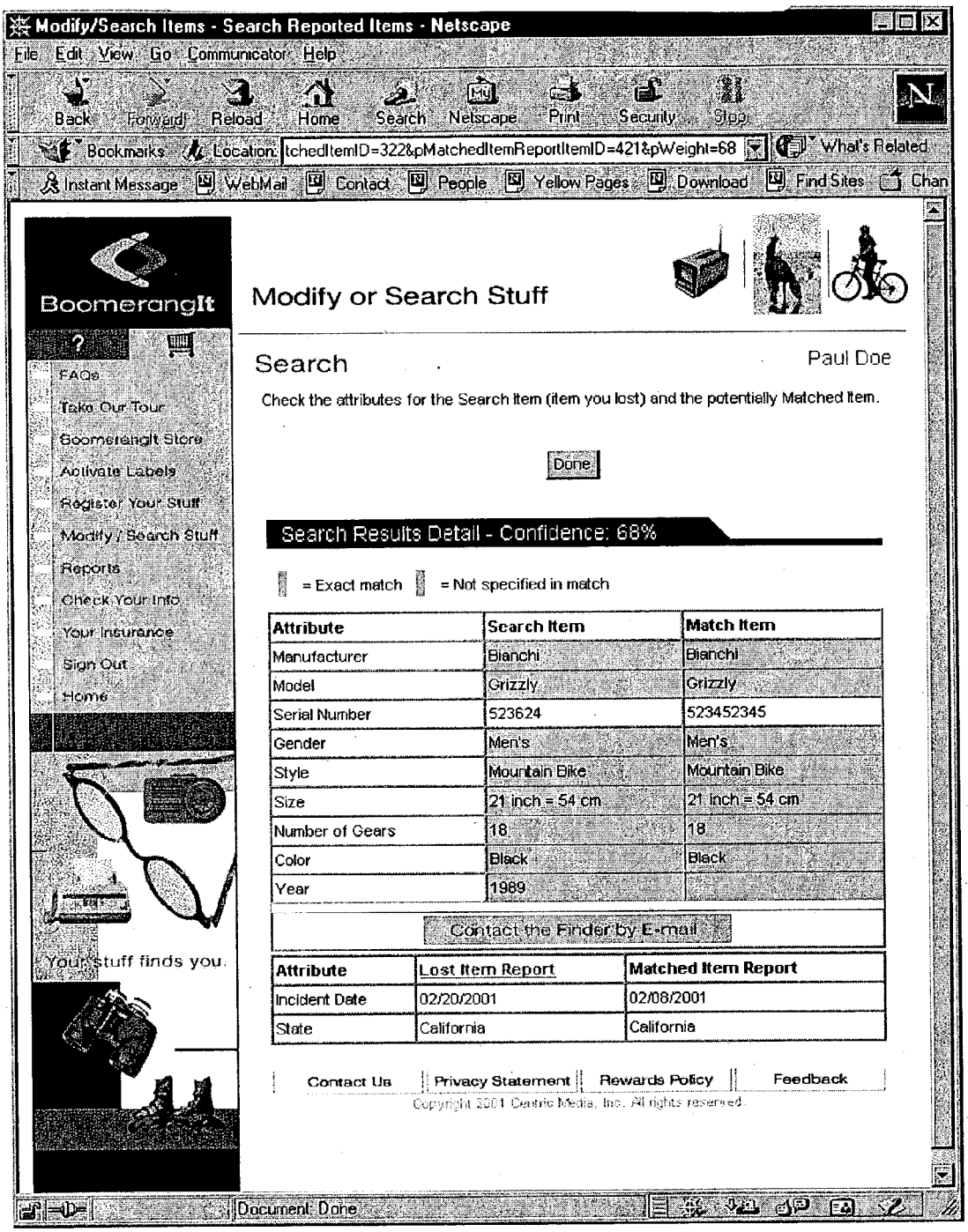

FIGS. 28A-28C show screenshots of a lost item search screen. Here is what the user must do if one of their items gets lost or stolen:

Step 1. Go to BoomerangIt.com and register the item (if you have already registered it, you can skip this step.). Even if an item does not have a BoomerangIt label on, it can be identified by the description of the item and the incident.

Step 2. Create a Lost/Theft Report for your item.

Step 3. Attach the description of the item you lost to your lost report.

Step 4. Now, you can go to Boomerang It at anytime and search the database of found items to locate if your lost item has been reported.

Step 5. See if there is a match! When you locate an item that looks like yours, we advise you to contact the owner through BoomerangIt. We make sure that it is the same item, before any further arrangements are made.

Step 6. E Return: Retrieve the item. Once we have determined, that the item that was found is the item you lost, we can help you get it back. We can arrange for the pick-up of the item from the finders location and its delivery to your home.

Or you may choose to arrange the shipment directly with the finder.

Figure 29:
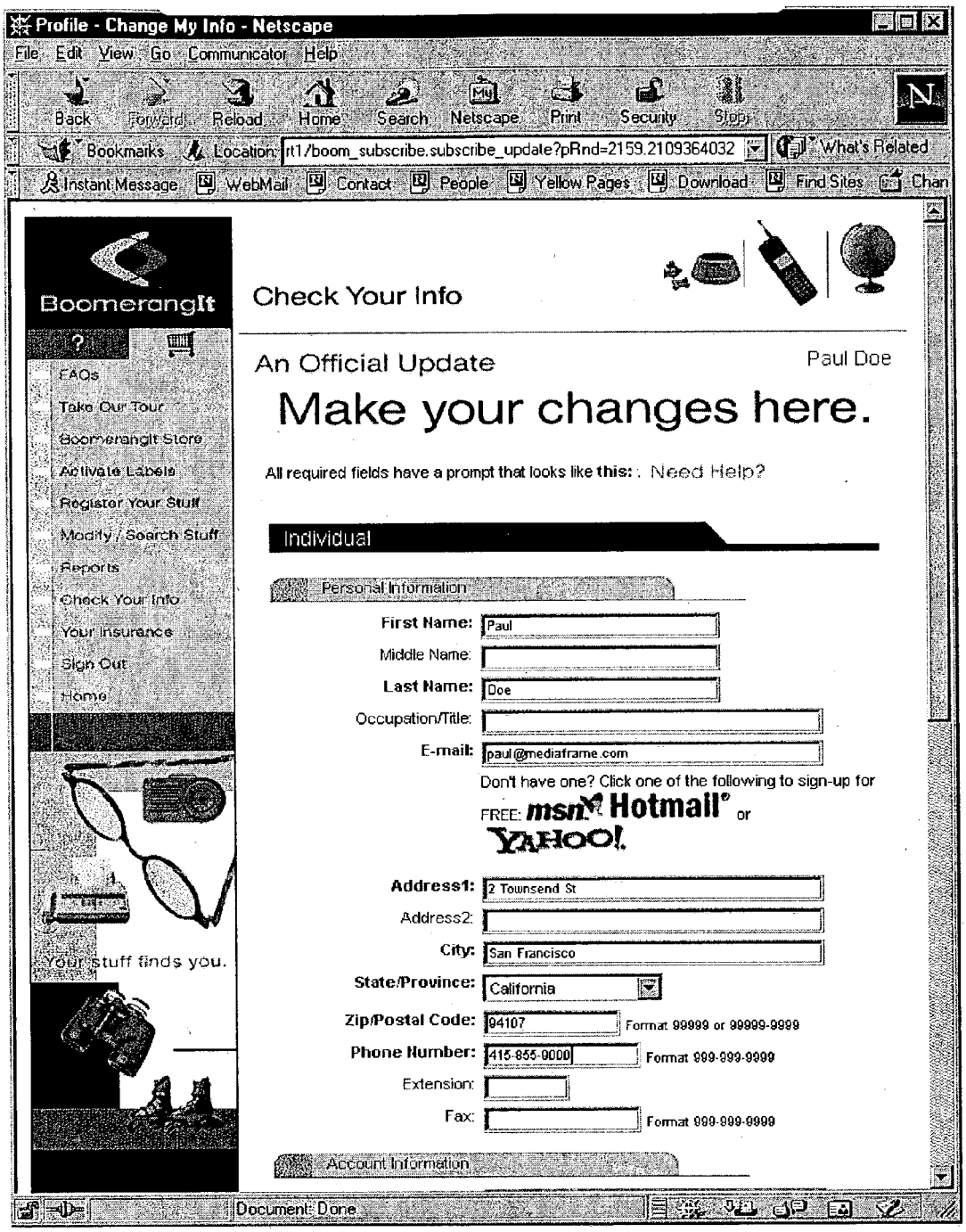

FIG. 29 shows a screenshot of a user profile modification screen. In order to update a user's personal info at the BoomerangIt database, the user follows these steps:

Sign-in to your BoomerangIt account
Go to Change My Info
Make the necessary changes to the online form.
Click on OK when you are done.

If the user is making changes to their user name and password, they are prompted to remember the new ones, as the account will no longer be accessible with the initial name and password.

Business Functions

The following section defines various functions, processes and reports in the BoomerangIt.com implementation. Other embodiments and implementations may provide more or fewer features.

User Site

Subscriber login with Password hint
Existing subscriber login to BoomerangIt
Become a Subscriber
Register or signup to become a BoomerangIt Subscriber
Report a Found Item
Define the item and complete an found incident report
BoomerangIt Store/New Shopping Cart
Purchase merchandise and registrations
Register Items
Register items with BoomerangIt
Review Items
Preview, modify and delete registered items
View summary and details
Report a Lost Item
Define the item and complete an lost incident report
Change Subscriber Profile
Subscriber can modify any profile information
Logout
How to BoomerangIt
How to instructions
Site Help
Help on how to use site
Contact Us
Privacy Statement
Feedback Administration Site
  All user site functions
  Subscriber Label Management
  Add BIN numbers that were purchased by subscriber during fulfilment
  Subscriber Search/Login
  Allow administrator to search for subscribers by name
  Administrator can login as a subscriber to change passwords etc.
  Incident Resolution Management
  Resolve lost/found incidents
  Schedule incident resolution process
  Reports
  Execute reports below
  Send a Mail Message
  Manually send a mail message Processes
  Lost/found Item Matching
  When an item is lost, found or registered check to see if a corresponding lost/found match exists.
  If it does:
  Send the owner an e-mail with finders name, contact information and disclaimer
  Send the finder an e-mail with the status of the search
  Notify the current user of the current status via the web pages.
  If it does not:
  Notify the current user of the current status via the web pages.

Reports
  Found Incident Report—by Incident Date
  Incident Resolution Log—by Date
  Lost Incident Report—by Incident Date
  Registration—by Date
  Registration—by Organization
  Registration/Payment—by Organization, by Payment Date
  Web Hit—by Date, by Web Page
  Web Hit—by Web Page Additional Applications In addition to the BoomerangIt customer-oriented Web-based system described above, additional embodiments of the invention may be utilized in other forms, for example in an original-equipment manufacturer (OEM) setting, wherein many of the processes (item pre-registration, reporting etc.) are performed automatically, and without the need for end-user intervention. Some of these additional embodiments are referred to herein as BoomerangIt Programs. A BoomerangIt Program addresses one or more of the following features:

Services (products): collect and store data, send reports, provide labels, allow access to theft reports.

Opportunities: to increase warranty response, reduce claims costs, make additional profit, improve communication and customer relations.

Rules: off-line approval, licensing, price and payment terms, volumes, commissions.

Target: consumers, insurance, police, manufacturers, retailers, government, corporations.

Implementation: program is the entity in the database that manages the above user interface—B2B and B2C.

Fulfillment—B2B and B2C: Sales and marketing plan to execute the program.

The Programs currently supported include business to consumer (B2C) applications such as those described above, and also business to business (B2B) program as described in further detail below.

Discount Coupon

The Discount Coupon is the basic B2B program offered by BoomerangIt, and may be used as an element of other programs. The Discount Program provides organizations with the ability to offer a discount coupon to their clients for a discount on BoomerangIt merchandise (products and services available to consumers)

Retail/E-Tail Program

The Retail/E-Tail Program allows Retailers/E-tailers to purchase BoomerangIt consumer packs online in bulk and at a wholesale price, and then sell them in retail/e-tail stores. Mix-and-match of retail packs and quantities can be provided for online purchase. Wholesale price can be negotiated off-line based on quantities and terms. The consumer purchases label packs in store, and activates the registration term by entering the label number online.

Original Equipment Manufacturer (OEM) Insert Program

The OEM Insert Program is another of the B2B programs offered by BoomerangIt. The OEM Insert Program allows OEMs to include BoomerangIt presentation inserts and/or labels on the product and its packaging to better facilitate product registration. This program tracks customers, warranties, and items and connects them to the OEM. For BoomerangIt, customers translate to names. Names allow the company, manufacturer, organization, etc. to sell lists and market research, obtain commissions on future sales, and access a stream of people to conduct advertising. Managing warranties implies adding warranty companies, warranty numbers and warranty ending dates as attributes. BoomerangIt provides a central convenient place to keep all of this warranty information. Managing items gives customers a nice virtual closet or index of their property. Each time an organization signs up for the OEM Insert Program, a randomly generated MIN (Manufacturer Identification Number) is assigned. Alternatively, the organization can specify the MIN, or the OEM name can serve as the MIN. The MIN identifies the OEM for BoomerangIt. The MIN is then embedded in the OEM website programming, printed on product warranty cards, and made functional at BoomerangIt to initiate a registration and activate BoomerangIt Store discounts online at the time of purchase.

Collateral Lender Program

The BoomerangIt Collateral Lender System (BCLS) is a standalone software and database product developed exclusively for Collateral Lenders (CLs) and Law Enforcement Agencies (LEAs). It provides CLs with an efficient and easy to use reporting system to submit required JUST-1 data via e-mail to one or more LEAs. The BCLS provides Law Enforcement with:

Standalone system especially developed for LEAs
    Free of charge
    High volume
    BoomerangIt Interim Taxonomy of Items
    No data input by the LEA
    Drop down menu reliability
    Secure transmission
    Compatibility with most other LEA databases (Oracle, Solaris and PC)
    Mappable to NCIC
    Nationwide stolen and lost item database searches What BCLS Provides CLs:
    Secure automated JUST-1 reporting
    Minimal computer requirements (Browser enabled)
    BoomerangIt Interim Taxonomy of Items
    No up front cost
    Loan form compatibility
    Loan item inventory capability CLs use the BoomerangIt web site software and BoomerangIt Interim Taxonomy of Items to record loans and its item(s) detail. CLs then apply online., and the application form is saved as their Profile information. After BoomerangIt personnel reviews and approves the applicant, the CL Primary Contact can log in into BoomerangIt and setup employee names with their usernames and passwords to start sending reports to one or more LEAs. LEAs do not need to apply to receive the CL reports. To search the BoomerangIt lost and stolen item database, LEAs are simply given a user-name and password.

Hospitality (HRT) Program

The Hospitality Program offers Hospitality organizations and Airlines, etc. (generally referred to as "HRT" to refer to Hotels, Restaurants, and Transportation) the ability to manage inquiries about lost luggage and items through email, using the BoomerangIt reporting system. The organizations have access to summary and detail reports on items reported lost, items found and returned, and tips and rewards generated. The Guest/Owner of a lost item learns from an HRT Program participant that the way to inquire about a lost item is through BoomerangIt.com. The Guest/Owner then signs in, or signs up, fills out the appropriate incident report, attaches a description of the lost item, and submits it as an e-mail to the corresponding HRT participant. To initiate found reports, the HRT participant must have browser access and report found items in the standard BoomerangIt format, or send standard e-mail reports to BoomerangIt.

BoomerangIt Asset Tracking (BAT) Program

The BAT program allows corporations to purchase registrations and labels online. A BAT company can maintain records of their equipment worldwide through the BoomerangIt database, similar to the Consumer Program on a larger scale. There are currently three options for labeling corporate assets: BoomerangIt-BAT label with one number associated with the BAT company; Custom-BAT—serialized labels requested by the BAT company; or BoomerangIt logo only (in which case the item is registered with its serial number).

Insurance Program

The Insurance Program allows Insurance Companies and Brokerage firms to provide discounts on BoomerangIt merchandise to their customers. The Insurance Program consists of the Discount Coupon and the Retail/E-tail Program. To obtain the discount, the consumer enters the number from the insurance coupon at the BoomerangIt Store online, or buys a BoomerangIt label pack from the insurance agent. The BoomerangIt database facilitates incident/claim reports by e-mail from the consumer to the insurance company.

As described above the present invention provides a system that comprises a universally accessible property tracking database, based on an Organization-Property-Individual model with automatic close-match searching, whereby any type of property can be reported found, registered, and reported lost, and whereby recovered property can be returned to its owner.

The foregoing description of the present invention has been provided for the purposes of illustration and description. It is not intended to be exhaustive or to limit the invention to the precise forms disclosed. Obviously, many modifications and variations will be apparent to the practitioner skilled in the art. For example, the ordering of some steps and methods can be altered and the same relative operation, relative performance, and relative benefits will result. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for tracking property items, comprising:

a database that includes a plurality of entries stored therein, wherein each entry represents a property item tracked by the system, and wherein a particular entry includes a set of attributes associated with a particular property item, said attributes including whether said particular property item is registered, lost, and/or found;

a user interface that allows a user to enter, retrieve, or update information in said database, including adding entries for new property items, and identifying a particular property item stored in said database as being registered, lost and/or found;

a search mechanism that operates with said database to automatically match property items that are identified as both lost and found, and upon finding a match then notifying either the user and/or the owner of the property item thereof;

wherein the entries in said database form part of an organization-property-individual model; further wherein said search mechanism performs a process for comparing closely matching lost and found items, said process comprising the steps of:

i) selecting a search scope based on known attributes of a lost item;

ii) comparing found item attributes with the attributes of the lost item; and, iii) ordering the search results by the weight, number, and type of attributes that match.

2. The system of claim 1 further comprising:

a distinctive label that may be attached to a property item, wherein said distinctive label includes information thereon that can be entered into said database and associated with said property item.

3. The system of claim 1 further comprising a gateway to a third party database.

4. The system of claim 1 wherein said database is accessible via a network.

5. The system of claim 4 wherein said network uses an Internet protocol.

6. The system of claim 1 wherein said database is dynamically extensible, so that new property items or new item attributes can be added without changing the database schema or reprogramming the data access routines.

7. The system of claim 1 wherein said database includes attribute values stored as universal codes; and wherein natural language names are derived from the database codes based on locale settings.

8. The system of claim 7 further comprising:

a) a plurality of national databases; and, b) a international database.

9. The system of claim 1 further comprising:

a) a data file with attribute definitions; and, b) a software program that reads the data file and updates the attributes definition stored in the database.

10. The system of claim 1 wherein the system can be used to provide users with an offsite record of their property.

11. The system of claim 1 wherein the system can be used to maintain a record of an items chain of title.

12. The system of claim 1 wherein the system can be used to track credit card numbers.

13. The system of claim 1 wherein the system can be used to identify victims of accidents or crime.

14. The system of claim 1 wherein the system can be used to automate insurance claims.

15. The system of claim 1 wherein the system can be used to generate reports required of collateral lenders.

* * * * *